(12) United States Patent
Kouda

(10) Patent No.: US 12,237,738 B2
(45) Date of Patent: Feb. 25, 2025

(54) ELECTRIC WORK MACHINE AND PRODUCTION METHOD FOR ELECTRIC WORK MACHINE

(71) Applicant: MAKITA CORPORATION, Anjo (JP)

(72) Inventor: Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 308 days.

(21) Appl. No.: 17/924,430

(22) PCT Filed: Apr. 16, 2021

(86) PCT No.: PCT/JP2021/015696
§ 371 (c)(1),
(2) Date: Nov. 10, 2022

(87) PCT Pub. No.: WO2021/250999
PCT Pub. Date: Dec. 16, 2021

(65) Prior Publication Data
US 2023/0231457 A1    Jul. 20, 2023

(30) Foreign Application Priority Data
Jun. 10, 2020 (JP) .................. 2020-101233

(51) Int. Cl.
*H02K 21/16* (2006.01)
*H02K 1/14* (2006.01)
(Continued)

(52) U.S. Cl.
CPC ............ *H02K 21/16* (2013.01); *H02K 1/146* (2013.01); *H02K 1/276* (2013.01); *H02K 7/145* (2013.01);
(Continued)

(58) Field of Classification Search
CPC ........ H02K 21/16; H02K 1/146; H02K 1/276; H02K 7/145; H02K 9/06; H02K 11/215;
(Continued)

(56) References Cited

U.S. PATENT DOCUMENTS

| 2014/0203677 | A1 | 7/2014 | Takemoto et al. |
| 2018/0054149 | A1 | 2/2018 | Senoo |
| 2021/0091640 | A1 | 3/2021 | Aoyama |

FOREIGN PATENT DOCUMENTS

| AU | 2011233453 B9 * | 4/2015 | ............... H02K 1/16 |
| JP | 2001-218399 A | 8/2001 | |

(Continued)

OTHER PUBLICATIONS

Jun. 8, 2021 International Search Report issued in International Patent Application No. PCT/JP2021/015696.
Aug. 30, 2022 Notice of Submission of Publications issued in Japanese Patent Application No. 2020-101233.
Aug. 30, 2022 Submission of Publication issued in Japanese Patent Application No. 2020-101233.

(Continued)

*Primary Examiner* — Mohamad A Musleh
(74) *Attorney, Agent, or Firm* — Oliff PLC

(57) ABSTRACT

An electric work machine includes a first brushless motor including a first stator and a first rotor combined with the first stator, and a controller. The first stator includes a first stator core and multiple first coils wound around multiple teeth on the stator core. The controller magnetizes the teeth to cause the first rotor to rotate about a rotation axis. In a plane orthogonal to the rotation axis, the first stator core has the same shape as a second stator core in a second stator used in a second brushless motor in another electric work machine. The first rotor can be combined with the second stator. The first rotor has a different number of poles from a second rotor used in the second brushless motor.

16 Claims, 41 Drawing Sheets

(51) Int. Cl.
  *H02K 1/276* (2022.01)
  *H02K 7/14* (2006.01)
  *H02K 9/06* (2006.01)
  *H02K 11/215* (2016.01)
  *H02K 11/33* (2016.01)
  *H02K 15/022* (2025.01)
(52) U.S. Cl.
  CPC ............. *H02K 9/06* (2013.01); *H02K 11/215* (2016.01); *H02K 11/33* (2016.01); *H02K 15/022* (2013.01); *H02K 2211/03* (2013.01)
(58) Field of Classification Search
  CPC .. H02K 11/33; H02K 15/022; H02K 2211/03; H02K 29/08
  See application file for complete search history.

(56) References Cited

FOREIGN PATENT DOCUMENTS

| | | |
|---|---|---|
| JP | 2007-174790 A | 7/2007 |
| JP | 2010-206939 A | 9/2010 |
| JP | 2015-2584 A | 1/2015 |
| JP | 2018-29460 A | 2/2018 |
| JP | 2019-180165 A | 10/2019 |

OTHER PUBLICATIONS

Apr. 9, 2024 Office Action issued in Japanese Patent Application No. 2020-101233.
Dec. 13, 2022 International Preliminary Report on Patentability issued in International Application No. PCT/JP2021/015696.

* cited by examiner

FIG. 34

| NUMBER OF TEETH ON STATOR | NUMBER OF POLES IN ROTOR |
|---|---|
| 3 | 2 |
|   | 4 |
| 6 | 4 |
|   | 8 |
| 9 | 6 |
|   | 8 |
|   | 10 |
|   | 12 |
| 12 | 8 |
|   | 10 |
|   | 14 |
|   | 16 |
| 15 | 10 |
|   | 14 |
|   | 16 |
|   | 20 |
| 18 | 12 |
|   | 16 |
|   | 20 |
|   | 24 |
| 21 | 14 |
|   | 28 |
| 24 | 16 |
|   | 20 |
|   | 28 |
|   | 32 |

ELECTRIC WORK MACHINE AND PRODUCTION METHOD FOR ELECTRIC WORK MACHINE

FIELD

The present disclosure relates to an electric work machine and a manufacturing method for an electric work machine.

BACKGROUND

In the field of electric work machines, a known power tool includes a brushless motor, as described in Japanese Unexamined Patent Application Publication No. 2019-180165. The brushless motor includes a stator including a stator core and coils supported by the stator core, and a rotor including a rotor core and permanent magnets supported by the rotor core.

BRIEF SUMMARY

Technical Problem

Brushless motors used for different types of electric work machines are to have different output characteristics. Producing a different brushless motor for each type of electric work machine in accordance with its requested output characteristics may increase the production cost.

One or more aspects of the present disclosure are directed to a technique for reducing the production cost of an electric work machine.

Solution to Problem

A first aspect of the present disclosure provides an electric work machine, including:
  a first brushless motor including
    a first stator including
      a first stator core including a plurality of first teeth, and
      a plurality of first coils each wound around a corresponding first tooth of the plurality of first teeth, and
    a first rotor combined with the first stator;
  a second brushless motor including
    a second stator to be combined with the first rotor, the second stator including
      a second stator core including a plurality of second teeth and having the same shape as the first stator core in a plane orthogonal to a rotation axis, and
      a plurality of second coils each wound around a corresponding second tooth of the plurality of second teeth, and
    a second rotor combined with the second stator and having a different number of poles from the first rotor; and
  a controller configured to magnetize the plurality of first teeth to cause the first rotor to rotate about the rotation axis.

A second aspect of the present disclosure provides a manufacturing method for an electric work machine, the method including:
  stacking first steel plates on one another to produce a first stator core;
  winding a first coil around each of a plurality of first teeth on the first stator core in a first connection manner to produce a first stator;
  combining the first stator with a first rotor having a first number of poles to produce a first brushless motor;
  stacking second steel plates having the same shape as the first steel plates to produce a second stator core;
  winding a second coil around each of a plurality of second teeth on the second stator core in a second connection manner to produce a second stator, the second connection manner being the same as the first connection manner;
  combining the second stator with a second rotor to be combined with the first stator to produce a second brushless motor, the second rotor having a second number of poles;
  manufacturing a first electric work machine including the first brushless motor; and
  manufacturing a second electric work machine including the second brushless motor.

Advantageous Effects

The technique according to the above aspects of the present disclosure reduces production cost of the electric work machine.

BRIEF DESCRIPTION OF DRAWINGS

FIG. 34 is a table showing the relationship between the number of teeth on a stator and the number of poles in the rotor that can be combined with the stator in the third embodiment.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine.

The electric work machine includes a motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience. A direction parallel to a tangent of an imaginary circle about the rotation axis AX of the motor is referred to as a tangential direction for convenience.

A position nearer the rotation axis AX of the motor in the radial direction, or a radial direction toward the rotation axis AX, is referred to as radially inward for convenience. A position farther from the rotation axis AX of the motor in the radial direction, or a radial direction away from the rotation axis AX of the motor, is referred to as radially outside or radially outward for convenience. A position in one circumferential direction, or one circumferential direction, is referred to as a first circumferential direction for convenience. A position in the other circumferential direction, or the other circumferential direction, is referred to as a second circumferential direction for convenience. A position in one tangential direction, or one tangential direction, is referred to as a first tangential direction for convenience. A position in the other tangential direction, or the other tangential direction, is referred to as a second tangential direction for convenience.

First Embodiment

Electric Work Machine

Figure 1:
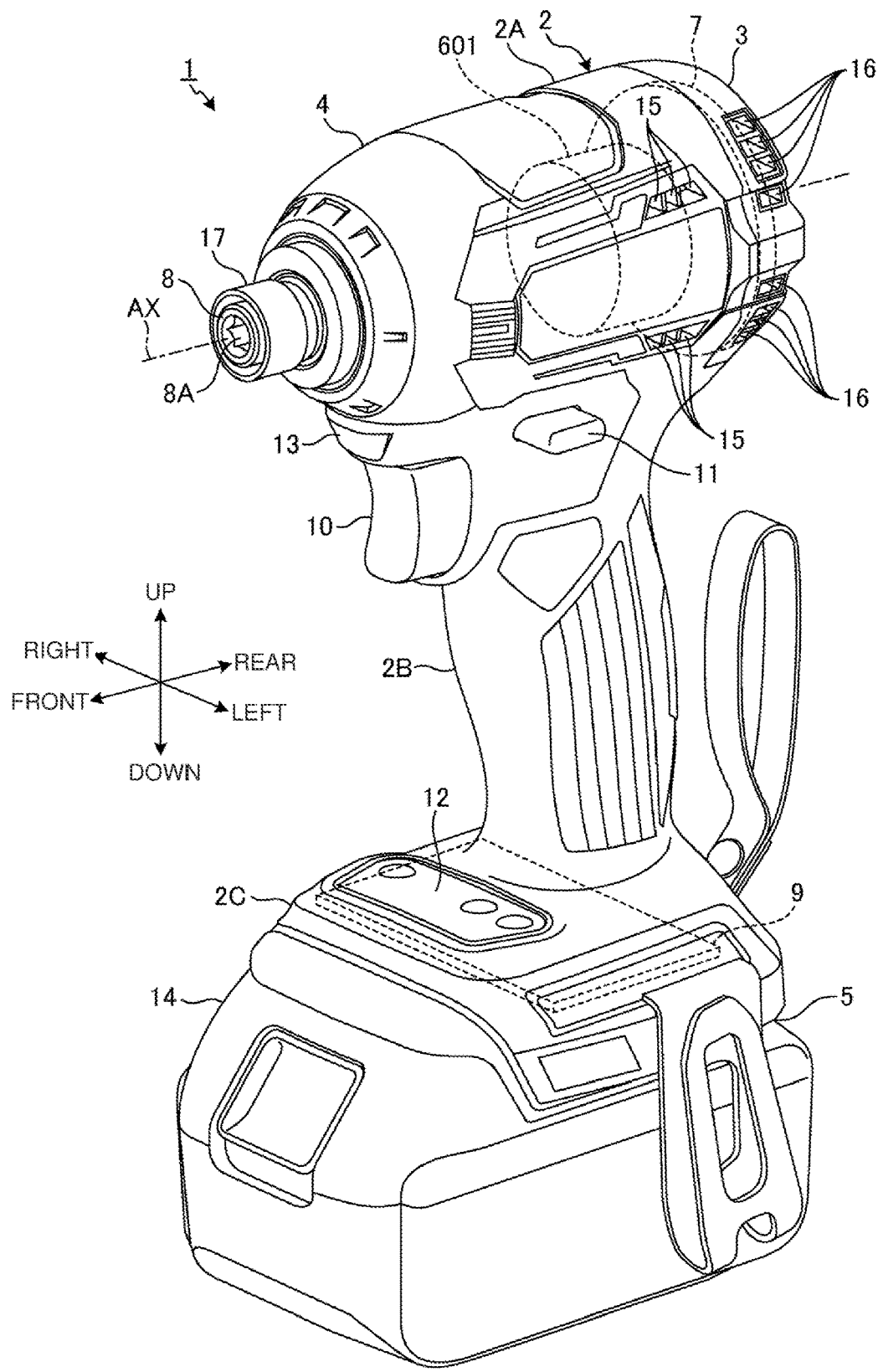
FIG. 1 is a perspective view of an electric work machine according to a first embodiment as viewed from the front.

FIG. 1 is a perspective view of an electric work machine 1 according to an embodiment as viewed from the front. The electric work machine 1 according to the present embodiment is an impact driver as an example of a power tool. As shown in FIG. 1, the electric work machine 1 includes a housing 2, a rear case 3, a hammer case 4, a battery mount 5, a motor 601, a fan 7, an anvil 8, a controller 9, a trigger switch 10, a forward-reverse switch lever 11, an operation panel 12, and a lamp 13.

The housing 2 includes a motor compartment 2A, a grip 2B, and a controller compartment 2C. The housing 2 is formed from a synthetic resin.

The motor compartment 2A accommodates the motor 601. The motor compartment 2A is cylindrical.

The grip 2B is grippable by an operator of the electric work machine 1. The grip 2B protrudes downward from a lower portion of the motor compartment 2A.

The controller compartment 2C accommodates the controller 9. The controller compartment 2C is connected to a lower end of the grip 2B. The controller compartment 2C has greater outer dimensions than the grip 2B in the front-rear and lateral directions.

The rear case 3 is connected to the rear of the motor compartment 2A to cover a rear opening of the motor compartment 2A. The rear case 3 is formed from a synthetic resin.

The hammer case 4 is connected to the front of the motor compartment 2A to cover a front opening of the motor compartment 2A. The hammer case 4 is formed from a metal.

A battery pack 14 is attached to the battery mount 5. The battery mount 5 is located below the controller compartment 2C. The battery pack 14 is detachable from the battery mounts 5. The battery pack 14 may be a secondary battery. The battery pack 14 in the present embodiment may be a rechargeable lithium-ion battery. The battery pack 14 is attached to the battery mount 5 to power the electric work machine 1. The motor 601 is driven by power supplied from the battery pack 14. The controller 9 operates with power supplied from the battery pack 14.

The motor 601 is a power source for the electric work machine 1. The motor 601 generates a rotational force for rotating the anvil 8. The motor 601 is a brushless motor. In the present embodiment, the rotation axis AX of the motor 601 extends in the front-rear direction. The axial direction and the front-rear direction are parallel to each other.

The fan 7 generates an airflow for cooling the motor 601. The fan 7 rotates with a rotational force generated by the motor 601.

The motor compartment 2A has inlets 15. The rear case 3 has outlets 16. The outlets 16 are located rearward from the inlets 15. The inlets 15 connect the inside and the outside of the housing 2. The outlets 16 connect the inside and the outside of the housing 2. The inlets 15 are located in right and left portions of the motor compartment 2A. The outlets 16 are located in right and left portions of the rear case 3. As the fan 7 rotates, air outside the housing 2 flows into an internal space of the housing 2 through the inlets 15 to cool the motor 601. Air inside the housing 2 flows out of the housing 2 through the outlets 16.

The hammer case 4 accommodates a reducer, a spindle, and a striker. The reducer is located frontward from the motor 601. The spindle is located at least partially frontward from the reducer. The reducer transmits a rotational force generated by the motor 601 to the spindle. The spindle rotates about the rotation axis AX with the rotational force transmitted from the motor 601 through the reducer. The reducer reduces the rotational speed of the spindle below the rotational speed of motor 601. The striker strikes the anvil 8 in the rotation direction in response to rotation of the spindle.

The anvil 8 rotates about the rotation axis AX with a rotational force from the motor 601. The anvil 8 has an insertion hole 8A for receiving a tip tool. A chuck unit 17 for holding the tip tool at least partially surrounds the anvil 8. The tip tool placed in the insertion hole 8A is held by the chuck unit 17.

The controller 9 controls the motor 601. The controller 9 controls a drive current supplied from the battery pack 14 to the motor 601. The controller 9 is accommodated in the controller compartment 2C. The controller 9 includes a circuit board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a field-effect transistor (FET), and a resistor.

The trigger switch 10 drives the motor 601. The trigger switch 10 is located on an upper portion of the grip 2B. The trigger switch 10 protrudes frontward from an upper front portion of the grip 2B. The trigger switch 10 is moved backward to drive the motor 601. The trigger switch 10 stops being operated to stop the motor 601.

The forward-reverse switch lever 11 is operable to change the rotation direction of the motor 601. The forward-reverse switch lever 11 is located between the lower end of the motor compartment 2A and the upper end of the grip 2B. The forward-reverse switch lever 11 is moved leftward or rightward. The rotation direction of the motor 601 is switched to switch the rotation direction of the anvil 8.

The operation panel 12 is located in the controller compartment 2C. The operation panel 12 is a plate. The operation panel 12 includes multiple operation switches. The operation panel 12 outputs operation signals. The controller 9 changes the control mode of the motor 601 based on the operation signals output from the operation panel 12. The control mode of the motor 601 refers to a method or a pattern for controlling the motor 601.

The lamp 13 emits illumination light to illuminate ahead of the electric work machine 1. The lamp 13 includes a light-emitting diode (LED). The lamp 13 is located at the upper front of the grip 2B.

Motor

Figure 2:
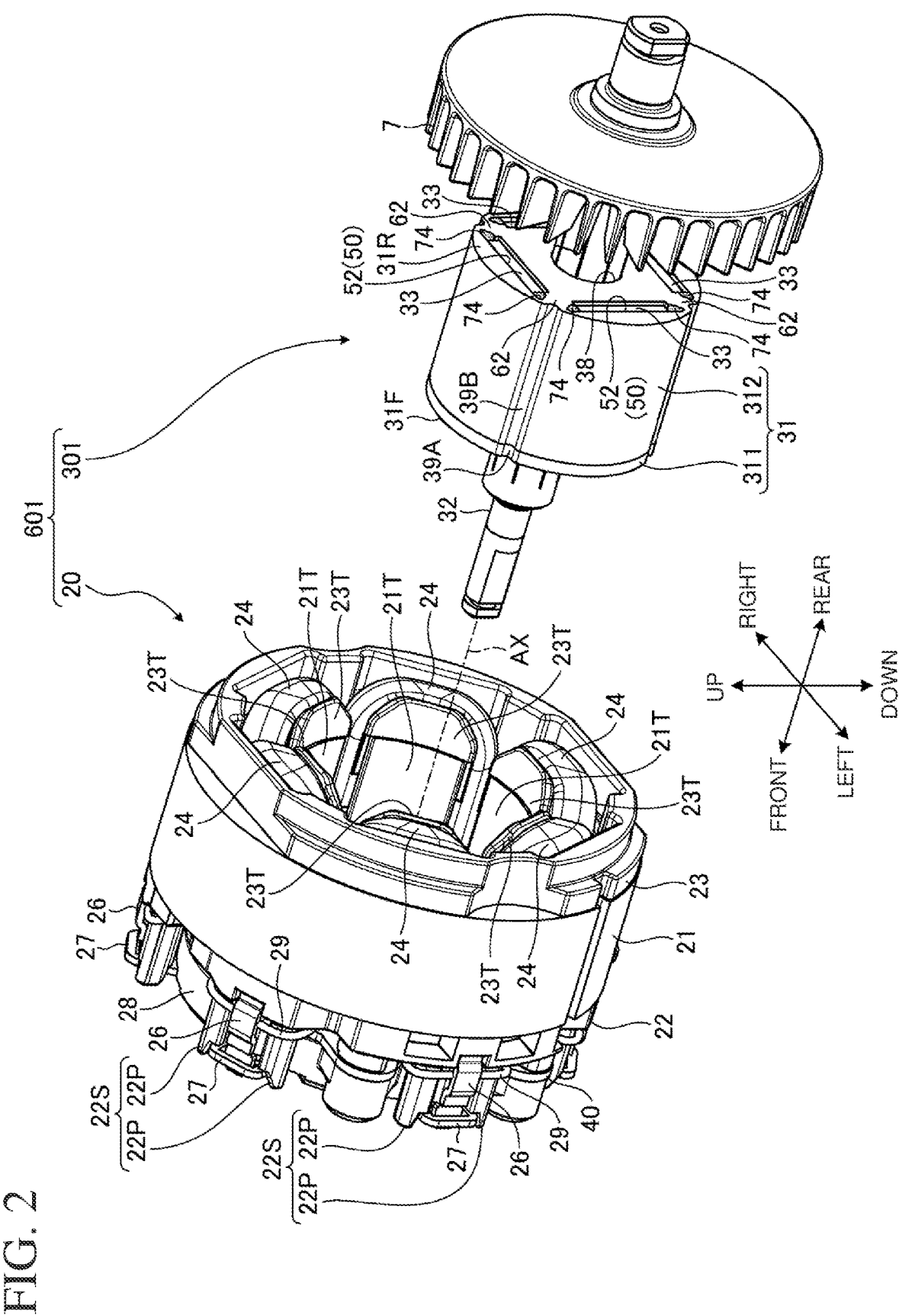
FIG. 2 is an exploded perspective view of a motor in the first embodiment as viewed from the rear.
Figure 3:
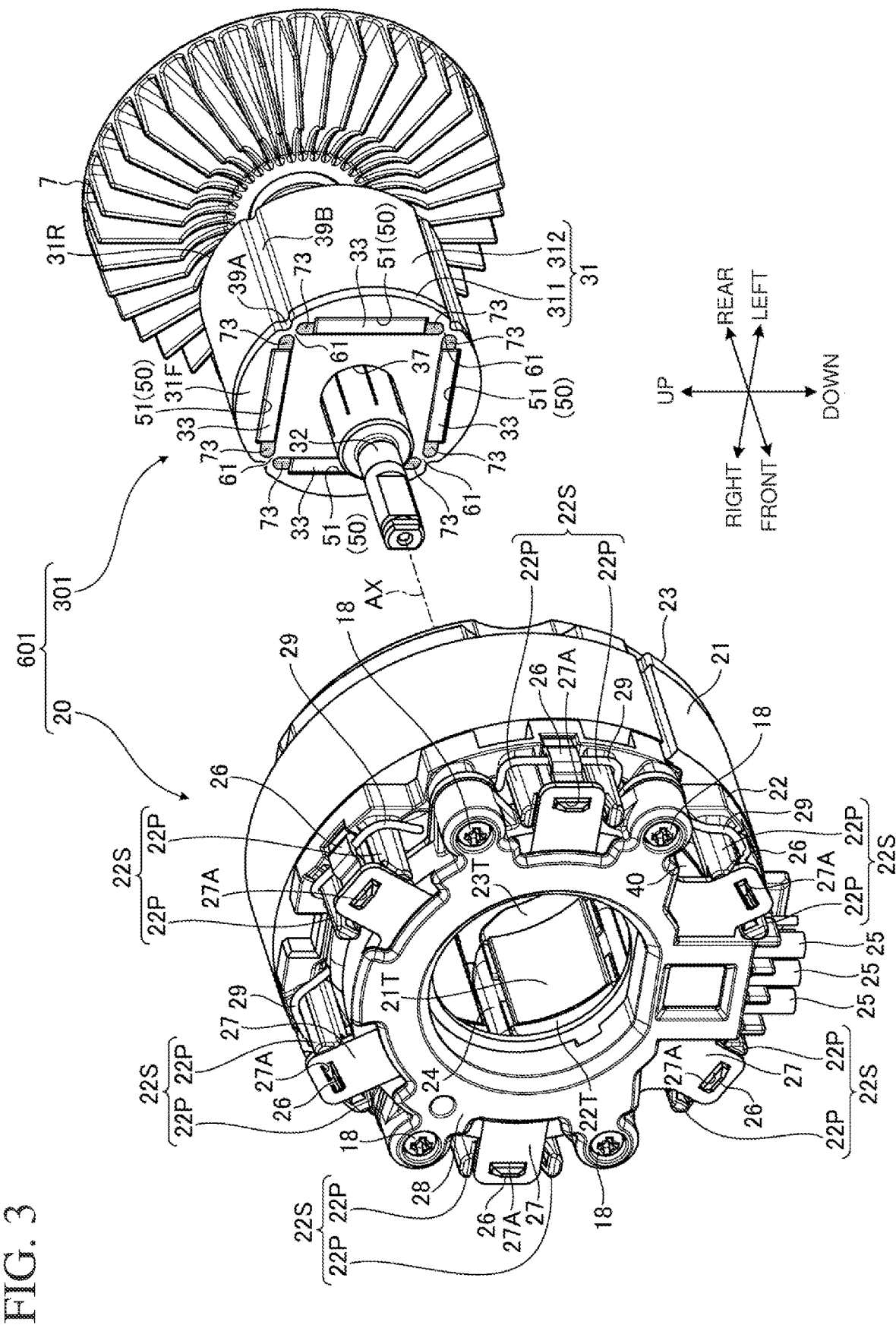
FIG. 3 is an exploded perspective view of the motor in the first embodiment as viewed from the front.
Figure 4:
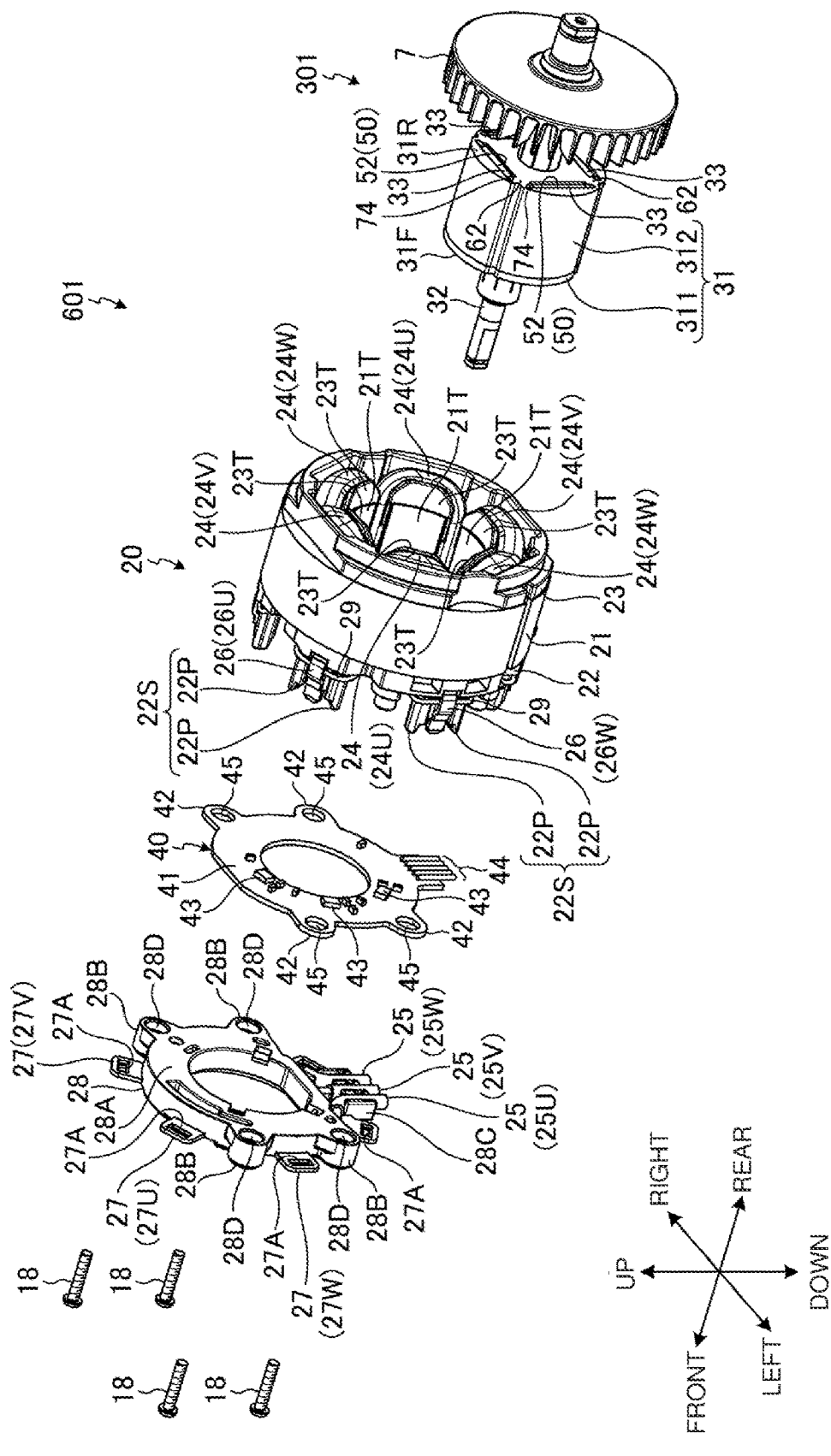
FIG. 4 is an exploded perspective view of a stator and a rotor in the first embodiment as viewed from the rear.
Figure 5:
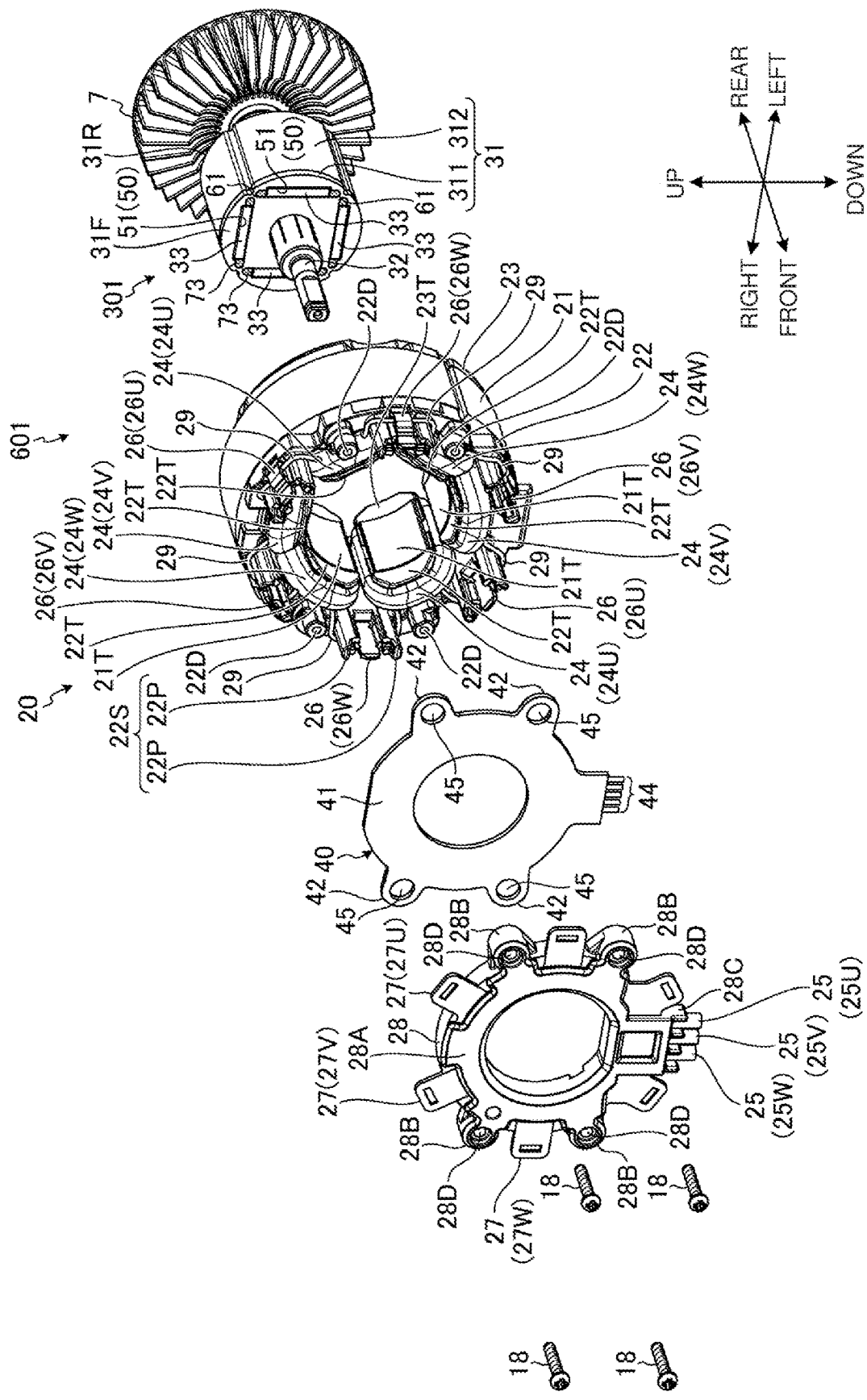
FIG. 5 is an exploded perspective view of the stator and the rotor in the first embodiment as viewed from the front.

FIG. 2 is an exploded perspective view of the motor 601 in the present embodiment as viewed from the rear. FIG. 3 is an exploded perspective view of the motor 601 in the present embodiment as viewed from the front. FIG. 4 is an exploded perspective view of a stator 20 and a rotor 301 in the present embodiment as viewed from the rear. FIG. 5 is an exploded perspective view of the stator 20 and the rotor 301 in the present embodiment as viewed from the front.

The motor 601 in the present embodiment is a brushless inner-rotor motor. As shown in FIGS. 2 to 5, the motor 601 includes the stator 20 and the rotor 301 rotatable relative to the stator 20. The stator 20 surrounds the rotor 301. The rotor 301 rotates about the rotation axis AX.

Stator

The stator 20 includes a stator core 21, a front insulator 22, a rear insulator 23, coils 24, power lines 25, fusing terminals 26, short-circuiting members 27, and an insulating member 28. The front insulator 22 and the rear insulator 23 may be integrally molded with and fixed to the stator core 21.

The stator core 21 includes multiple steel plates stacked on one another. The steel plates are metal plates formed from iron as a main component. The stator core 21 is cylindrical. The stator core 21 includes multiple (six in the present embodiment) teeth 21T to support the coils 24. The teeth 21T protrude radially inward from the inner surface of the stator core 21.

The front insulator 22 is an electrical insulating member formed from a synthetic resin. The front insulator 22 is located on the front of the stator core 21. The front insulator 22 is cylindrical. The front insulator 22 includes multiple (six in the present embodiment) protrusions 22T to support the coils 24. The protrusions 22T protrude radially inward from the inner surface of the front insulator 22.

The rear insulator 23 is an electrical insulating member formed from a synthetic resin. The rear insulator 23 is located on the rear of the stator core 21. The rear insulator 23 is cylindrical. The rear insulator 23 includes multiple (six in the present embodiment) protrusions 23T to support the coils 24. The protrusions 23T protrude radially inward from the inner surface of the rear insulator 23.

Each tooth 21T has a front end connecting to the rear end of the corresponding protrusion 22T. Each tooth 21T has a rear end connecting to the front end of the corresponding protrusion 23T.

The coils 24 are attached to the stator core 21 with the front insulator 22 and the rear insulator 23 in between. The stator 20 includes multiple (six in the present embodiment) coils 24. Each coil 24 is wound around the corresponding tooth 21T with the protrusion 22T and the protrusion 23T in between. Each coil 24 surrounds the tooth 21T, the protrusion 22T, and the protrusion 23T. The coils 24 and the stator core 21 are insulated from each other with the front insulator 22 and the rear insulator 23 in between.

The multiple coils 24 are formed by winding a single wire. The coils 24 adjacent in the circumferential direction are connected with a connection wire 29, which is a part of the wire. The connection wire 29 is a part of the wire between two adjacent coils 24. The connection wire 29 is supported on the front insulator 22.

The power lines 25 are connected to the battery pack 14 with the controller 9. The battery pack 14 serves as a power supply for the motor 601. The battery pack 14 supplies a drive current to the motor 601 through the controller 9. The controller 9 controls the drive current supplied from the battery pack 14 to the motor 601. The drive current from the battery pack 14 is supplied to the power lines 25 through the controller 9.

The fusing terminals 26 are connected to the coils 24 with the connection wire 29. The fusing terminals 26 conduct electricity. Multiple (six in the present embodiment) fusing terminals 26 surround the rotation axis AX. The fusing terminals 26 are as many as the coils 24.

The fusing terminals 26 are supported on the front insulator 22. The front insulator 22 in the present embodiment includes supports 22S for supporting the fusing terminals 26. Six supports 22S are located at intervals in the circumferential direction. Each support 22S includes a pair of protrusions 22P protruding frontward from the front surface of the front insulator 22. Each fusing terminal 26 is held between the pair of protrusions 22P and is thus supported by the support 22S.

The connection wire 29 is supported by the support 22S. The connection wire 29 is supported on the radially outer surface of the protrusion 22P. Each fusing terminal 26 held between the pair of protrusions 22P is connected to the connection wire 29. The connection wire 29 is located inside a bent portion of the fusing terminal 26. The fusing terminal 26 and the connection wire 29 are welded together. The fusing terminals 26 are thus connected to the connection wire 29.

The short-circuiting members 27 connect the fusing terminals 26 and the power lines 25. The short-circuiting members 27 conduct electricity. The short-circuiting members 27 are curved in a plane orthogonal to the rotation axis AX. The stator 20 includes multiple (three in the present embodiment) short-circuiting members 27. Each short-circuiting member 27 short-circuits a single power line 25 and a pair of fusing terminals 26. Each short-circuiting member 27 has an opening 27A receiving a front portion of the fusing terminal 26. Each fusing terminal 26 has the front portion received in the opening 27A and is thus connected to the short-circuiting member 27.

The insulating member 28 supports the power lines 25 and the short-circuiting members 27. The insulating member 28 is formed from a synthetic resin. The insulating member 28 includes a body 28A, screw bosses 28B, and a support 28C.

The body 28A is annular. In the present embodiment, the short-circuiting members 27 are at least partially located in the body 28A. The short-circuiting members 27 are fixed to the body 28A by insert molding. The fusing terminals 26 are supported on the body 28A with the short-circuiting members 27 in between. The body 28A insulates three short-circuiting members 27 from one another.

The screw bosses 28B protrude radially outward from the peripheral edge of the body 28A. Four screw bosses 28B are arranged on the peripheral edge of the body 28A.

The support 28C protrudes downward from a lower portion of the body 28A. The support 28C supports the power lines 25.

The power lines 25, the fusing terminals 26, the short-circuiting members 27, and the insulating member 28 are located frontward from the stator core 21. The fusing terminals 26 are located at least partially rearward from the short-circuiting members 27 and the insulating member 28.

Figure 6:
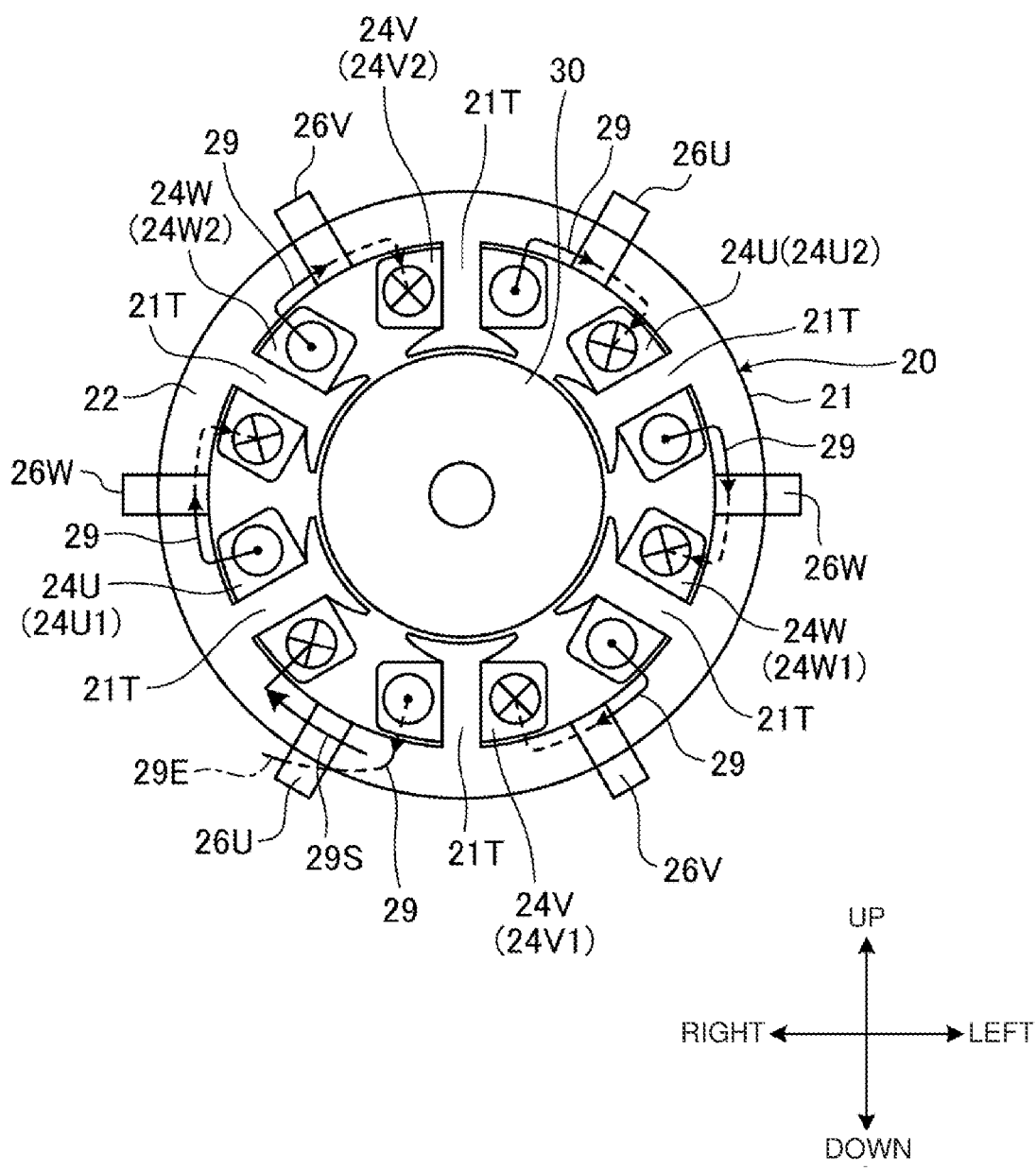
FIG. 6 is a schematic diagram of the stator in the first embodiment.
Figure 7:
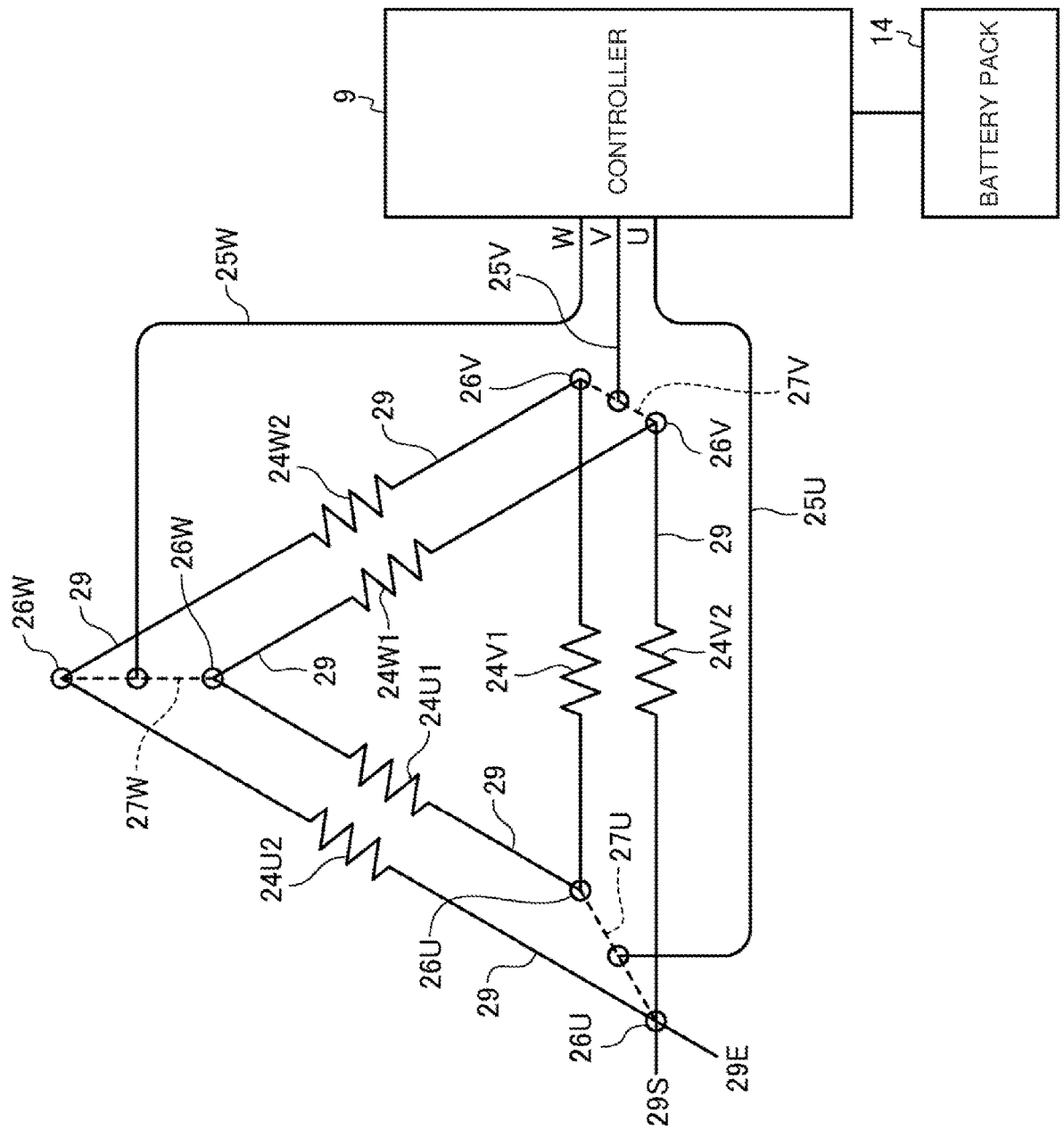
FIG. 7 is a schematic diagram of connected coils in the first embodiment.

FIG. 6 is a schematic diagram of the stator 20 in the present embodiment. FIG. 7 is a schematic diagram of the connected coils 24 in the present embodiment.

The six coils 24 are formed by winding a single wire in the present embodiment. As shown in FIGS. 6 and 7, the wire includes a wind start portion 29S first wound around one tooth 21T. The wire is sequentially wound around each of the teeth 21T adjacent in the circumferential direction to form the six coils 24. The wire includes a wind end portion 29E that is wound finally.

As shown in FIG. 7, the battery pack 14 supplies a drive current to the power lines 25 through the controller 9. The drive current supplied to the power lines 25 is fed to the fusing terminals 26 through the short-circuiting members 27. The drive current fed to the fusing terminals 26 are fed to the coils 24 through the connection wire 29.

In the present embodiment, the drive current includes a U-phase drive current, a V-phase drive current, and a W-phase drive current.

As shown in FIGS. 4 to 7, the power lines 25 include a U-phase power line 25U, a V-phase power line 25V, and a W-phase power line 25W. The U-phase power line 25U receives a U-phase drive current. The V-phase power line 25V receives a V-phase drive current. The W-phase power line 25W receives a W-phase drive current.

The short-circuiting members 27 include a U-phase short-circuiting member 27U, a V-phase short-circuiting member 27V, and a W-phase short-circuiting member 27W. The U-phase short-circuiting member 27U is connected to the U-phase power line 25U. The V-phase short-circuiting member 27V is connected to the V-phase power line 25V. The W-phase short-circuiting member 27W is connected to the W-phase power line 25W.

The fusing terminals 26 include a pair of U-phase fusing terminals 26U, a pair of V-phase fusing terminals 26V, and a pair of W-phase fusing terminals 26W. The pair of U-phase fusing terminals 26U are connected to the U-phase short-circuiting member 27U. The pair of V-phase fusing terminals 26V are connected to the V-phase short-circuiting member 27V. The pair of W-phase fusing terminals 26W are connected to the W-phase short-circuiting member 27W.

Each of the six coils 24 is assigned to one of a U- (U-V-) phase, a V- (V-W-) phase, and a W- (W-U-) phase.

Each pair of coils 24 is assigned to the U-phase, the V-phase, or the W-phase. The six coils 24 include a pair of U-phase coils 24U assigned to the U-phase, a pair of V-phase coils 24V assigned to the V-phase, and a pair of W-phase coils 24W assigned to the W-phase.

The pair of U-phase coils 24U (U-phase coils 24U1 and 24U2) face each other in the radial direction. The pair of V-phase coils 24V (V-phase coils 24V1 and 24V2) face each other in the radial direction. The pair of W-phase coils 24W (W-phase coils 24W1 and 24W2) face each other in the radial direction. As shown in FIG. 6, the V-phase coil 24V1 is located adjacent to the U-phase coil 24U1 in the circumferential direction. The W-phase coil 24W1 is located adjacent to the V-phase coil 24V1. The U-phase coil 24U2 is located adjacent to the W-phase coil 24W1. The V-phase coil 24V2 is located adjacent to the U-phase coil 24U2. The W-phase coil 24W2 is located adjacent to the V-phase coil 24V2.

As shown in FIG. 6, a first U-phase fusing terminal 26U is connected to the connection wire 29 connecting the U-phase coil 24U1 and V-phase coil 24V1 adjacent in the circumferential direction. A second U-phase fusing terminal 26U is connected to the connection wire 29 connecting the U-phase coil 24U2 and V-phase coil 24V2 adjacent in the circumferential direction.

A first V-phase fusing terminal 26V is connected to the connection wire 29 connecting the V-phase coil 24V1 and W-phase coil 24W1 adjacent in the circumferential direction. A second V-phase fusing terminal 26V is connected to the connection wire 29 connecting the V-phase coil 24V2 and W-phase coil 24W2 adjacent in the circumferential direction.

A first W-phase fusing terminal 26W is connected to the connection wire 29 connecting the W-phase coil 24W1 and U-phase coil 24U2 adjacent in the circumferential direction. A second W-phase fusing terminal 26W is connected to the connection wire 29 connecting the W-phase coil 24W2 and U-phase coil 24U1 adjacent in the circumferential direction.

The U-phase short-circuiting member 27U short-circuits the U-phase power line 25U and the two U-phase fusing terminals 26U. The U-phase power line 25U is located at one end of the U-phase short-circuiting member 27U. The first U-phase fusing terminal 26U is located at the other end of the U-phase short-circuiting member 27U. The second U-phase fusing terminal 26U is located in a middle portion of the U-phase short-circuiting member 27U.

The V-phase short-circuiting member 27V short-circuits the V-phase power line 25V and the two V-phase fusing terminals 26V. The V-phase power line 25V is located at one end of the V-phase short-circuiting member 27V. The first V-phase fusing terminal 26V is located at the other end of the V-phase short-circuiting member 27V. The second V-phase fusing terminal 26V is located in a middle portion of the V-phase short-circuiting member 27V.

The W-phase short-circuiting member 27W short-circuits the W-phase power line W and the two W-phase fusing terminals 26W. The W-phase power line 25W is located at one end of the W-phase short-circuiting member 27W. The first W-phase fusing terminal 26W is located at the other end of the W-phase short-circuiting member 27W. The second W-phase fusing terminal 26W is located in a middle portion of the W-phase short-circuiting member 27W.

As shown in FIG. 7, the U-phase coil 24U1, the V-phase coil 24V1, and the W-phase coil 24W1 in one set are delta-connected to one another. The U-phase coil 24U2, the V-phase coil 24V2, and the W-phase coil 24W2 in one set are delta-connected to one another. These delta-connections are arranged in parallel.

When receiving a U-phase drive current, the U-phase power line 25U feeds the U-phase drive current to each of the first and second U-phase fusing terminals 26U through the U-phase short-circuiting member 27U. When one U-phase coil 24U1 is magnetized to the N pole, the other U-phase coil 24U2 is magnetized to the S pole. The V-phase coil 24V1 adjacent to the U-phase coil 24U1 magnetized to the N pole is magnetized to the S pole. The V-phase coil 24V2 adjacent to the U-phase coil 24U2 magnetized to the S pole is magnetized to the N pole.

When receiving a V-phase drive current, the V-phase power line 25V feeds the V-phase drive current to each of the first and second V-phase fusing terminals 26V through the V-phase short-circuiting member 27V. When one V-phase coil 24V1 is magnetized to the N pole, the other V-phase coil 24V2 is magnetized to the S pole. The W-phase coil 24W1 adjacent to the V-phase coil 24V1 magnetized to the N pole is magnetized to the S pole. The W-phase coil 24W2 adjacent to the V-phase coil 24V2 magnetized to the S pole is magnetized to the N pole.

When receiving a W-phase drive current, the W-phase power line 25W feeds the W-phase drive current to each of the first and second W-phase fusing terminals 26W through the W-phase short-circuiting member 27W. When one W-phase coil 24W1 is magnetized to the N pole, the other W-phase coil 24W2 is magnetized to the S pole. The U-phase coil 24U2 adjacent to the W-phase coil 24W1 magnetized to the N pole is magnetized to the S pole. The U-phase coil 24U1 adjacent to the W-phase coil 24W2 magnetized to the S pole is magnetized to the N pole.

Sensor Board

The electric work machine 1 includes a sensor board 40. The sensor board 40 includes magnetic sensors 43 for detecting rotation of the rotor 301. The sensor board 40 is located frontward from the front insulator 22. The sensor board 40 faces the front insulator 22. The sensor board 40 includes a plate 41, screw bosses 42, the magnetic sensors 43, and signal lines 44.

The plate 41 is annular. Four screw bosses 42 protrude radially outward from the peripheral edge of the plate 41.

The magnetic sensors 43 detect rotation of the rotor 301. In the present embodiment, three magnetic sensors 43 are supported on the plate 41. The magnetic sensors 43 each include a Hall device.

The magnetic sensors 43 output detection signals to the controller 9 through the signal lines 44. The controller 9 provides a drive current to the multiple coils 24 based on the detection signals from the magnetic sensors 43.

Fastening of Insulating Member, Sensor Board, and Front Insulator

The insulating member 28 supporting the short-circuiting members 27, the sensor board 40, and the front insulator 22 are fastened together with four screws 18. The insulating member 28, the sensor board 40, and the front insulator 22 are fastened with the screws 18 to allow the signal lines 44 and at least parts of the power lines 25 to be aligned with each other in the circumferential direction.

Each screw boss 28B on the insulating member 28 has an opening 28D for receiving a middle portion of the corresponding screw 18. Each screw boss 42 on the sensor board 40 has an opening 45 for receiving a middle portion of the corresponding screw 18. The front insulator 22 has four threaded holes 22D in its front surface. With the middle portion of each screw 18 received in the corresponding opening 28D and opening 45, the distal end of the screw 18 is fastened into the corresponding threaded hole 22D. The insulating member 28, the sensor board 40, and the front insulator 22 are thus fastened with the screws 18.

Rotor

Figure 8:
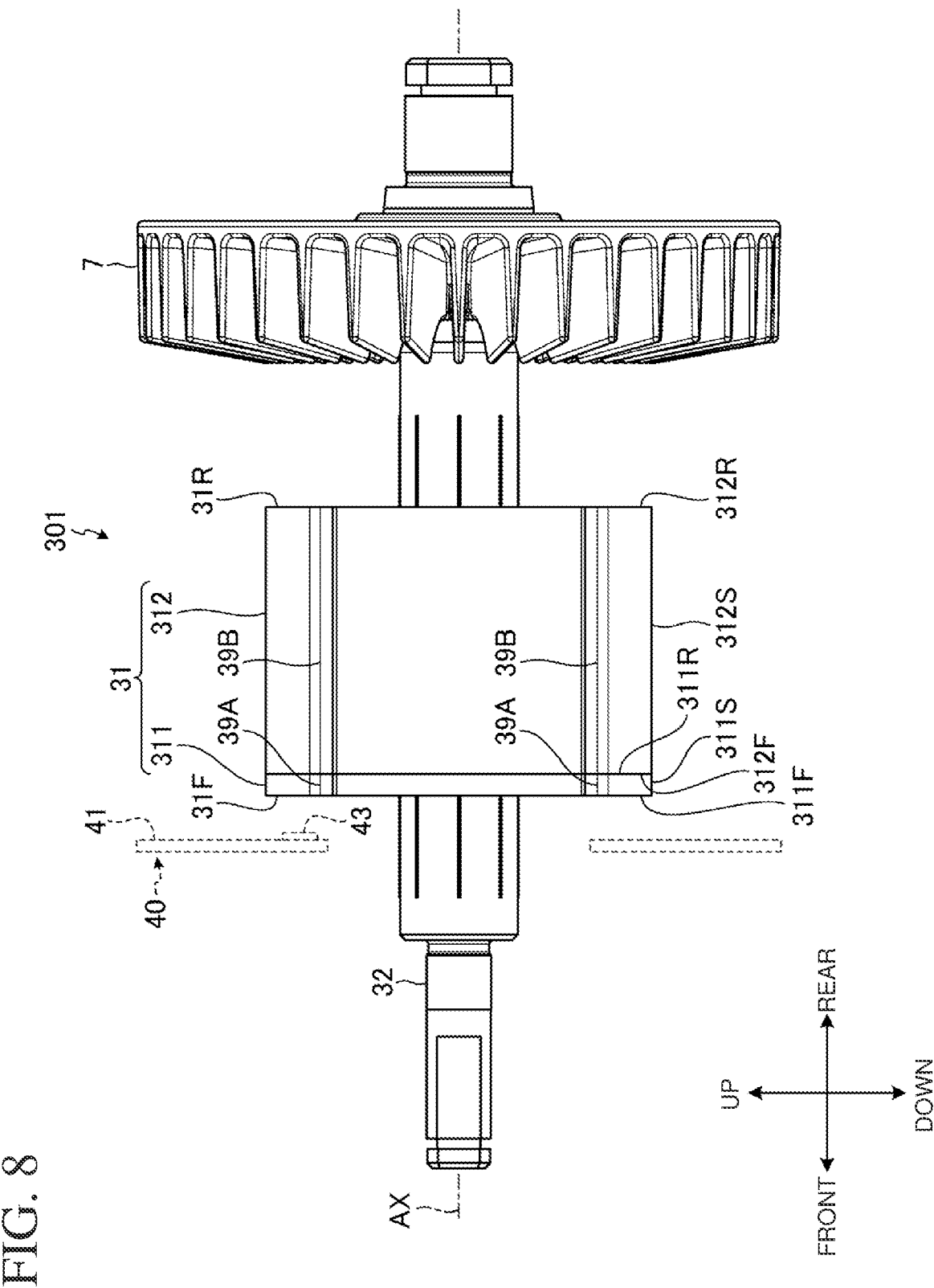
FIG. 8 is a left side view of the rotor in the first embodiment.
Figure 9:
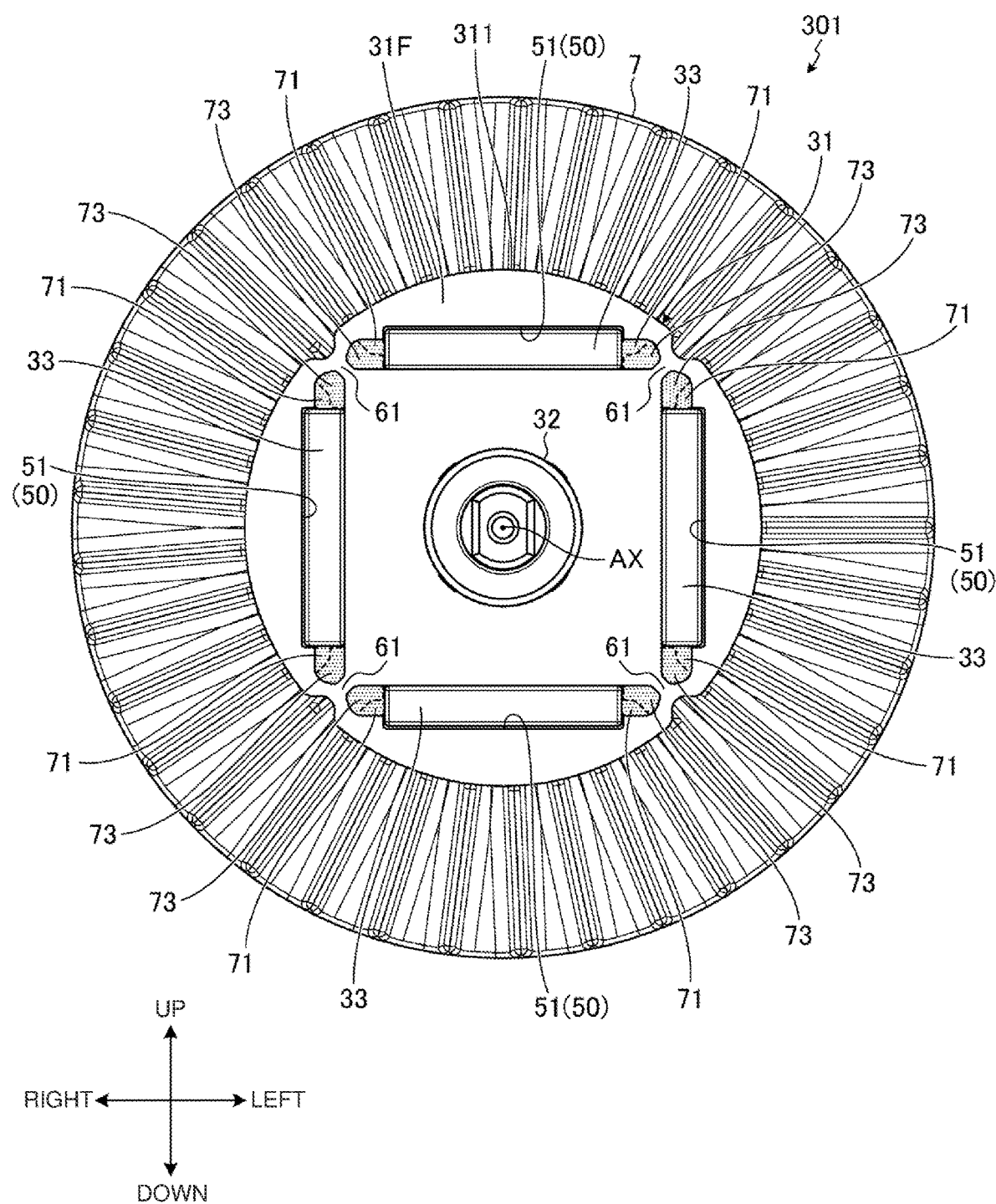
FIG. 9 is a front view of the rotor in the first embodiment.

FIG. 8 is a left side view of the rotor 301 in the present embodiment. FIG. 9 is a front view of the rotor 301 in the present embodiment.

As shown in FIGS. 2 to 5, 8, and 9, the rotor 301 includes a rotor core 31, a rotor shaft 32, and permanent magnets 33. The rotor 301 rotates about the rotation axis AX.

The rotor core 31 includes multiple steel plates stacked on one another. The steel plates are metal plates formed from iron as a main component. The rotor core 31 surrounds the rotation axis AX.

The rotor core 31 has a front end 31F and a rear end 31R. The front end 31F is a first end of the rotor core 31 in the axial direction. The rear end 31R is a second end of the rotor core 31 opposite to the first end in the axial direction.

The rotor shaft 32 extends in the axial direction. The rotor shaft 32 is located inward from the rotor core 31. The rotor core 31 is fixed to the rotor shaft 32. The rotor shaft 32 has a front portion protruding frontward from the front end 31F of the rotor core 31. The rotor shaft 32 has a rear portion protruding rearward from the rear end 31R of the rotor core 31. The rotor shaft 32 has the front portion rotatably supported by a front bearing (not shown). The rotor shaft 32 has the rear portion rotatably supported by a rear bearing (not shown). The rotor shaft 32 has its front end connected to the reducer described above.

The permanent magnets 33 are held by the rotor core 31. The permanent magnets 33 in the present embodiment are located inside the rotor core 31. The motor 601 is an interior permanent magnet (IPM) motor. In the present embodiment, four permanent magnets 33 surround the rotation axis AX. The permanent magnets 33 are fixed to the rotor core 31.

The permanent magnets 33 are neodymium-iron-boron magnets. Each permanent magnet 33 has remanence of 1.0 to 1.5 T inclusive.

The sensor board 40 is located frontward from the rotor core 31. As shown in FIG. 8, the plate 41 in the sensor board 40 surrounds the front portion of the rotor shaft 32. The magnetic sensors 43 are supported on the plate 41. The magnetic sensors 43 face the front end 31F of the rotor core 31. The magnetic sensors 43 facing the front end 31F of the rotor core 31 detect rotation of the rotor 301. The magnetic sensors 43 detect the magnetic flux of the permanent magnets 33 to detect the position of the rotor 301 in the rotation direction.

The fan 7 is located rearward from the rotor core 31. The fan 7 is fixed to the rear portion of the rotor shaft 32. The fan 7 at least partially faces the rear end 31R of the rotor core 31. As the rotor shaft 32 rotates, the fan 7 rotates together with the rotor shaft 32.

The rotor core 31 in the present embodiment includes a first core 311 and a second core 312. The first core 311 has the front end 31F. The second core 312 has the rear end 31R. The second core 312 is adjacent to the first core 311 in the axial direction. The second core 312 is located rearward from the first core 311.

Figure 10:
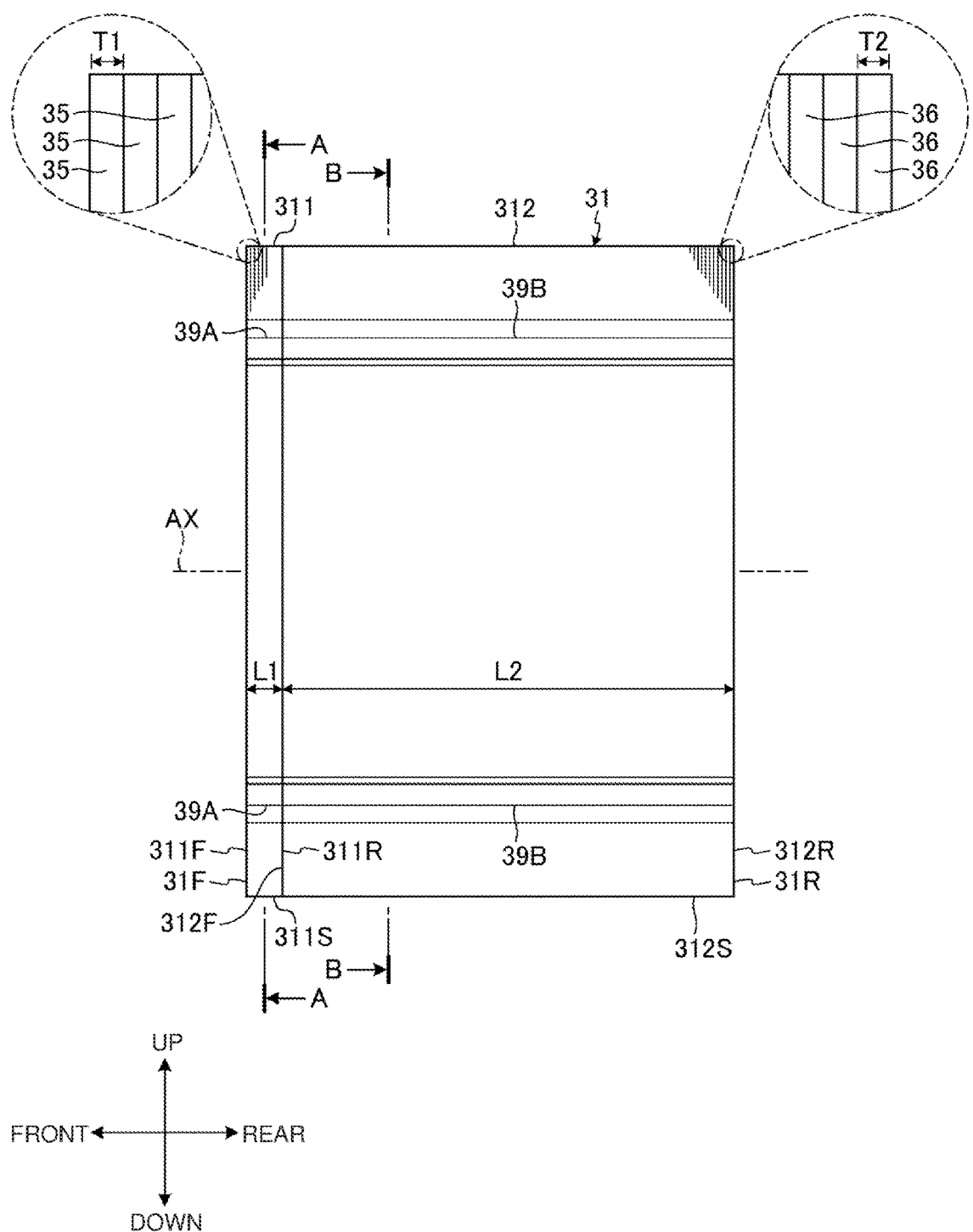
FIG. 10 is a left view of a rotor core in the first embodiment.

FIG. 10 is a left view of the rotor core 31 in the present embodiment. As shown in FIG. 10, the first core 311 includes multiple first steel plates 35 stacked on one another. The first steel plates 35 are stacked in the axial direction. The stacked first steel plates 35 are joined together by clinching to form the first core 311.

The second core 312 includes multiple second steel plates 36 stacked on one another. The second steel plates 36 are stacked in the axial direction. The stacked second steel plates 36 are joined together by clinching to form the second core 312.

The first core 311 and the second core 312 are joined to form the rotor core 31. The stacked first steel plates 35 and the stacked second steel plates 36 may be joined together by clinching to form the rotor core 31.

The first steel plates 35 each have an equal thickness T1. The second steel plates 36 each have an equal thickness T2. The thickness T1 of each first steel plate 35 is equal to the thickness T2 of each second steel plate 36. The thickness T1 of each first steel plate 35 refers to the axial dimension of each first steel plate 35. The thickness T2 of each second steel plate 36 refers to the axial dimension of each second steel plate 36.

The thickness T1 of each first steel plate 35 and the thickness T2 of each second steel plate 36 are, for example, 0.30 to 0.40 mm inclusive. In the present embodiment, the thickness T1 of each first steel plate 35 and the thickness T2 of each second steel plate 36 are 0.35 mm.

In the axial direction, the first core 311 has a dimension L1 smaller than a dimension L2 of the second core 312. The dimension L1 of the first core 311 is, for example, 1.0 to 2.0 mm inclusive. The dimension L2 of the second core 312 is, for example, greater than or equal to 3.0 mm.

The first steel plates 35 each have an equal outer shape. The first steel plates 35 each have an equal diameter. The second steel plates 36 each have an equal outer shape. The second steel plates 36 each have an equal diameter. The first steel plate 35 and the second steel plate 36 are equal in outer shape. The first steel plate 35 and the second steel plate 36 are equal in diameter.

The outer shape of the first steel plate 35 refers to the shape of the outer edge of the first steel plate 35 in a plane orthogonal to the rotation axis AX. The outer shape of the second steel plate 36 refers to the shape of the outer edge of the second steel plate 36 in a plane orthogonal to the rotation axis AX. The diameter of the first steel plate 35 refers to the maximum diameter of the first steel plate 35. The diameter of the second steel plate 36 refers to the maximum diameter of the second steel plate 36.

Figure 11:
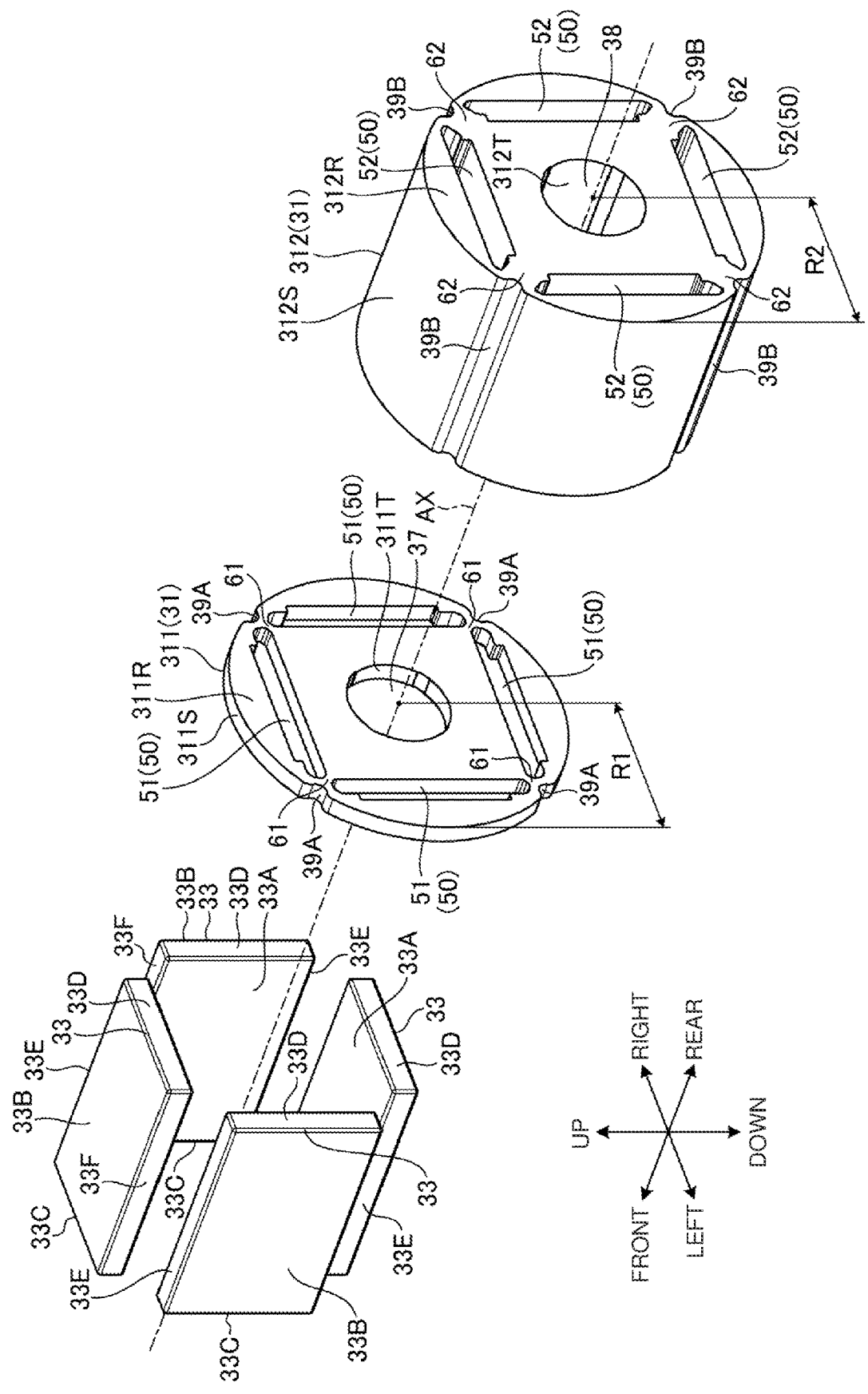
FIG. 11 is an exploded perspective view of the rotor core and permanent magnets in the first embodiment as viewed from the rear.
Figure 12:
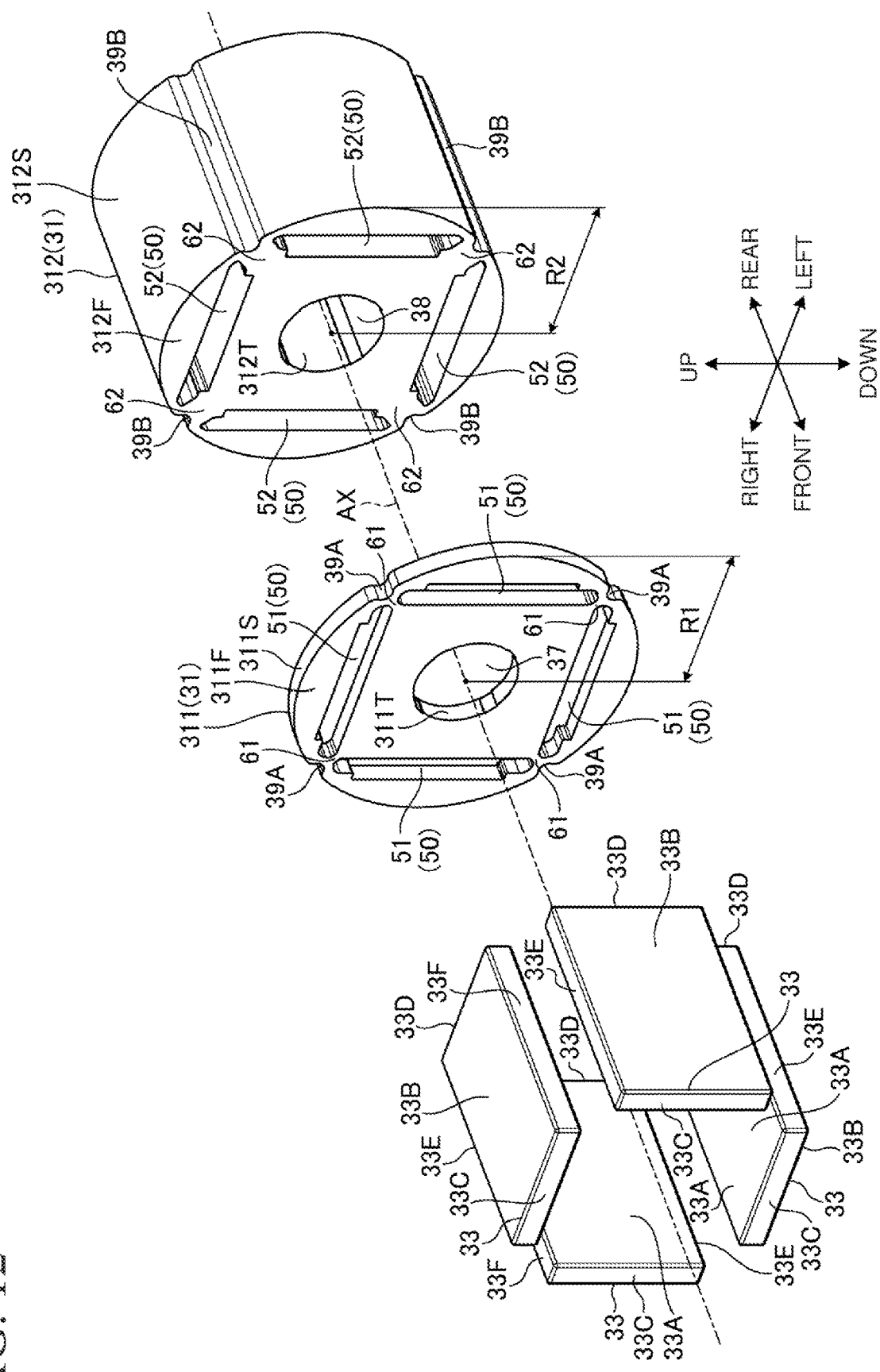
FIG. 12 is an exploded perspective view of the rotor core and the permanent magnets in the first embodiment as viewed from the front.

FIG. 11 is an exploded perspective view of the rotor core 31 and the permanent magnets 33 in the present embodiment as viewed from the rear. FIG. 12 is an exploded perspective view of the rotor core 31 and the permanent magnets 33 in the present embodiment as viewed from the front.

As shown in FIGS. 10 to 12, the first core 311 surrounds the rotation axis AX. The second core 312 surrounds the rotation axis AX.

The first core 311 has a front surface 311F, a rear surface 311R, an outer surface 311S, and an inner surface 311T. The front surface 311F is substantially annular. The rear surface 311R is substantially annular. The outer surface 311S connects the outer edge of the front surface 311F and the outer edge of the rear surface 311R. The inner surface 311T connects the inner edge of the front surface 311F and the inner edge of the rear surface 311R. The first core 311 has an opening 37 in its center. The opening 37 extends through the front surface 311F and the rear surface 311R of the first core 311 in the axial direction. The inner surface 311T of the first core 311 defines the inner surface of the opening 37. The front end 31F of the rotor core 31 includes the front surface 311F of the first core 311.

The second core 312 has a front surface 312F, a rear surface 312R, an outer surface 312S, and an inner surface 312T. The front surface 312F is substantially annular. The rear surface 312R is substantially annular. The outer surface 312S connects the outer edge of the front surface 312F and the outer edge of the rear surface 312R. The inner surface 312T connects the inner edge of the front surface 312F and the inner edge of the rear surface 312R. The second core 312 has an opening 38 in its center. The opening 38 extends through the front surface 312F and the rear surface 312R of the second core 312 in the axial direction. The inner surface 312T of the second core 312 defines the inner surface of the opening 38. The rear end 31R of the rotor core 31 includes the rear surface 312R of the second core 312.

The rotation axis AX extends through the center of the first core 311. The rotation axis AX extends through the center of the second core 312. In the radial direction, a distance R1 from the rotation axis AX to the outer surface 311S of the first core 311 corresponds to the radius of the first core 311. In the radial direction, a distance R2 from the rotation axis AX to the outer surface 312S of the second core 312 corresponds to the radius of the second core 312. The distance R1 is equal to the distance R2.

The distance R1 and the distance R2 are, for example, 15 to 20 mm inclusive. In the present embodiment, the distance R1 and the distance R2 are 18 mm.

The first core 311 and the second core 312 are equal in outer shape. The outer shape of the first core 311 refers to the shape of the outer edge of the first core 311 in a plane orthogonal to the rotation axis AX. The outer shape of the second core 312 refers to the shape of the outer edge of the second core 312 in a plane orthogonal to the rotation axis AX.

The first core 311 has recesses 39A on the outer surface 311S. Each recess 39A extends in the axial direction. The recess 39A has its front end connecting to the front surface 311F of the first core 311. The recess 39A has its rear end connecting to the rear surface 311R of the first core 311. Multiple recesses 39A are located on the outer surface 311S. The multiple (four in the present embodiment) recesses 39A are located at equal intervals in the circumferential direction about the rotation axis AX.

The second core 312 has recesses 39B on the outer surface 312S. Each recess 39B extends in the axial direction. The recess 39B has its front end connecting to the front surface 312F of the second core 312. The recess 39B has its rear end connecting to the rear surface 312R of the second core 312. Multiple recesses 39B are located on the outer surface 312S. The multiple (four in the present embodiment) recesses 39B are located at equal intervals in the circumferential direction about the rotation axis AX.

The recesses 39A and 39B reduce noise resulting from rotation of the rotor core 31. Either or both of the recesses 39A and the recesses 39B may be eliminated.

The first core 311 and the second core 312 are connected to each other with the rear surface 311R of the first core 311 in contact with the front surface 312F of the second core 312. The first core 311 and the second core 312 are connected to each other with the multiple recesses 39A connected to the corresponding recesses 39B.

The first core 311 has multiple (four in the present embodiment) first slots 51. The multiple (four in the present embodiment) first slots 51 are located at intervals in the circumferential direction. The second core 312 has multiple second slots 52. The multiple second slots 52 are located at intervals in the circumferential direction. The first slots 51 and the second slots 52 are equal in number.

The first slots 51 are located at intervals in the circumferential direction about the rotation axis AX. The first slots 51 extend through the front surface 311F and the rear surface 311R of the first core 311.

The second slots 52 are located at intervals about the rotation axis AX. The second slots 52 extend through the front surface 312F and the rear surface 312R of the second core 312.

The permanent magnets 33 are received in the respective first slots 51 and the respective second slots 52. Multiple (four in the present embodiment) permanent magnets 33 surround the rotation axis AX. Each permanent magnet 33 is a rectangular plate elongated in the axial direction.

Each permanent magnet 33 has an inner surface 33A, an outer surface 33B, a front surface 33C, a rear surface 33D, a first side surface 33E, and a second side surface 33F. The inner surface 33A faces radially inward. The outer surface 33B faces radially outward. The front surface 33C faces frontward. The rear surface 33D faces rearward. The first side surface 33E faces in the first circumferential direction. The second side surface 33F faces in the second circumferential direction.

The first core 311 and the second core 312 are connected to each other with each first slot 51 at least partially overlapping the corresponding second slot 52. Each first slot 51 and the corresponding second slot 52 at least partially overlapping the first slot define a single magnet slot 50. In the present embodiment, four magnet slots 50 are located in the rotor core 31. The magnet slots 50 each receive a single permanent magnet 33.

Figure 13:
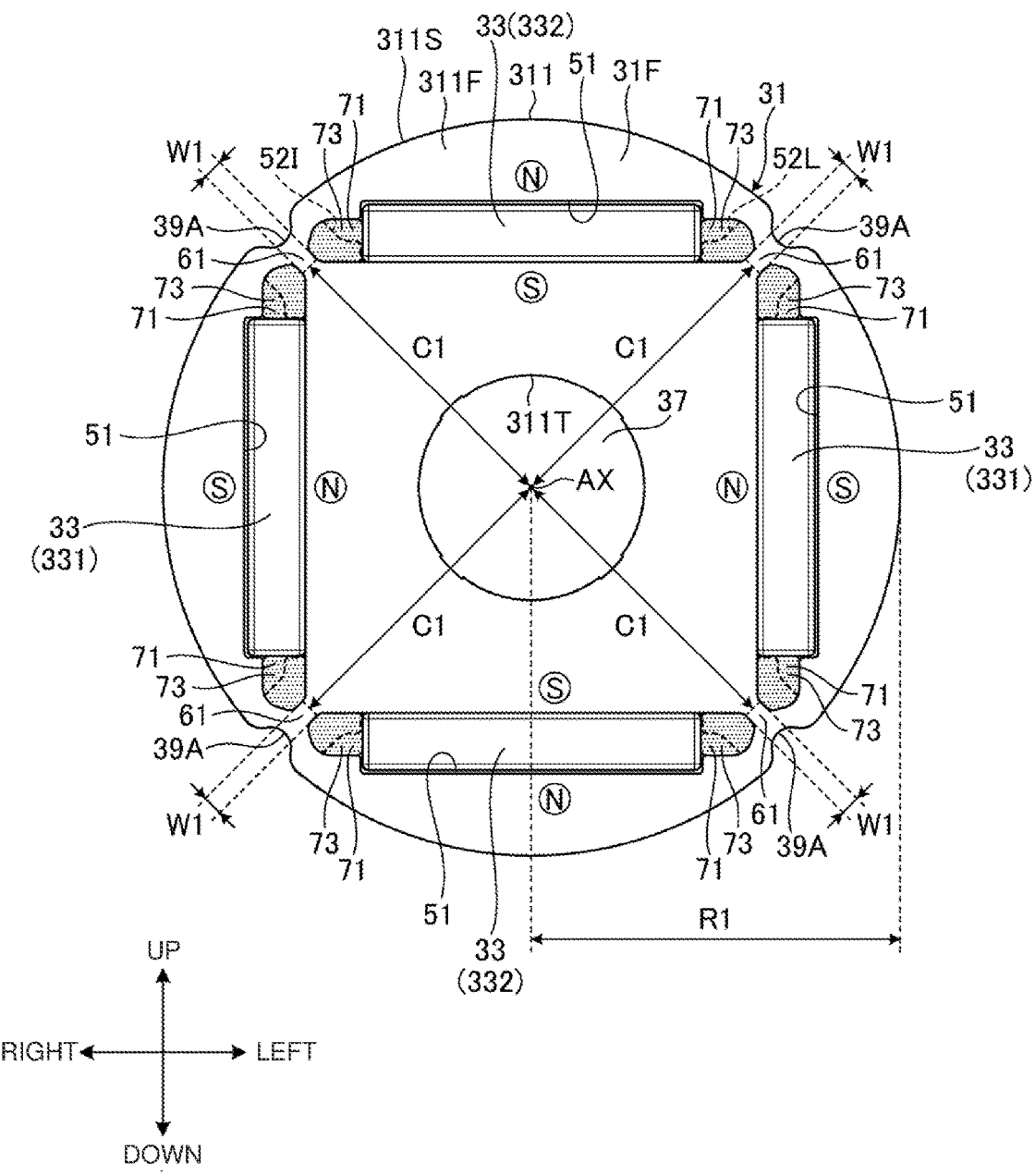
FIG. 13 is a front view of the rotor core in the first embodiment.

FIG. 13 is a front view of the rotor core 31 in the present embodiment. As shown in FIG. 13, the first slots 51 are located at equal intervals in the circumferential direction. The first slots 51 are equal in shape in a plane orthogonal to the rotation axis AX. The first slots 51 are equal in dimension in a plane orthogonal to the rotation axis AX.

The first core 311 includes first portions 61 each located between first slots 51 adjacent in the circumferential direction. In the circumferential direction, each first portion 61 has a dimension W1.

Multiple first portions 61 are located at equal intervals in the circumferential direction. The first portions 61 each have an equal dimension W1.

In the radial direction, a distance C1 refers to the distance from the rotation axis AX to the first portion 61. The rotation axis AX has an equal distance C1 to each of the first portions 61.

Figure 14:
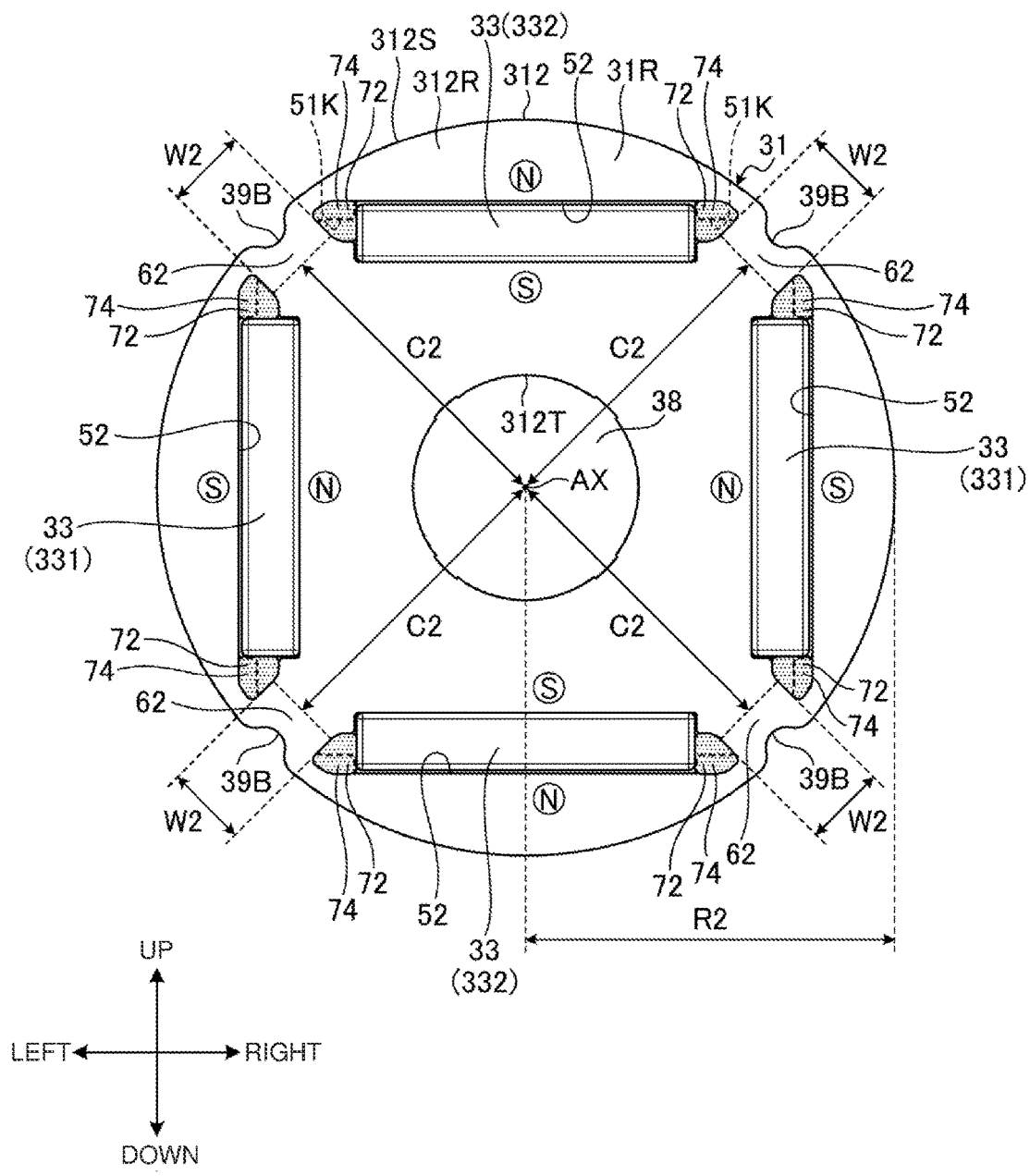
FIG. 14 is a rear view of the rotor core in the first embodiment.

FIG. 14 is a rear view of the rotor core 31 in the present embodiment. As shown in FIG. 14, the second slots 52 are located at equal intervals in the circumferential direction. The second slots 52 are equal in shape in a plane orthogonal to the rotation axis AX. The second slots 52 are equal in dimension in a plane orthogonal to the rotation axis AX.

The second core 312 includes second portions 62 each located between second slots 52 adjacent in the circumferential direction. In the circumferential direction, each second portion 62 has a dimension W2.

Multiple second portions 62 are located at equal intervals in the circumferential direction. The second portions 62 each have an equal dimension W2.

In the radial direction, a distance C2 refers to the distance from the rotation axis AX to the second portion 62. The rotation axis AX has an equal distance C2 to each of the second portions 62.

As shown in FIGS. 13 and 14, the first portions 61 and the second portions 62 are equal in number. In present embodiment, four first portions 61 and four second portions 62 are located in the circumferential direction.

In the circumferential direction, the first portion 61 has the dimension W1 smaller than the dimension W2 of the second portion 62.

The first portion 61 has the dimension W1 of 0.2 to 1.0 mm inclusive. The second portion 62 has the dimension W2 of 2.0 to 10.0 mm inclusive.

The rotation axis AX has the distance C1 to each first portion 61 being equal to the distance C2 from the rotation axis AC to each second portion 62.

As shown in FIG. 13, the surface of each permanent magnet 33 in the corresponding first slot 51 and at least a part of the inner surface of the first slot 51 define a first space 71 between them. The first space 71 in the present embodiment faces the first side surface 33E or the second side surface 33F. The first space 71 receives a first resin portion 73.

As shown in FIG. 14, the surface of each permanent magnet 33 in the corresponding second slot 52 and at least a part of the inner surface of the second slot 52 define a second space 72 between them. The second space 72 in the present embodiment faces the first side surface 33E or the second side surface 33F. The second space 72 receives a second resin portion 74.

The permanent magnets 33 include first permanent magnets 331 and second permanent magnets 332. The first permanent magnets 331 each have the S pole facing radially outward. The second permanent magnets 332 each have the N pole facing radially outward. The first permanent magnets 331 and the second permanent magnets 332 are arranged alternately in the circumferential direction. The four permanent magnets 33 surround the rotation axis AX. The permanent magnets 33 include two first permanent magnets 331 and two second permanent magnets 332.

Figure 15:
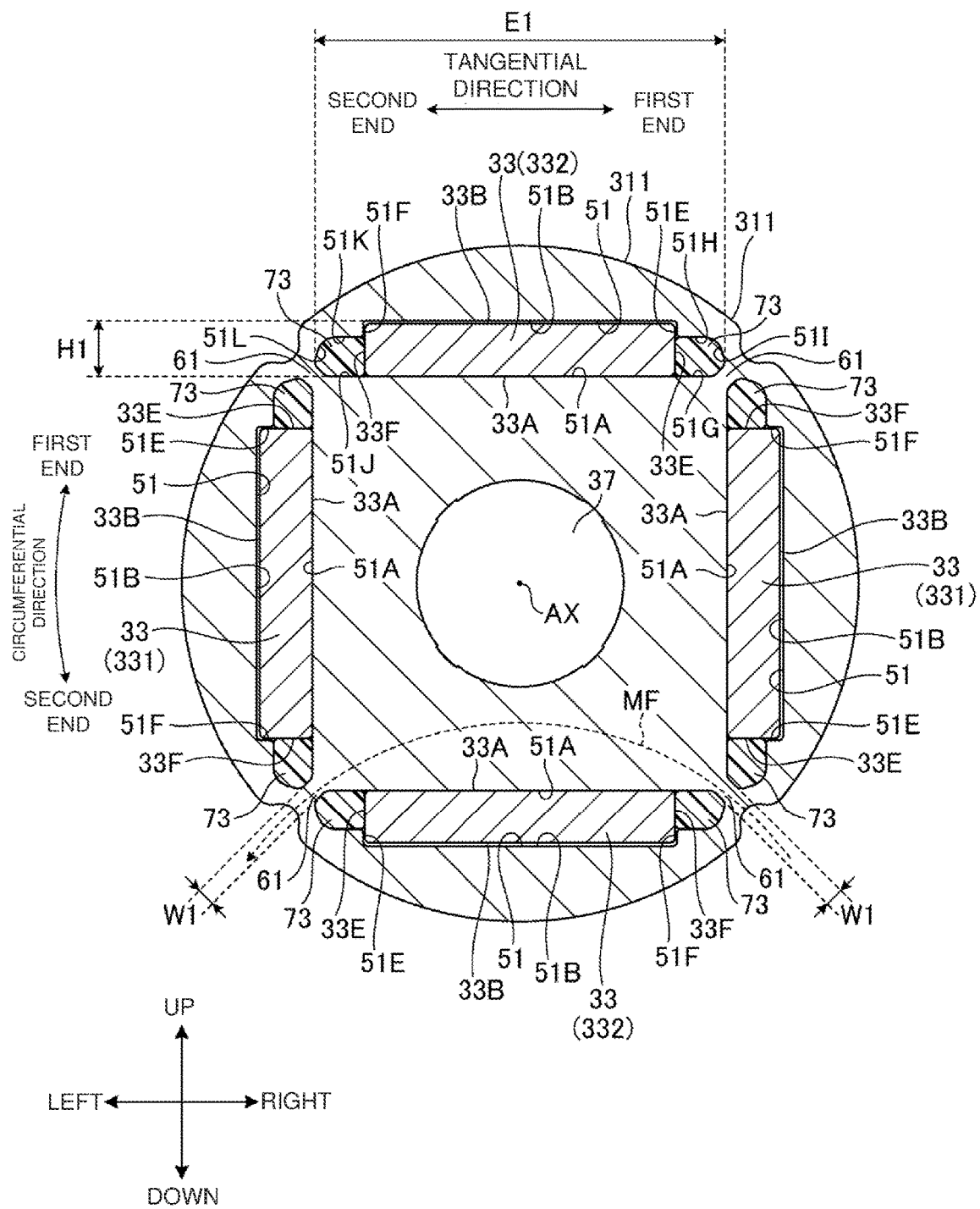
FIG. 15 is a cross-sectional view of a first core in the first embodiment.
Figure 16:
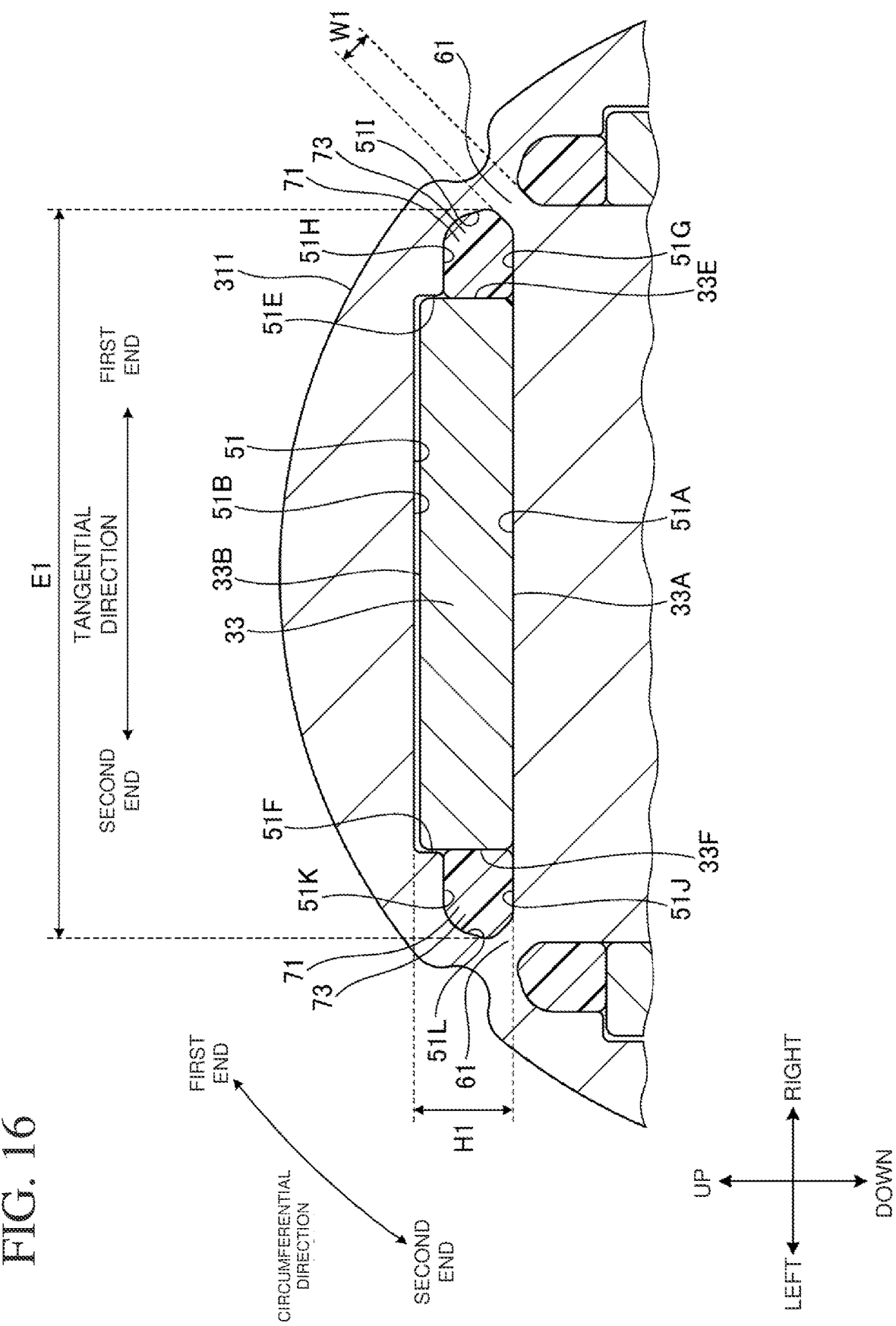
FIG. 16 is a partially enlarged cross-sectional view of the first core in the first embodiment.

FIG. 15 is a cross-sectional view of the first core 311 in the present embodiment, taken along line A-A in FIG. 10 as viewed in the direction indicated by arrows. FIG. 16 is a partially enlarged cross-sectional view of the first core 311 in the present embodiment. As shown in FIGS. 15 and 16, the inner surface of each first slot 51 includes a first support surface 51A, a second support surface 51B, a third support surface 51E, a fourth support surface 51F, a first extension surface 51G, a first facing surface 51H, a first connecting surface 51I, a second extension surface 51J, a second facing surface 51K, and a second connecting surface 51L.

The first support surface 51A faces radially outward. The first support surface 51A is parallel to a tangent of an imaginary circle with the rotation axis AX at the center. The first support surface 51A faces the inner surface 33A of the permanent magnet 33.

The second support surface 51B faces radially inward. The second support surface 51B is parallel to a tangent of an imaginary circle with the rotation axis AX at the center. The second support surface 51B faces the outer surface 33B of the permanent magnet 33.

The third support surface 51E faces in the second tangential direction. The third support surface 51E connects to one end of the second support surface 51B in the first tangential direction. The third support surface 51E faces a radially outer portion of the first side surface 33E of the permanent magnet 33.

The fourth support surface 51F faces in the first tangential direction. The fourth support surface 51F connects to the other end of the second support surface 51B in the second tangential direction. The fourth support surface 51F faces a radially outer portion of the second side surface 33F of the permanent magnet 33.

The permanent magnet 33 is supported by the first support surface 51A, the second support surface 51B, the third support surface 51E, and the fourth support surface 51F.

The first extension surface 51G faces radially outward. The first extension surface 51G extends in the first tangential direction from one end of the first support surface 51A. The first facing surface 51H faces radially inward. The first facing surface 51H faces at least a portion of the first extension surface 51G. The first facing surface 51H connects to a radially inner end of the third support surface 51E.

The first connecting surface 51I connects an end of the first extension surface 51G in the first tangential direction and an end of the first facing surface 51H in the first tangential direction.

The second extension surface 51J faces radially outward. The second extension surface 51J extends in the second tangential direction from the other end of the first support surface 51A.

The second facing surface 51K faces radially inward. The second facing surface 51K faces at least a portion of the second extension surface 51J. The second facing surface 51K connects to a radially inner end of the fourth support surface 51F.

The second connecting surface 51L connects an end of the second extension surface 51J in the second tangential direction and an end of the second facing surface 51K in the second tangential direction.

In each first slot 51, one first space 71 is defined by the first side surface 33E of the permanent magnet 33, the first extension surface 51G, the first facing surface 51H, and the first connecting surface 51I. The other first space 71 is defined by the second side surface 33F of the permanent magnet 33, the second extension surface 51J, the second facing surface 51K, and the second connecting surface 51L.

The first space 71 receiving the first resin portion 73 reduces movement of the permanent magnet 33 inside the magnet slot 50. The first resin portion 73 may be located between the outer surface 33B of the permanent magnet 33 and the second support surface 51B of the first slot 51. This firmly fixes the permanent magnet 33 to the rotor core 31.

Figure 17:
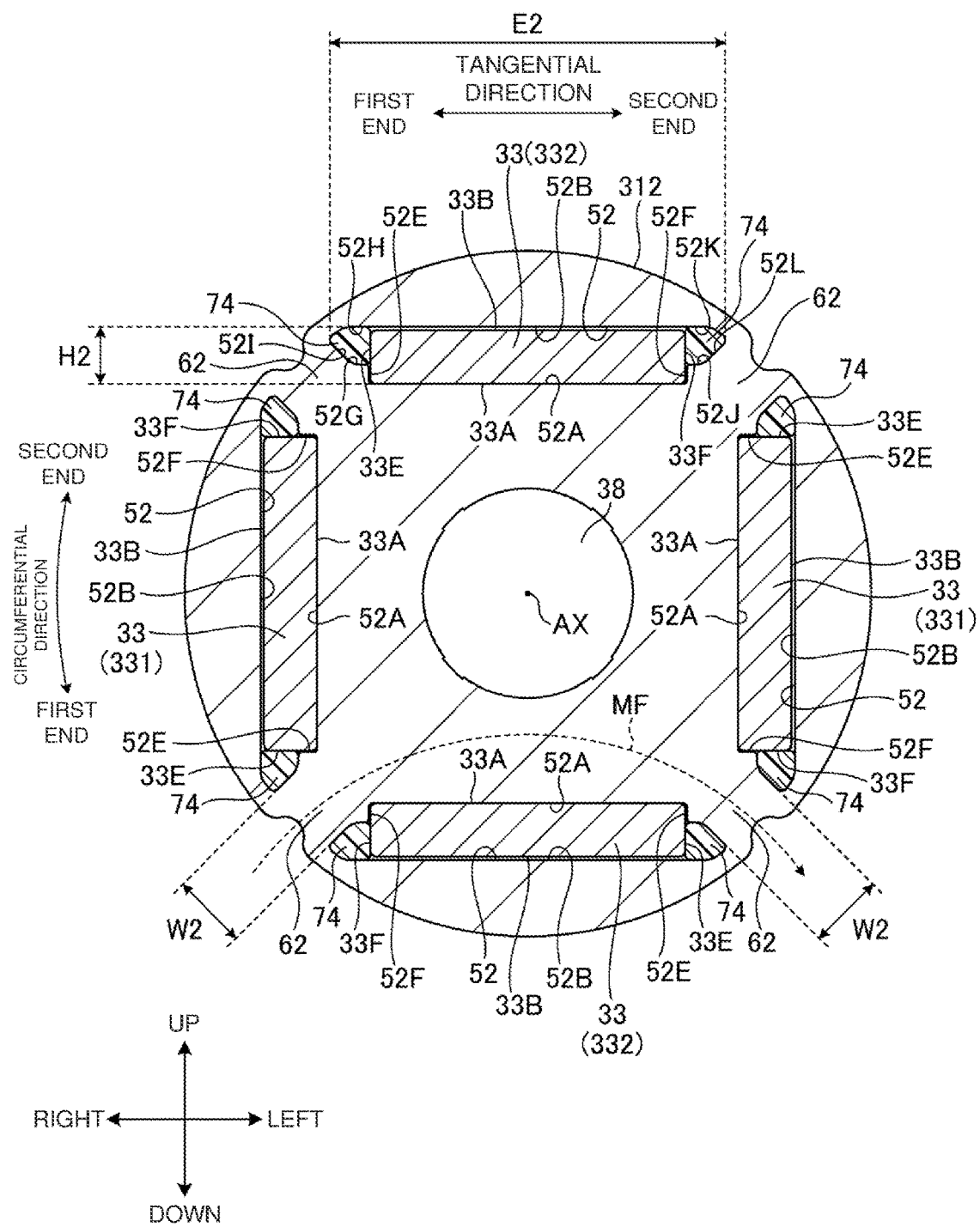
FIG. 17 is a cross-sectional view of a second core in the first embodiment.
Figure 18:
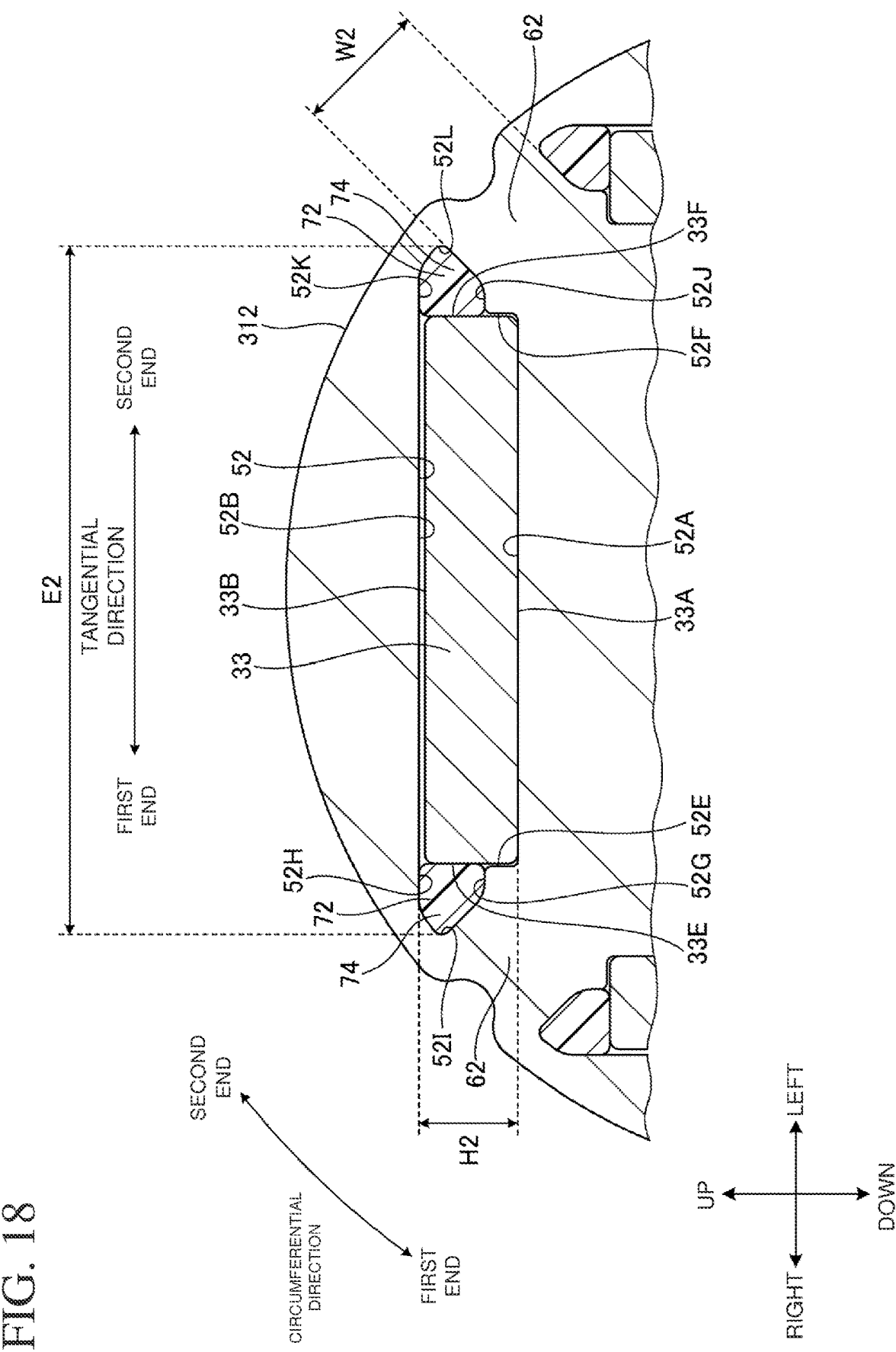
FIG. 18 is a partially enlarged cross-sectional view of the second core in the first embodiment.

FIG. 17 is a cross-sectional view of the second core 312 in the present embodiment, taken along line B-B in FIG. 10 as viewed in the direction indicated by arrows. FIG. 18 is a partially enlarged cross-sectional view of the second core 312 in the present embodiment.

As shown in FIGS. 17 and 18, the inner surface of each second slot 52 includes a fifth support surface 52A, a sixth support surface 52B, a seventh support surface 52E, an eighth support surface 52F, a third extension surface 52H, a third facing surface 52G, a third connecting surface 52I, a fourth extension surface 52K, a fourth facing surface 52J, and a fourth connecting surface 52L.

The fifth support surface 52A faces radially outward. The fifth support surface 52A is parallel to a tangent of an imaginary circle with the rotation axis AX at the center. The fifth support surface 52A faces the inner surface 33A of the permanent magnet 33.

The sixth support surface 52B faces radially inward. The sixth support surface 52B is parallel to a tangent of an imaginary circle with the rotation axis AX at the center. The sixth support surface 52B faces the outer surface 33B of the permanent magnet 33.

The seventh support surface 52E faces in the second tangential direction. The seventh support surface 52E connects to one end of the fifth support surface 52A in the first tangential direction. The seventh support surface 52E faces a radially inner portion of the first side surface 33E of the permanent magnet 33.

The eighth support surface 52F faces in the first tangential direction. The eighth support surface 52F connects to the other end of the fifth support surface 52A in the second tangential direction. The eighth support surface 52F faces a radially inner portion of the second side surface 33F of the permanent magnet 33.

The permanent magnet 33 is supported by the fifth support surface 52A, the sixth support surface 52B, the seventh support surface 52E, and the eighth support surface 52F.

The third extension surface 52H faces radially inward. The third extension surface 52H extends in the first tangential direction from one end of the sixth support surface 52B.

The third facing surface 52G faces radially outward. The third facing surface 52G faces at least a portion of the third extension surface 52H. The third facing surface 52G connects to a radially outer end of the seventh support surface 52E.

The third connecting surface 52I connects an end of the third extension surface 52H in the first tangential direction and an end of the third facing surface 52G in the first tangential direction.

The fourth extension surface 52K faces radially inward. The fourth extension surface 52K extends in the second tangential direction from the other end of the sixth support surface 52B.

The fourth facing surface 52J faces radially outward. The fourth facing surface 52J faces at least a portion of the fourth extension surface 52K. The fourth facing surface 52J connects to a radially outer end of the eighth support surface 52F.

The fourth connecting surface 52L connects an end of the fourth extension surface 52K in the second tangential direction and an end of the fourth facing surface 52J in the second tangential direction.

In each second slot 52, one second space 72 is defined by the first side surface 33E of the permanent magnet 33, the third extension surface 52H, the third facing surface 52G, and the third connecting surface 52I. The other second space 72 is defined by the second side surface 33F of the permanent magnet 33, the fourth extension surface 52K, the fourth facing surface 52J, and the fourth connecting surface 52L.

The second space 72 receiving the second resin portion 74 reduces movement of the permanent magnet 33 inside the magnet slot 50. The second resin portion 74 may be located between the outer surface 33B of the permanent magnet 33 and the sixth support surface 52B of the second slot 52. This firmly fixes the permanent magnet 33 to the rotor core 31.

In the tangential direction, the first slot 51 has a dimension E1 greater than a dimension E2 of the second slot 52.

In the radial direction, the first slot 51 has a dimension H1 equal to a dimension H2 of the second slot 52. The dimension H1 refers to a radial distance between the first support surface 51A and the second support surface 51B. The dimension H2 refers to a radial distance between the fifth support surface 52A and the sixth support surface 52B.

The first core 311 and the second core 312 are connected to each other with the center of each first slot 51 aligned with the center of the corresponding second slot 52 in the tangential or circumferential direction. The first core 311 and the second core 312 are also connected to each other with the center of each first slot 51 aligned with the center of the corresponding second slot 52 in the radial direction.

With the first core 311 and the second core 312 connected to each other, the first support surface 51A connects to the fifth support surface 52A, and the second support surface 51B connects to the sixth support surface 52B. The first support surface 51A is flush with the fifth support surface 52A. The second support surface 51B is flush with the sixth support surface 52B. The third support surface 51E is located radially outward from the seventh support surface 52E. The fourth support surface 51F is located radially outward from the eighth support surface 52F. With the first core 311 and the second core 312 connected to each other, the first space 71 at least partially overlap the second space 72. The second space 72 is at least partially located radially outward from the first space 71.

Operation

The operation of the motor 601 will now be described. In response to an operation on the trigger switch 10, a drive current is supplied from the battery pack 14 to the coils 24 in the stator 20 through the controller 9. This generates a rotating magnetic field in the stator 20, and a magnetic flux flows to the rotor core 31 as indicated by arrow MF in FIGS. 15 and 17. The rotating magnetic field generated in the stator 20 causes the rotor 301 to rotate about the rotation axis AX.

The motor 601 generates magnetic torque and reluctance torque. Magnetic torque refers to the torque generated by the attractive force or the repulsive force between the rotating magnetic field in the stator 20 and the permanent magnets 33 in the rotor 301. Reluctance torque refers to the torque generated by the attractive force between the rotating magnetic field in the stator 20 and the rotor core 31 in the rotor 301. The torque generated by the motor 601 is composite torque of the magnetic torque and the reluctance torque.

More permanent magnets 33 generate larger torque. Fewer permanent magnets 33 generate smaller torque. A larger magnetic flux path in the rotor core 31 generates larger reluctance torque. A smaller magnetic flux path in the rotor core 31 generates smaller reluctance torque.

As shown in FIGS. 15 and 17, the first portions 61 and the second portions 62 define magnetic flux paths in the rotor core 31. In the present embodiment, each second portion 62 has the dimension W2 greater than the dimension W1 of the first portion 61. In other words, the magnetic flux path in the second core 312 is larger than the magnetic flux path in the first core 311. The second core 312 generates larger reluctance torque than the first core 311 relative to the stator 20.

The second core 312 includes the second portions 62 as the magnetic flux paths each having a greater dimension W2. The motor 601 can thus generate predetermined composite torque with fewer permanent magnets 33. Fewer permanent magnets 33 reduce the production cost of the motor 601.

The magnetic sensors 43 detect the rotation of the rotor 301 by detecting the switching of the magnetic poles between the first permanent magnets 331 and the second permanent magnets 332 as the rotor 301 rotates. In other words, the magnetic sensors 43 detect the direction of the magnetic field that changes in accordance with the rotation of the rotor 301. The first permanent magnets 331 each have the S pole facing radially outward as described above. The second permanent magnets 332 each have the N pole facing radially outward.

As the rotor 301 rotates, the magnetic pole of the permanent magnet 33 at the shortest distance from the corresponding magnetic sensor 43 switches between the S pole of the first permanent magnet 331 and the N pole of the second permanent magnet 332. The direction of the magnetic field switching from the S pole of the first permanent magnet 331 to the N pole of the second permanent magnet 332 is different from the direction of the magnetic field switching from the N pole of the second permanent magnet 332 to the S pole of the first permanent magnet 331. The magnetic sensor 43 thus detects the direction of the magnetic field changing in accordance with the rotation of the rotor 301 to detect the switching of the magnetic poles (the S pole or the N pole) of the corresponding permanent magnet 33 as the rotor 301 rotates. The magnetic sensor 43 thus detects the rotation of the rotor 301.

In the rotor core 31 including a larger magnetic flux path, the magnetic flux may leak from the rotor core 31 and may disable the magnetic sensors 43 from correctly detecting the switching of the magnetic poles of the permanent magnets 33 as the rotor 301 rotates. This may reduce the detection accuracy of the rotation of the rotor 301.

In the present embodiment, the first portion 61 has the dimension W1 smaller than the dimension W2 of the second portion 62. In other words, the first core 311 includes the magnetic flux path smaller than the magnetic flux path in the second core 312. The first core 311 generates smaller reluctance torque than the second core 312 relative to the stator 20.

The first core 311 includes the first portions 61 as the magnetic flux paths each having a smaller dimension W1. This reduces the magnetic flux leaking from the rotor core 31. This allows the magnetic sensors 43 to be less susceptible to the magnetic flux leaking from the rotor core 31. The magnetic sensors 43 can thus correctly detect the switching of the magnetic poles of the permanent magnets 33 as the rotor 301 rotates. The detection accuracy of the rotation of the rotor 301 is thus less likely to be reduced.

Figure 19:
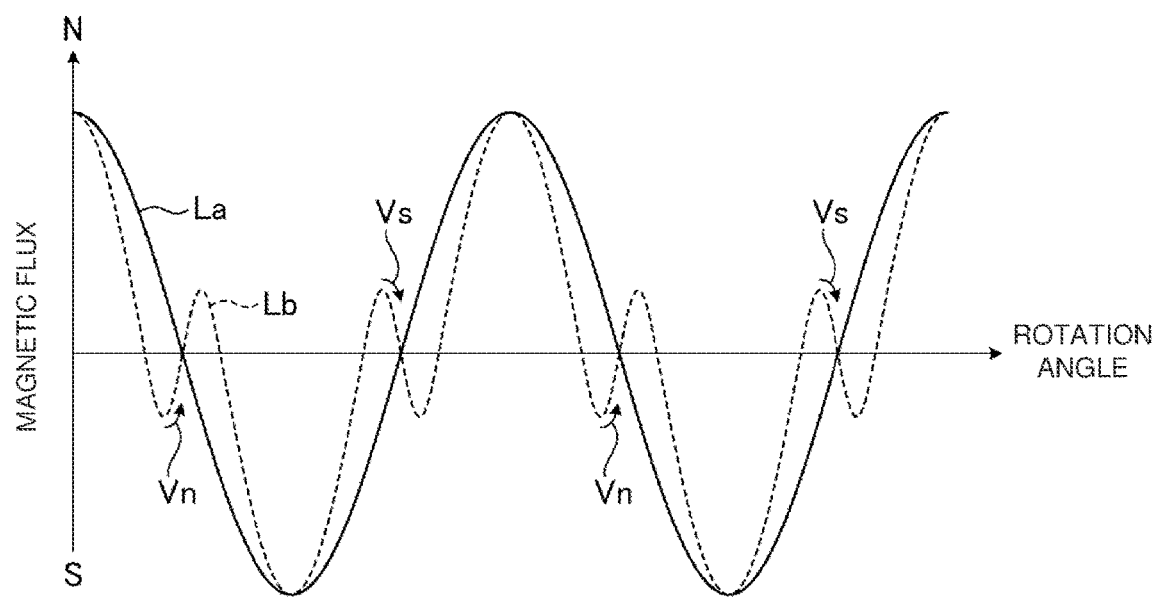
FIG. 19 is a graph showing the relationship between the size of magnetic flux paths in the rotor core, the magnetic flux detected by a magnetic sensor, and the rotation angle of the rotor.

FIG. 19 is a graph showing the relationship between the size of the magnetic flux path in the rotor core 31, the magnetic flux detected by the magnetic sensor 43, and the rotation angle of the rotor 301. FIG. 19 shows the magnetic flux detected by a single magnetic sensor 43 per rotation of the rotor 301.

In FIG. 19, line La represents the magnetic flux detected by the magnetic sensor 43 with the rotor core 31 including a smaller magnetic flux path. Line Lb represents the magnetic flux detected by the magnetic sensor 43 in the rotor core 31 including a larger magnetic flux path.

The magnetic sensor 43 detects the direction of the magnetic field that changes in accordance with the rotation of the rotor 301. With the rotor core 31 including a larger magnetic flux path, as indicated by line Lb, when the magnetic pole of the permanent magnet 33 detected by the magnetic sensor 43 switches from the N pole to the S pole, a magnetic field may be generated in the direction opposite to the direction of the magnetic field resulting from the permanent magnet 33, as indicated by arrows Vn, due to the magnetic flux leaking from the rotor core 31. Similarly, when the magnetic pole of the permanent magnet 33 detected by the magnetic sensor 43 switches from the S pole to the N pole, a magnetic field may be generated in the direction opposite to the direction of the magnetic field resulting from the permanent magnet 33, as indicated by arrows Vs, due to the magnetic flux leaking from the rotor core 31. In other words, with the rotor core 31 including a larger magnetic flux path, the direction of the magnetic field changes, at a position of detection by the magnetic sensor 43, the number of times greater than the number of permanent magnets 33 per rotation of the rotor 301. The magnetic sensor 43 may not correctly detect the switching of the magnetic poles of the permanent magnet 33. The position of detection by the magnetic sensor 43 includes a position facing the magnetic sensor 43.

In the present embodiment, the dimension W1 of the first portion 61 of the first core 311 is determined to cause the direction of the magnetic field to change, at a position of detection by the magnetic sensor 43, the number of times equal to the number of permanent magnets 33 per rotation of the rotor 301. Four permanent magnets 33 are used in the present embodiment. As indicated by line La, the dimension W1 of the first portion 61 is determined to cause the direction of the magnetic field to change four times per rotation of the rotor 301. In other words, the dimension W1 of the first portion 61 is determined to cause no magnetic field to be generated in the direction opposite to the direction of the magnetic field resulting from the permanent magnet 33. The detection accuracy of the rotation of the rotor 301 is thus less likely to be reduced.

As described above, the rotor core 31 in the present embodiment includes the first core 311 including the front end 31F and the second core 312 adjacent to the first core 311 in the axial direction. The magnetic sensors 43 face the first core 311. The first core 311 includes the first portions 61 located between the first slots 51 adjacent in the circumferential direction. The second core 312 includes the second portions 62 located between the second slots 52 adjacent in the circumferential direction. The first portions 61 define the magnetic flux paths in the first core 311. The second portions 62 define the magnetic flux paths in the second core 312. In the circumferential direction, the first portion 61 has the dimension W1 smaller than the dimension W2 of the second portion 62. The first core 311 facing the magnetic sensors 43 includes smaller magnetic flux paths, reducing the magnetic flux leaking from the rotor core 31 to the magnetic sensors 43. The magnetic sensors 43 can thus correctly detect the switching of the magnetic poles of the permanent magnets 33 per rotation of the rotor 301. The detection accuracy of the rotation of the rotor 301 is thus less likely to be reduced.

The second portion 62 has the dimension W2 greater than the dimension W1 of the first portion 61. The second core 312 with larger magnetic flux paths generates large reluctance torque. This reduces generation of insufficient reluctance torque. In some embodiments, the motor 601 may generate a predetermined level of composite torque with fewer permanent magnets 33. The use of fewer permanent magnets 33 reduces the production cost of the motor 601.

The multiple first portions 61 are located in the circumferential direction. The first portions 61 each have an equal dimension W1. The magnetic sensors 43 can thus correctly detect the switching of the magnetic poles of the permanent magnets 33 per rotation of the rotor 301.

The multiple second portions 62 are located in the circumferential direction. The second portions 62 each have an equal dimension W2. The reluctance torque is thus generated uniformly per rotation of the rotor 301.

Each magnetic sensor 43 detects the direction of the magnetic field that changes in accordance with the rotation of the rotor 301. As described with reference to FIG. 19, the dimension W1 of the first portion 61 is determined to cause the direction of the magnetic field to change the number of times equal to the number of permanent magnets 33 per rotation of the rotor 301. The magnetic sensors 43 can thus correctly detect the switching of the magnetic poles of the permanent magnets 33 as the rotor 301 rotates.

The first portion 61 has the dimension W1 of 0.2 to 1.0 mm inclusive. This causes the direction of the magnetic field to change the number of times equal to the number of permanent magnets 33 per rotation of the rotor 301. The permanent magnets 33 are neodymium-iron-boron magnets in the present embodiment. With the permanent magnet 33 having remanence of 1.0 to 1.5 T inclusive, the direction of the magnetic field may be more likely to change the number of times equal to the number of permanent magnets 33 per rotation of the rotor 301 when the dimension W1 is 0.2 to 1.0 mm inclusive.

The second portion 62 has the dimension W2 of 2.0 to 10.0 mm inclusive. This generates sufficient reluctance torque. The permanent magnets 33 are neodymium-iron-boron magnets in the present embodiment. With the permanent magnet 33 having remanence of 1.0 to 1.5 T inclusive, sufficient reluctance torque is likely to be generated when the dimension W2 is 2.0 to 10.0 mm inclusive. A permanent magnet 33 formed from a material different from a neodymium-iron-boron magnet but having remanence greater than or equal to the remanence of the neodymium-iron-boron magnet may have the dimension W2 of 2.0 to 10.0 mm inclusive. The permanent magnet 33 is then likely to generate sufficient reluctance torque.

The first slots 51 and the second slots 52 are equal in number. Each first slot 51 and the corresponding second slot 52 at least partially overlapping the first slot 51 define a single magnet slot 50. The magnet slots 50 each receive a single permanent magnet 33. This facilitates smooth placement of the permanent magnets 33 in the respective magnet slots 50.

The first core 311 and the second core 312 are connected to each other with the center of each first slot 51 aligned with the center of the corresponding second slot 52. This improves the weight balance of the rotor 301 and allows smooth rotation of the rotor 301. This also facilitates smooth placement of the permanent magnets 33 in the respective magnet slots 50.

In the radial direction, the first slot 51 has the dimension H1 equal to the dimension H2 of the second slot 52. This stably positions the rectangular permanent magnets 33 elongated in the axial direction in the respective first slots 51 and the respective second slots 52.

The surface of each permanent magnet 33 and at least a part of the inner surface of the first slot 51 define the first space 71 between them. The surface of each permanent magnet 33 and at least a part of the inner surface of the second slot 52 define the second space 72 between them. This reduces the likelihood of short-circuiting between the magnetic flux of the permanent magnets 33 and the magnetic flux passing through the rotor core 31, as indicated by arrows MF in FIGS. 15 and 17.

The first space 71 receives the first resin portion 73. The second space 72 receives the second resin portion 74. This reduces movement of the permanent magnet 33 inside the magnet slot 50.

The first slots 51 are equal in shape and in dimension. The second slots 52 are equal in shape and in dimension. This improves the weight balance of the rotor 301 and allows smooth rotation of the rotor 301.

In the axial direction, the first core 311 has the dimension L1 smaller than the dimension L2 of the second core 312. The second core 312 having the dimension L2 smaller than the dimension L1 of the first core 311 may generate insufficient reluctance torque. The first core 311 having a smaller dimension L1 can reduce generation of a magnetic field in a direction opposite to the direction of the magnetic field resulting from the permanent magnet 33. The first core 311 having the dimension L1 smaller than the dimension L2 of the second core 312 can reduce a decrease in the detection accuracy of the rotation of the rotor 301 while avoiding generation of insufficient reluctance torque.

The first core 311 has the dimension L1 of 1.0 to 2.0 mm inclusive. The first core 311 having the dimension L1 less than 1.0 mm cannot sufficiently reduce generation of a magnetic field in a direction opposite to the direction of the magnetic field resulting from the permanent magnets 33. The first core 311 having the dimension L1 greater than 2.0 mm cannot effectively reduce generation of a magnetic field in a direction opposite to the direction of the magnetic field resulting from the permanent magnets 33. The first core 311 having the dimension L1 of 1.0 to 2.0 mm inclusive can reduce a decrease in the detection accuracy of the rotation of the rotor 301 while avoiding generation of insufficient reluctance torque.

In the radial direction, the rotation axis AX has an equal distance C1 to each of the first portions 61. In the radial direction, the rotation axis AX has an equal distance C2 to each of the second portions 62. This improves the weight balance of the rotor 301 and allows smooth rotation of the rotor 301. The rotation axis AX has an equal distance C1 to each of the first portions 61. This reduces variation in signals detected by the magnetic sensors 43.

In the radial direction, the rotation axis AX has the distance C1 to each first portion 61 being equal to the distance C2 from the rotation axis AX to each second portion 62. This improves the weight balance of the rotor 301 and allows smooth rotation of the rotor 301.

In the radial direction, the distance R1 from the rotation axis AX to the outer surface 311S of the first core 311 is equal to the distance R2 from the rotation axis AX to the outer surface 312S of the second core 312. This allows the rotor core 31 located inward from the stator 20 to rotate smoothly.

The first core 311 and the second core 312 are equal in outer shape. This allows the rotor core 31 located inward from the stator 20 to rotate smoothly.

The first core 311 includes the multiple first steel plates 35 stacked on one another. The second core 312 includes the multiple second steel plates 36 stacked on one another. The first steel plate 35 and the second steel plate 36 are equal in shape and have the thickness T1 and the thickness T2 equal to each other. This reduces the production cost of the rotor core 31.

Other Embodiments

Figure 20:
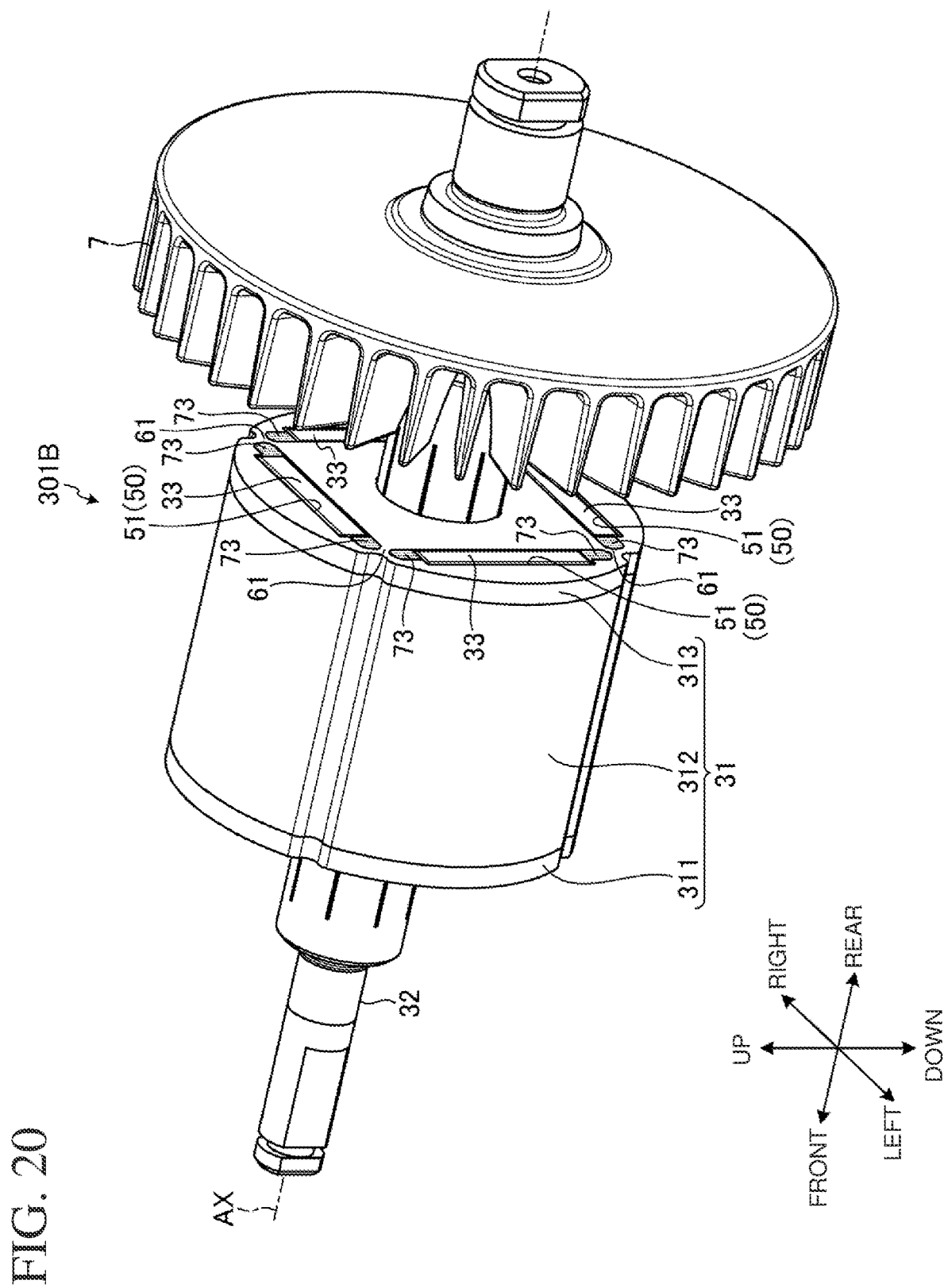
FIG. 20 is a perspective view of a rotor in another example of the first embodiment as viewed from the rear.

FIG. 20 is a perspective view of a rotor 301B in another example of the present embodiment as viewed from the rear. As shown in FIG. 20, the rotor core 31 includes the first core 311, the second core 312, and a third core 313. The first core 311 includes the front end 31F of the rotor core 31. The third core 313 includes the rear end 31R of the rotor core 31. In the axial direction, the second core 312 is located between the first core 311 and the third core 313.

The third core 313 and the first core 311 are equal in shape. The third core 313 and the first core 311 are equal in dimension. In other words, the first core 311 and the third core 313 are identical.

In the example shown in FIG. 20, for example, the rotor core 31 may be axially reversed and fixed to the rotor shaft 32 to produce the same rotor 301. The productivity of the rotor 301 is less likely to decrease.

Second Embodiment

A second embodiment will now be described. The same or corresponding components as those in the above embodiment are given the same reference numerals herein, and will be described briefly or will not be described.

Electric Work Machine

Figure 21:
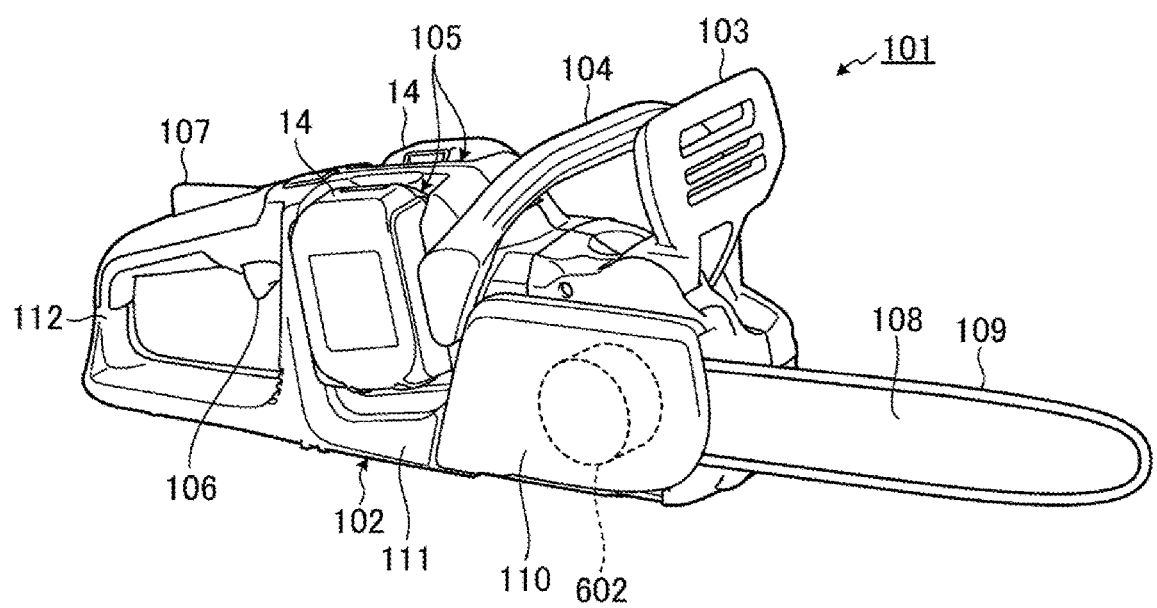
FIG. 21 is a perspective view of an electric work machine according to a second embodiment.

FIG. 21 is a perspective view of an electric work machine 101 according to the present embodiment. The electric work machine 101 according to the present embodiment is a chain saw as an example of outdoor power equipment.

The electric work machine 101 includes a housing 102, a hand guard 103, a first grip 104, a battery mount 105, a motor 602, a trigger switch 106, a trigger lock lever 107, a guide bar 108, and a saw chain 109.

The housing 102 is formed from a synthetic resin. The housing 102 includes a motor compartment 110, a battery holder 111, and a second grip 112.

The motor compartment 110 accommodates the motor 602. The battery holder 111 is connected to the motor compartment 110. The battery holder 111 includes the battery mount 105 to which the battery pack 14 is attached. The battery holder 111 accommodates the controller 9. The second grip 112 is connected to the battery holder 111. The trigger switch 106 and the trigger lock lever 107 are located in the second grip 112. The trigger lock lever 107 is operable to allow an operation of the trigger switch 106.

The guide bar 108 is supported by the housing 102. The guide bar 108 is a plate. The saw chain 109 includes multiple cutters that are connected to one another. The saw chain 109 is located along the peripheral edge of the guide bar 108. In response to an operation on the trigger switch 106, the motor 602 is driven. The motor 602 and the saw chain 109 are connected with a power transmission (not shown) including a sprocket. The motor 602 is driven, and the saw chain 109 moves around the peripheral edge of the guide bar 108.

The sprocket is directly fixed to a rotor shaft 32 in the motor 602. More specifically, the motor 602 in the present embodiment drives the saw chain 109 with a direct drive system. A reducer is not located between the motor 602 and the sprocket. A reducer may be included. The reducer allows the saw chain 109 to drive with higher torque.

The first grip 104 is formed from a synthetic resin. The first grip 104 is grippable by the operator of the electric work machine 101. The first grip 104 is a pipe. The first grip 104 connects to the battery holder 111. The first grip 104 has one end and the other end both connected to a surface of the battery holder 111.

Rotor

Figure 22:
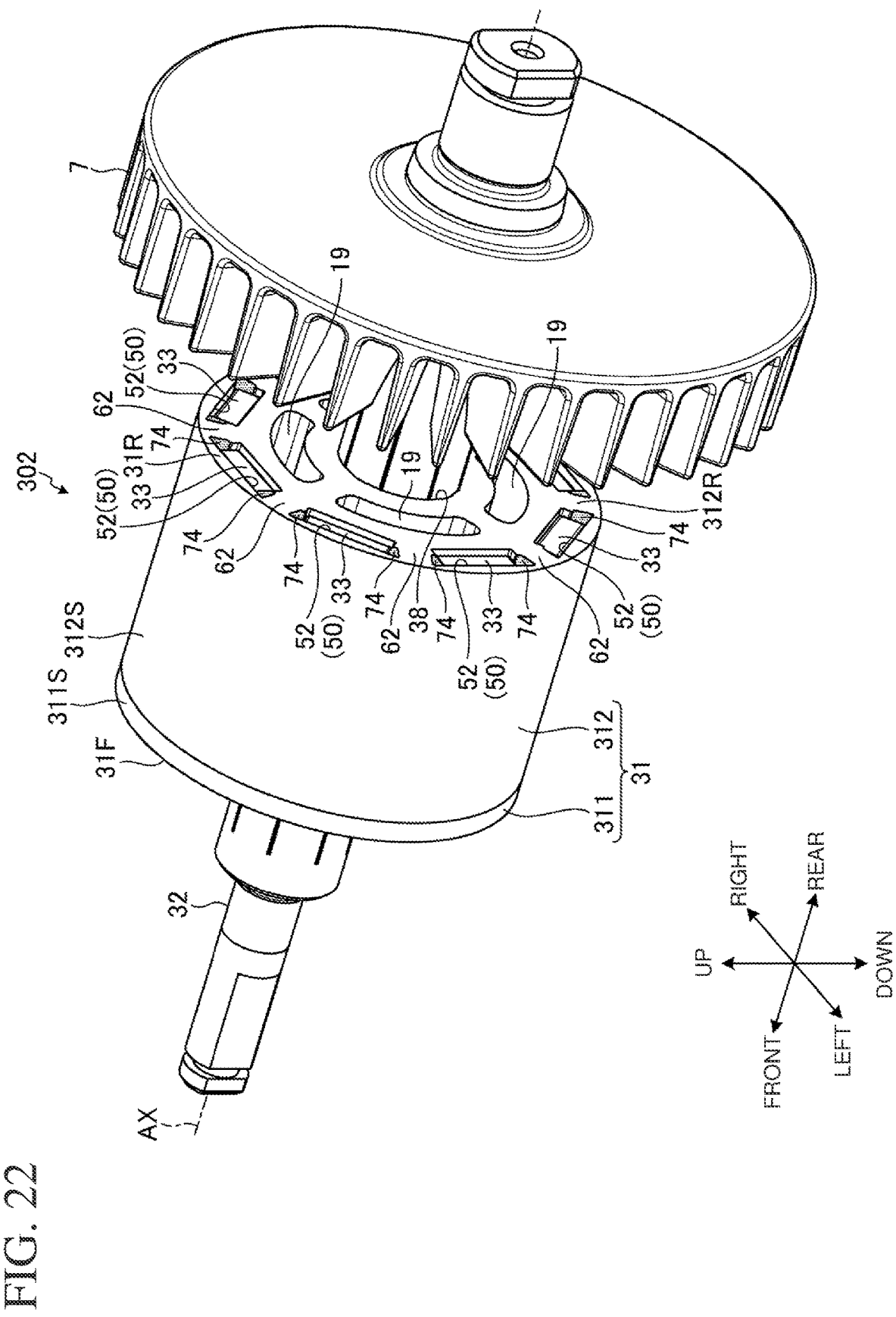
FIG. 22 is a perspective view of a rotor in the second embodiment as viewed from the rear.
Figure 23:
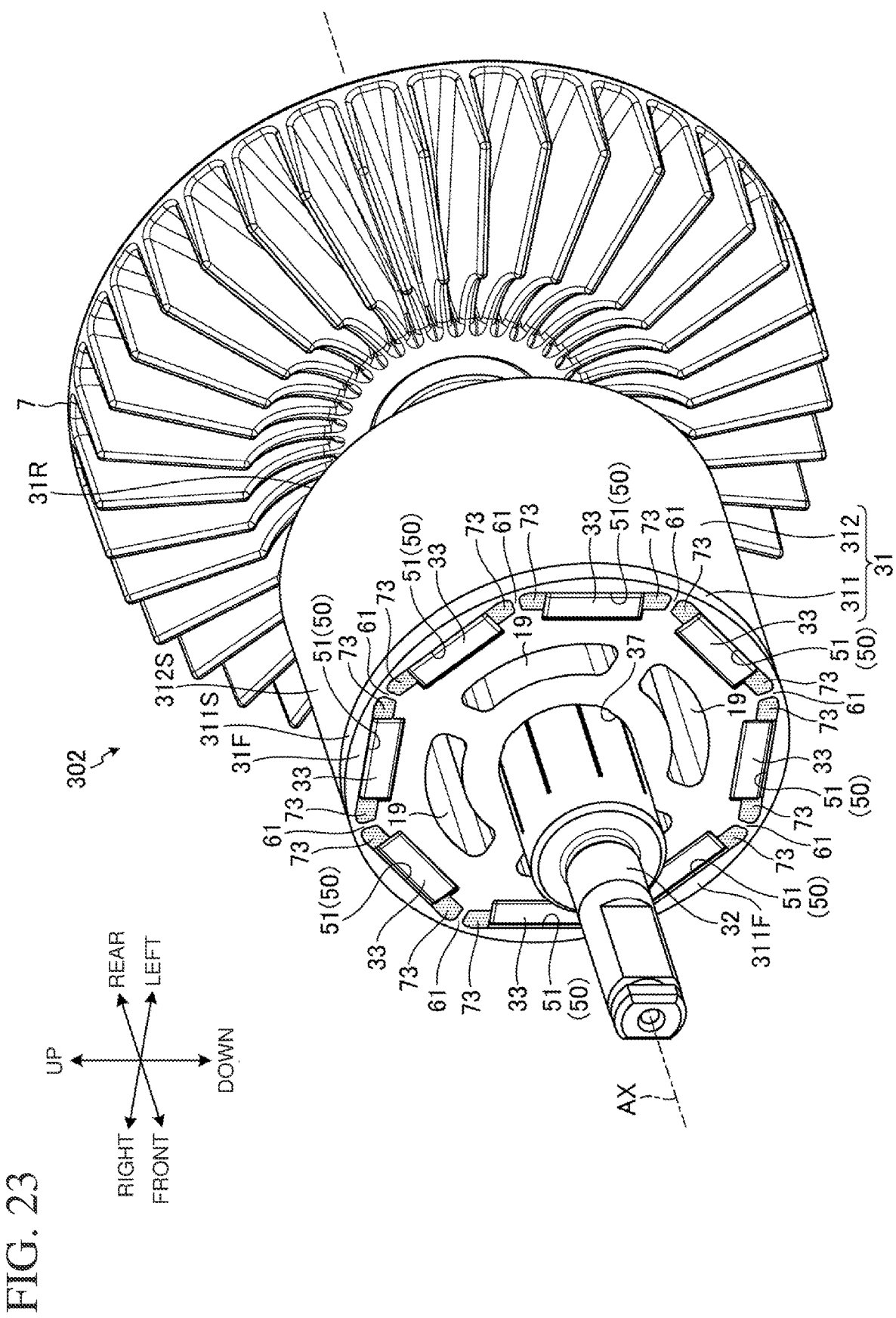
FIG. 23 is a perspective view of the rotor in the second embodiment as viewed from the front.
Figure 24:
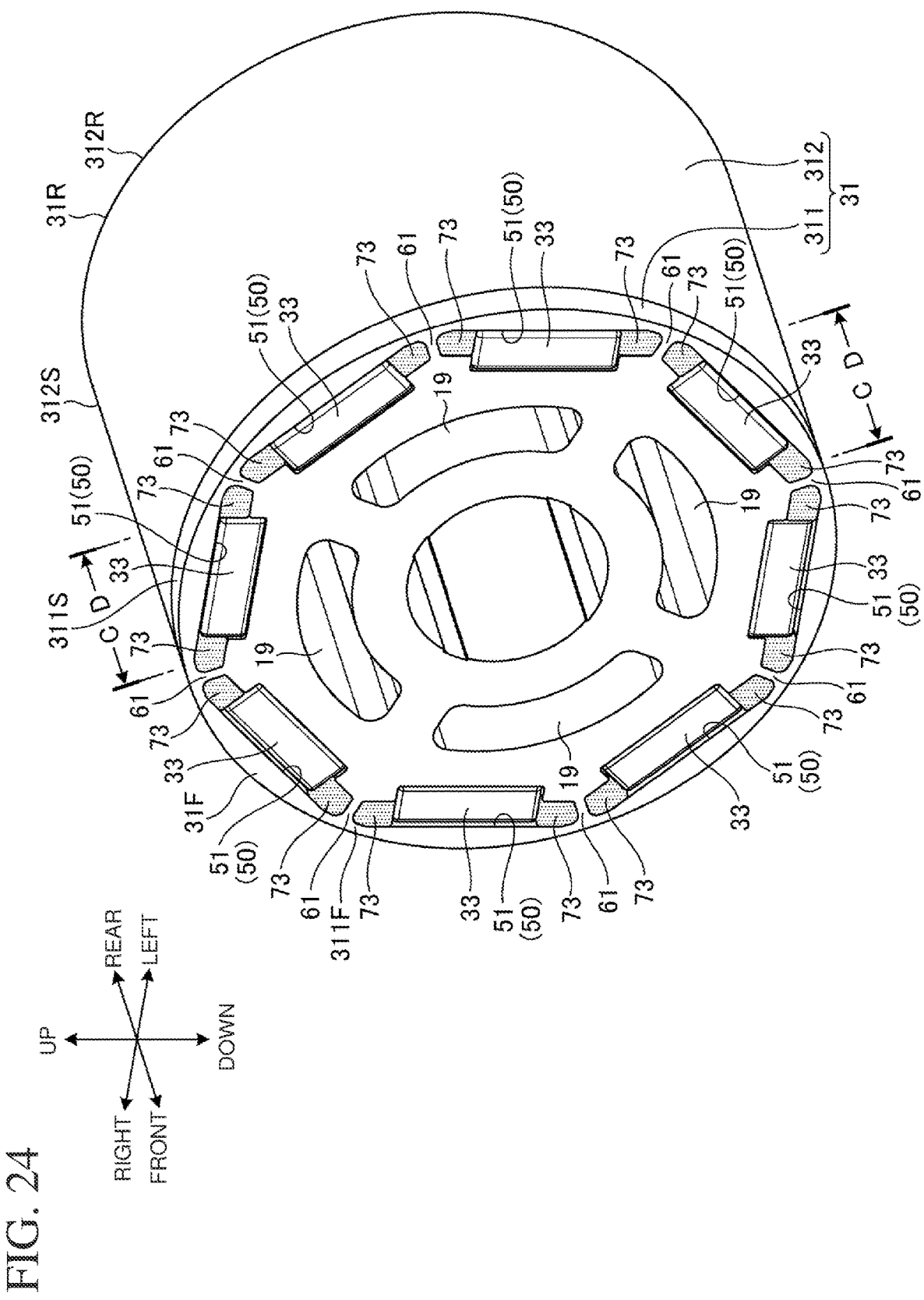
FIG. 24 is a perspective view of a rotor core in the second embodiment as viewed from the front.
Figure 25:
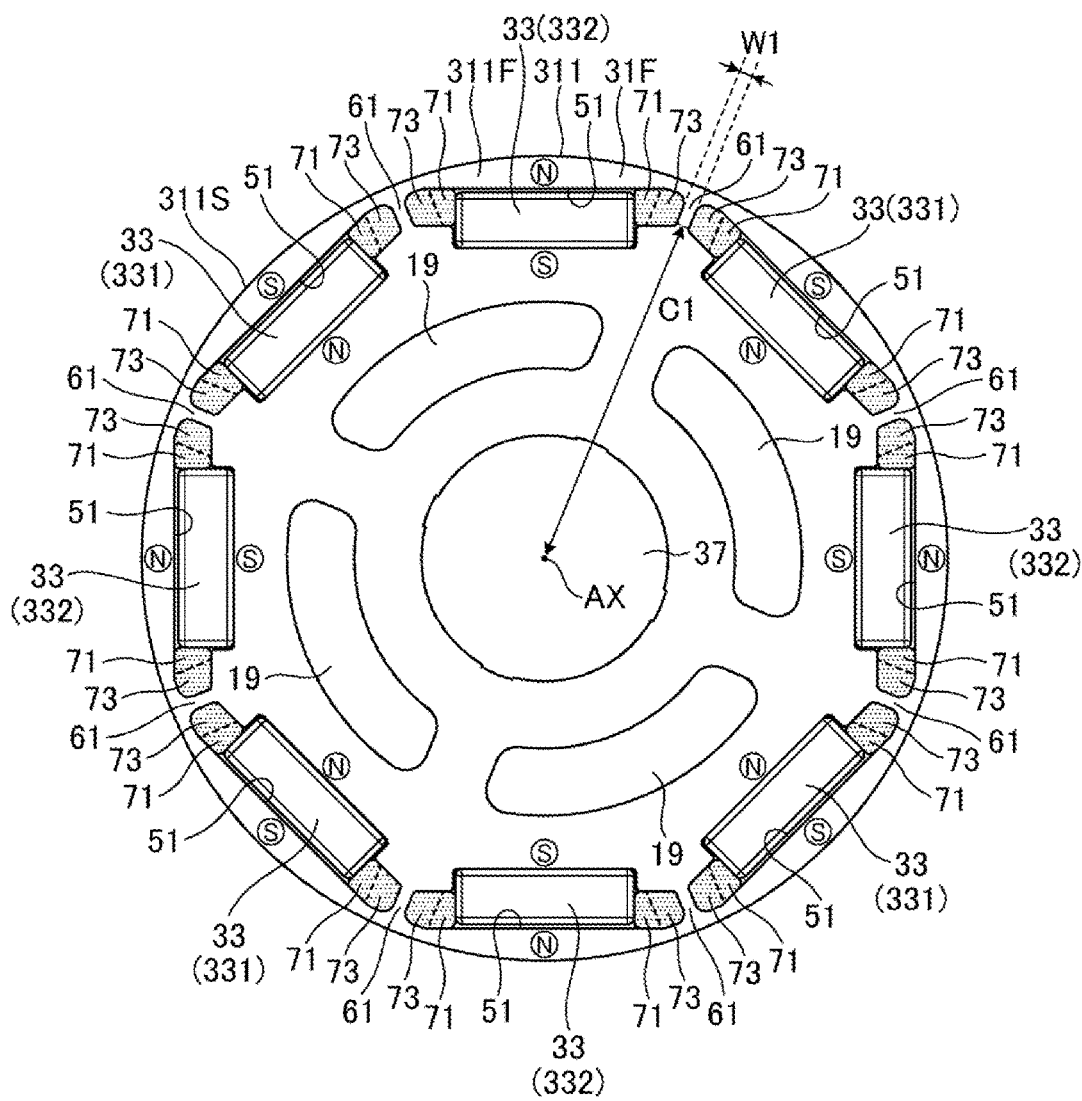
FIG. 25 is a front view of the rotor core in the second embodiment.
Figure 26:
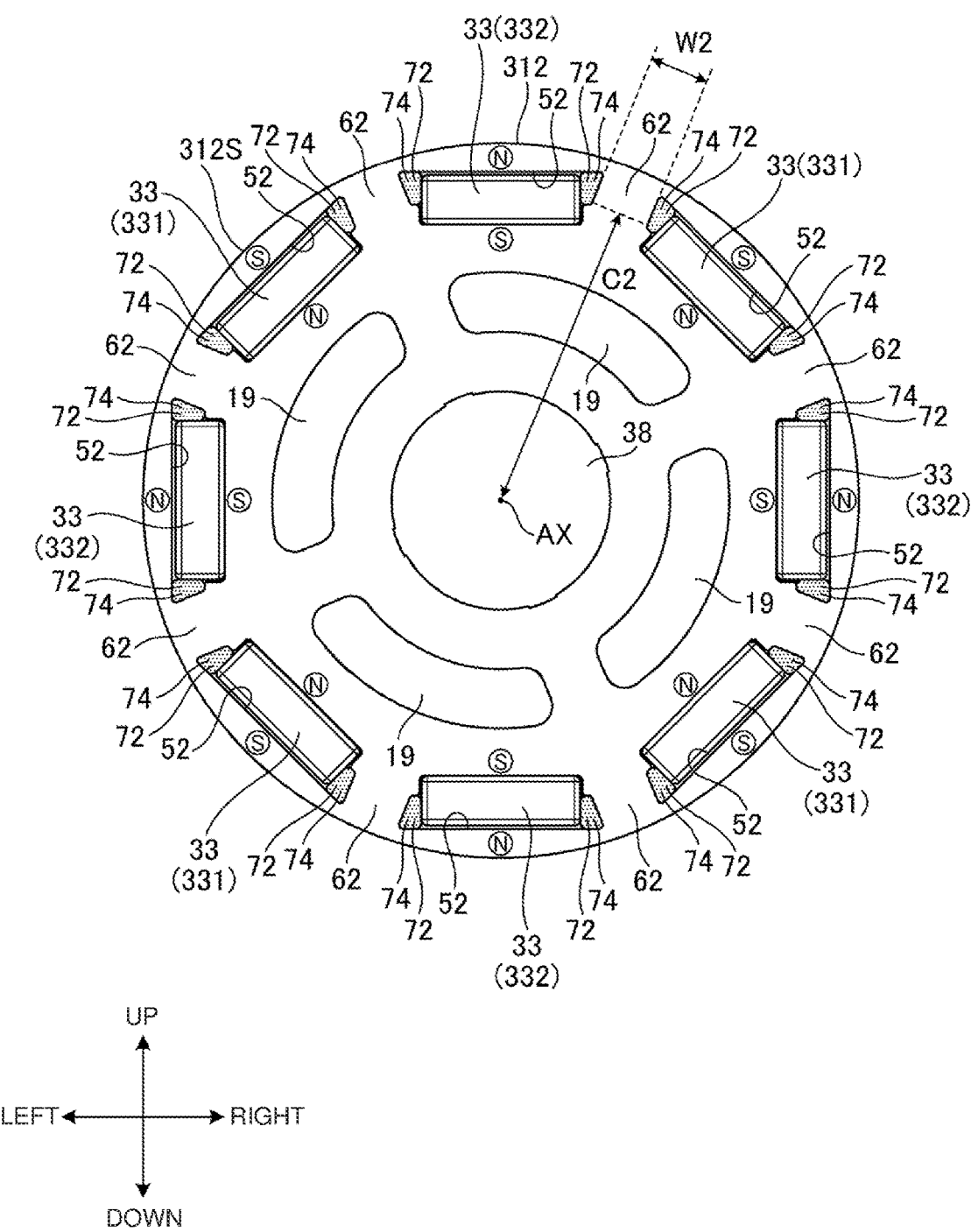
FIG. 26 is a rear view of the rotor core in the second embodiment.
Figure 27:
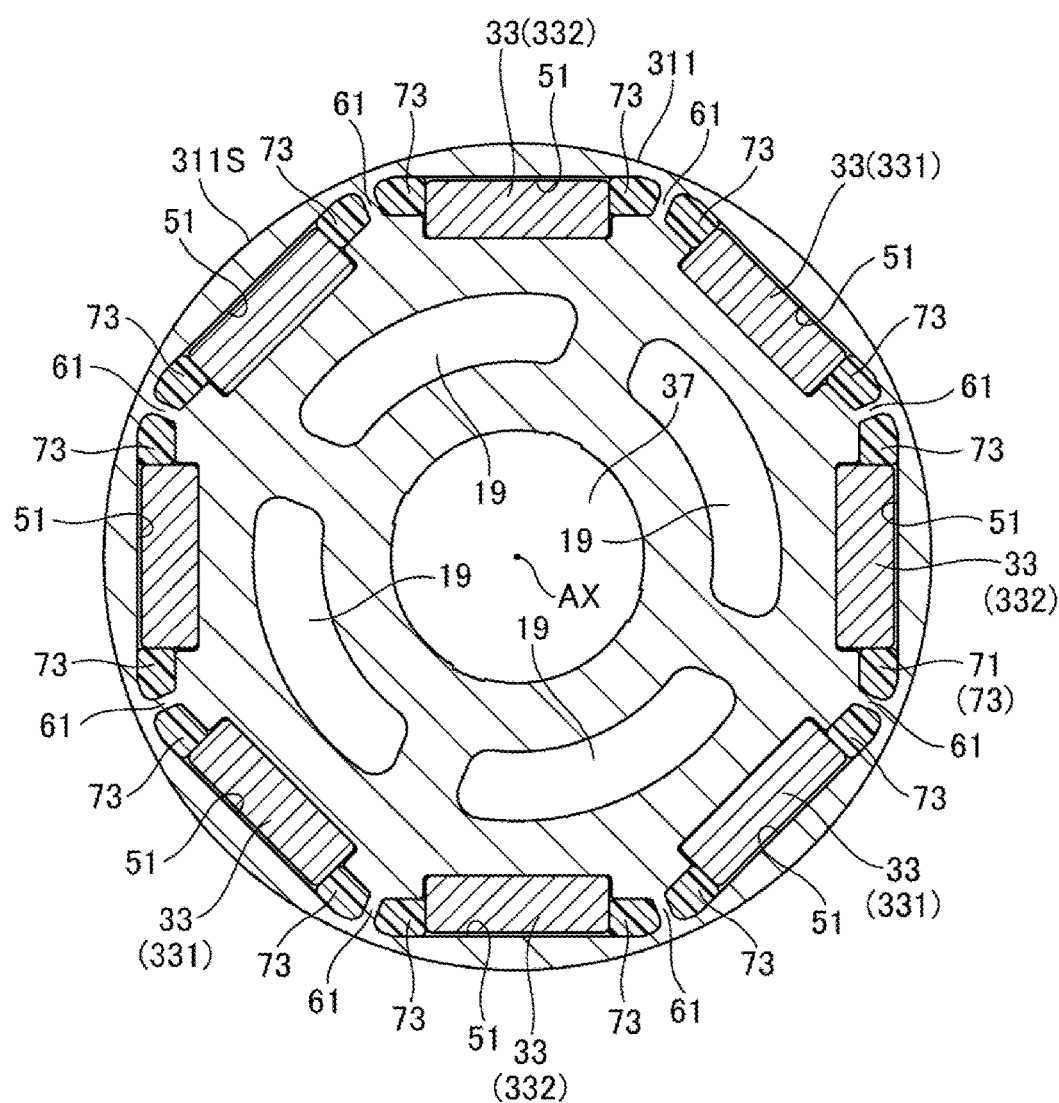
FIG. 27 is a cross-sectional view of a first core in the second embodiment.
Figure 28:
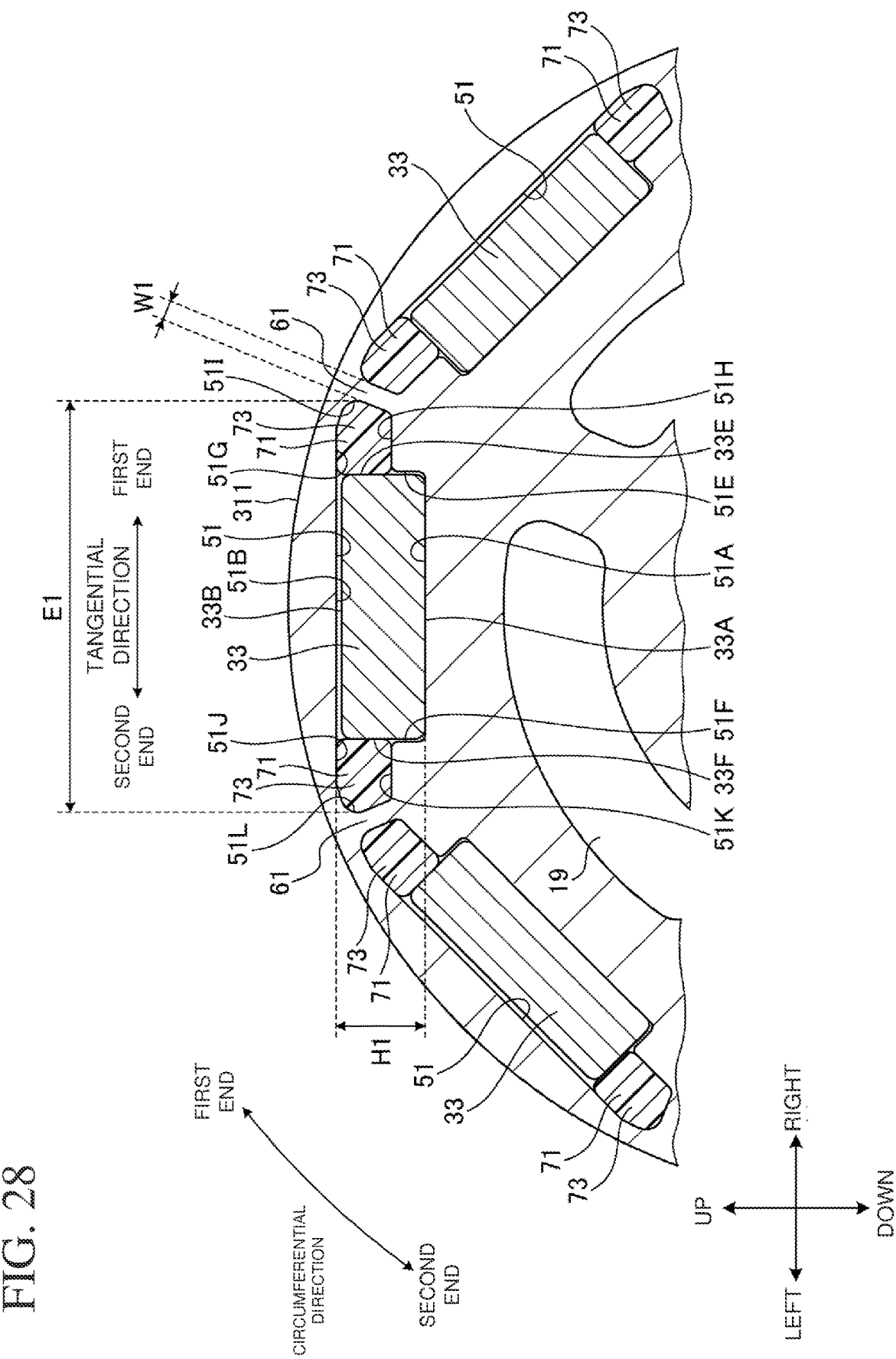
FIG. 28 is a partially enlarged cross-sectional view of the first core in the second embodiment.
Figure 29:
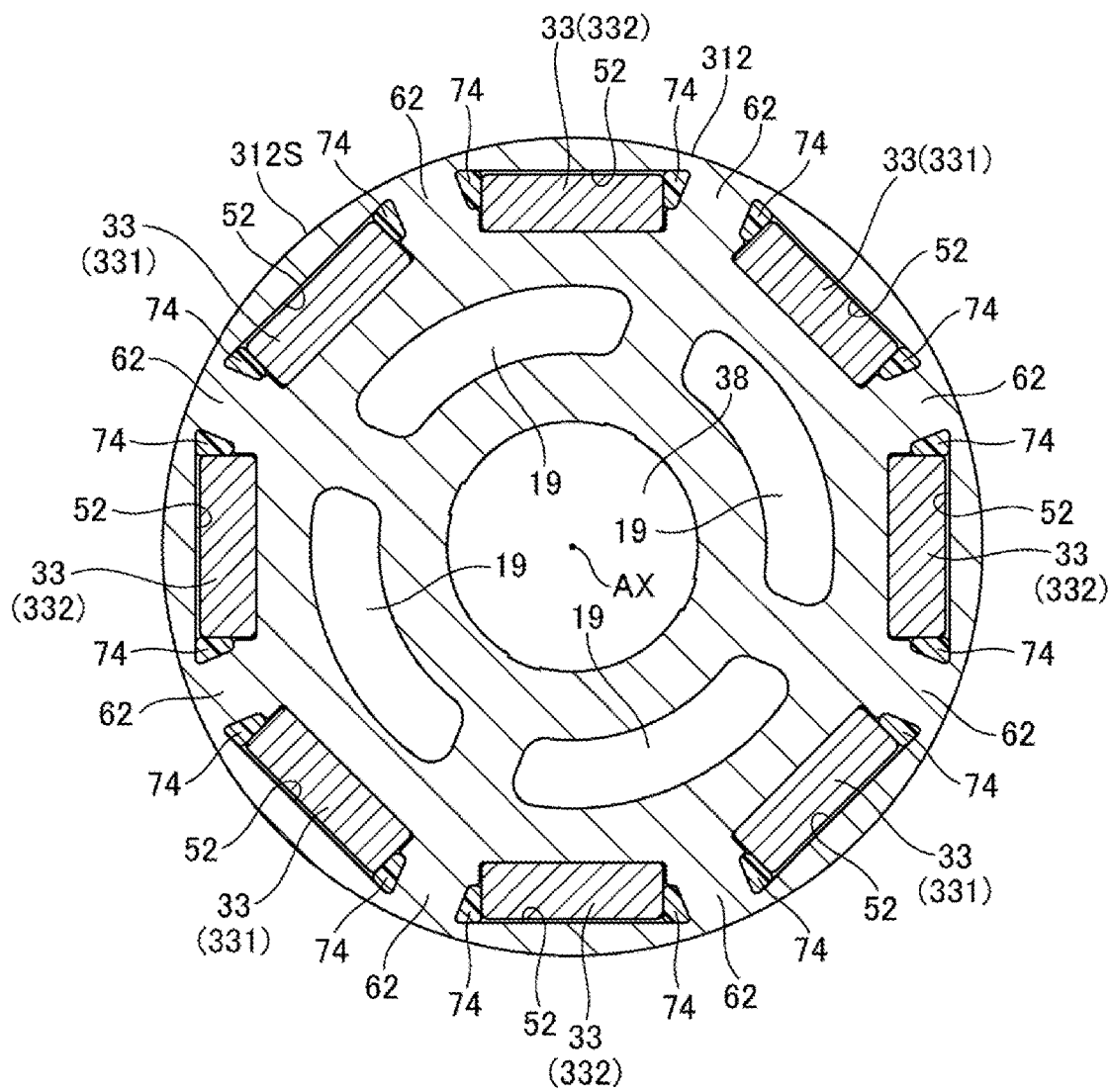
FIG. 29 is a cross-sectional view of a second core in the second embodiment.
Figure 30:
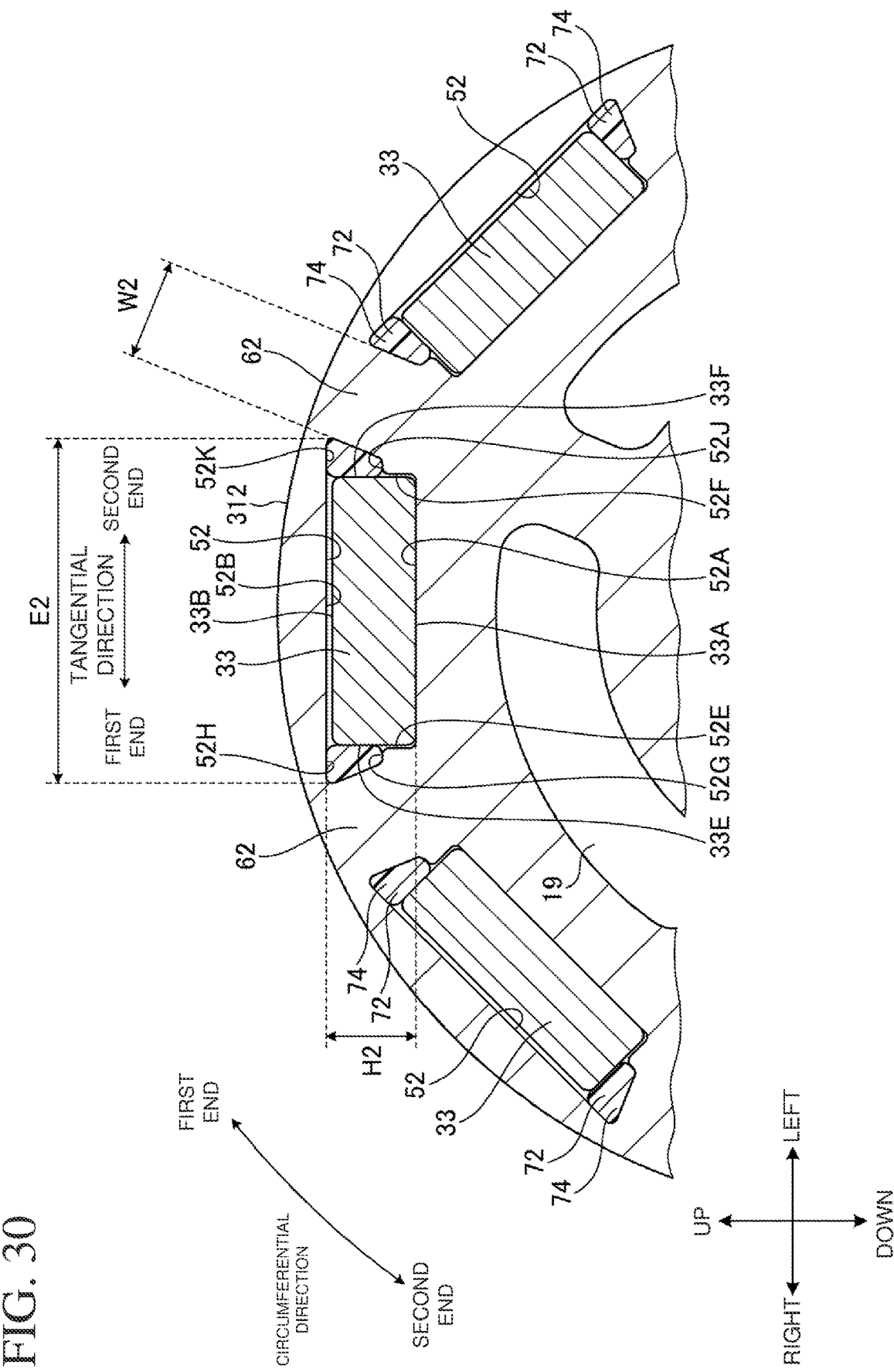
FIG. 30 is a partially enlarged cross-sectional view of the second core in the second embodiment.

FIG. 22 is a perspective view of a rotor 302 in the present embodiment as viewed from the rear. FIG. 23 is a perspective view of the rotor 302 in the present embodiment as viewed from the front. FIG. 24 is a perspective view of a rotor core 31 in the present embodiment as viewed from the front. FIG. 25 is a front view of the rotor core 31 in the present embodiment. FIG. 26 is a rear view of the rotor core 31 in the present embodiment. FIG. 27 is a cross-sectional view of a first core 311 in the present embodiment, taken along line C-C in FIG. 24 as viewed in the direction indicated by arrows. FIG. 28 is a partially enlarged cross-sectional view of the first core 311 in the present embodiment. FIG. 29 is a cross-sectional view of a second core 312 in the present embodiment, taken along line D-D in FIG. 24 as viewed in the direction indicated by arrows. FIG. 30 is a partially enlarged cross-sectional view of the first core 311 in the present embodiment.

As shown in FIGS. 22 to 30, the rotor 302 includes the rotor core 31, the rotor shaft 32, and permanent magnets 33.

The rotor core 31 has a front end 31F and a rear end 31R. As in the above embodiment, magnetic sensors 43 face the front end 31F of the rotor core 31.

The permanent magnets 33 are held by the rotor core 31. In the present embodiment, eight permanent magnets 33 surround the rotation axis AX.

The rotor core 31 includes the first core 311 and the second core 312. The first core 311 has the front end 31F. The second core 312 is located rearward from the first core 311. The first core 311 is substantially cylindrical. The second core 312 is substantially cylindrical. The first core 311 and the second core 312 are equal in outer shape.

The first core 311 has multiple (eight in the present embodiment) first slots 51 located at intervals in the circumferential direction. The second core 312 has multiple (eight in the present embodiment) second slots 52 located at intervals in the circumferential direction. The first slots 51 and the second slots 52 are equal in number.

The multiple first slots 51 are located at equal intervals in the circumferential direction. The first slots 51 are equal in shape in a plane orthogonal to the rotation axis AX. The first slots 51 are equal in dimension in a plane orthogonal to the rotation axis AX.

The multiple second slots 52 are located at equal intervals in the circumferential direction. The second slots 52 are equal in shape in a plane orthogonal to the rotation axis AX. The second slots 52 are equal in dimension in a plane orthogonal to the rotation axis AX.

The permanent magnets 33 are received in the respective first slots 51 and the respective second slots 52. Multiple (eight in the present embodiment) permanent magnets 33 surround the rotation axis AX. Each permanent magnet 33 is a rectangular plate elongated in the axial direction.

The first core 311 and the second core 312 are connected to each other with each first slot 51 at least partially overlapping the corresponding second slot 52. Each first slot 51 and the corresponding second slot 52 at least partially overlapping the first slot 51 define a single magnet slot 50. In the present embodiment, eight magnet slots 50 are located in the rotor core 31. The magnet slots 50 each receive a single permanent magnet 33.

The first core 311 includes first portions 61 each located between first slots 51 adjacent in the circumferential direction.

Multiple first portions 61 are located at equal intervals in the circumferential direction. In the circumferential direction, the multiple first portions 61 each have an equal dimension W1.

In the radial direction, the rotation axis AX has an equal distance C1 to each of the first portions 61.

The second core 312 includes second portions 62 each located between second slots 52 adjacent in the circumferential direction.

Multiple second portions 62 are located at equal intervals in the circumferential direction. In the circumferential direction, the multiple second portions 62 each have an equal dimension W2.

In the radial direction, the rotation axis AX has an equal distance C2 to each of the second portions 62.

The first portions 61 and the second portions 62 are equal in number. In present embodiment, eight first portions 61 are located in the circumferential direction. Eight second portions 62 are located in the circumferential direction.

In the circumferential direction, the first portion 61 has the dimension W1 smaller than the dimension W2 of the second portion 62.

The first portion 61 has the dimension W1 of 0.2 to 1.0 mm inclusive. The second portion 62 has the dimension W2 of 2.0 to 10.0 mm inclusive.

In the radial direction, the rotation axis AX has the distance C1 to each first portion 61 being equal to the distance C2 from the rotation axis AC to each second portion 62.

The surface of each permanent magnet 33 in the corresponding first slot 51 and at least a part of the inner surface of the first slot 51 define a first space 71 between them. The first space 71 receives a first resin portion 73.

The surface of each permanent magnet 33 in the corresponding second slot 52 and at least a part of the inner surface of the second slot 52 define a second space 72 between them. The second space 72 receives a second resin portion 74.

The permanent magnets 33 include first permanent magnets 331 and second permanent magnets 332. The first permanent magnets 331 each have the S pole facing radially outward. The second permanent magnets 332 each have the N pole facing radially outward. The first permanent magnets 331 and the second permanent magnets 332 are arranged alternately in the circumferential direction. The permanent magnets 33 include four first permanent magnets 331 and four second permanent magnets 332.

In the present embodiment, the rotor core 31 has through-holes 19. The through-holes 19 extend through a front surface 311F of the first core 311 and a rear surface 312R of the second core 312. The through-holes 19 are located between an opening 37 and an outer surface 311S of the first core 311 in the radial direction. The through-holes 19 are located between an opening 38 and an outer surface 312S of the second core 312 in the radial direction. Four through-holes 19 are located about the rotation axis AX. The through-holes 19 are arc-shaped in a plane orthogonal to the rotation axis AX. The through-holes 19 reduce the weight of the rotor core 31.

As shown in FIG. 28, the inner surface of each first slot 51 includes a first support surface 51A, a second support surface 51B, a third support surface 51E, a fourth support surface 51F, a first extension surface 51G, a first facing surface 51H, a first connecting surface 51I, a second extension surface 51J, a second facing surface 51K, and a second connecting surface 51L.

The first support surface 51A faces radially outward. The first support surface 51A is parallel to a tangent of an imaginary circle with the rotation axis AX at the center. The first support surface 51A faces the inner surface 33A of the permanent magnet 33.

The second support surface 51B faces radially inward. The second support surface 51B is parallel to a tangent of an imaginary circle with the rotation axis AX at the center. The second support surface 51B faces the outer surface 33B of the permanent magnet 33.

The third support surface 51E faces in the second tangential direction. The third support surface 51E connects to one end of the second support surface 51B in the first tangential direction. The third support surface 51E faces a radially inner portion of the first side surface 33E of the permanent magnet 33.

The fourth support surface 51F faces in the first tangential direction. The fourth support surface 51F connects to the other end of the second support surface 51B in the second tangential direction. The fourth support surface 51F faces a radially inner portion of the second side surface 33F of the permanent magnet 33.

The permanent magnet 33 is supported by the first support surface 51A, the second support surface 51B, the third support surface 51E, and the fourth support surface 51F.

The first extension surface 51G faces radially inward. The first extension surface 51G extends in the first tangential direction from one end of the second support surface 51B. The first facing surface 51H faces radially outward. The first facing surface 51H faces at least a portion of the first extension surface 51G. The first facing surface 51H connects to a radially outer end of the third support surface 51E.

The first connecting surface 51I connects an end of the first extension surface 51G in the first tangential direction and an end of the first facing surface 51H in the first tangential direction.

The second extension surface 51J faces radially inward. The second extension surface 51J extends in the second tangential direction from the other end of the second support surface 51B.

The second facing surface 51K faces radially outward. The second facing surface 51K faces at least a portion of the second extension surface 51J. The second facing surface 51K connects to a radially outer end of the fourth support surface 51F.

The second connecting surface 51L connects an end of the second extension surface 51J in the second tangential direction and an end of the second facing surface 51K in the second tangential direction.

In each first slot 51, one first space 71 is defined by the first side surface 33E of the permanent magnet 33, the first extension surface 51G, the first facing surface 51H, and the first connecting surface 51I. The other first space 71 is defined by the second side surface 33F of the permanent magnet 33, the second extension surface 51J, the second facing surface 51K, and the second connecting surface 51L.

The first space 71 receiving the first resin portion 73 reduces movement of the permanent magnet 33 inside the magnet slot 50. The first resin portion 73 may be located between the outer surface 33B of the permanent magnet 33 and the second support surface 51B of the first slot 51. This firmly fixes the permanent magnet 33 to the rotor core 31. The first resin portion 73 may be located between the first side surface 33E and the third support surface 51E. The first resin portion 73 may be located between the second side surface 33F and the fourth support surface 51F.

As shown in FIG. 30, the inner surface of each second slot 52 includes a fifth support surface 52A, a sixth support surface 52B, a seventh support surface 52E, an eighth support surface 52F, a third extension surface 52H, a third facing surface 52G, a third connecting surface 52I, a fourth extension surface 52K, a fourth facing surface 52J, and a fourth connecting surface 52L.

The fifth support surface 52A faces radially outward. The fifth support surface 52A is parallel to a tangent of an imaginary circle with the rotation axis AX at the center. The fifth support surface 52A faces the inner surface 33A of the permanent magnet 33.

The sixth support surface 52B faces radially inward. The sixth support surface 52B is parallel to a tangent of an imaginary circle with the rotation axis AX at the center. The sixth support surface 52B faces the outer surface 33B of the permanent magnet 33.

The seventh support surface 52E faces in the second tangential direction. The seventh support surface 52E connects to one end of the fifth support surface 52A in the first tangential direction. The seventh support surface 52E faces a radially inner portion of the first side surface 33E of the permanent magnet 33.

The eighth support surface 52F faces in the first tangential direction. The eighth support surface 52F connects to the other end of the fifth support surface 52A in the second tangential direction. The eighth support surface 52F faces a radially inner portion of the second side surface 33F of the permanent magnet 33.

The permanent magnet 33 is supported by the fifth support surface 52A, the sixth support surface 52B, the seventh support surface 52E, and the eighth support surface 52F.

The third extension surface 52H faces radially inward. The third extension surface 52H extends in the first tangential direction from one end of the sixth support surface 52B. The third facing surface 52G faces radially outward. The third facing surface 52G faces at least a portion of the third extension surface 52H. The third facing surface 52G connects to a radially outer end of the seventh support surface 52E.

The third connecting surface 52I connects an end of the third extension surface 52H in the first tangential direction and an end of the third facing surface 52G in the first tangential direction.

The fourth extension surface 52K faces radially inward. The fourth extension surface 52K extends in the second tangential direction from the other end of the sixth support surface 52B.

The fourth facing surface 52J faces radially outward. The fourth facing surface 52J faces at least a portion of the fourth extension surface 52K. The fourth facing surface 52J connects to a radially outer end of the eighth support surface 52F.

The fourth connecting surface 52L connects an end of the fourth extension surface 52K in the second tangential direction and an end of the fourth facing surface 52J in the second tangential direction.

In each second slot 52, one second space 72 is defined by the first side surface 33E of the permanent magnet 33, the third extension surface 52H, the third facing surface 52G, and the third connecting surface 52I. The other second space 72 is defined by the second side surface 33F of the permanent magnet 33, the fourth extension surface 52K, the fourth facing surface 52J, and the fourth connecting surface 52L.

The second space 72 receiving the second resin portion 74 reduces movement of the permanent magnet 33 inside the magnet slot 50. The second resin portion 74 may be located between the outer surface 33B of the permanent magnet 33 and the sixth support surface 52B of the second slot 52. This firmly fixes the permanent magnet 33 to the rotor core 31. The second resin portion 74 may be located between the first side surface 33E and the seventh support surface 52E. The first resin portion 73 may be located between the second side surface 33F and the eighth support surface 52F.

In the tangential direction, the first slot 51 has a dimension E1 greater than a dimension E2 of the second slot 52.

In the radial direction, the first slot 51 has a dimension H1 equal to a dimension H2 of the second slot 52.

The first core 311 and the second core 312 are connected to each other with the center of each first slot 51 aligned with the center of the corresponding second slot 52 in the tangential or circumferential direction. The first core 311 and the second core 312 are connected to each other with the center of each first slot 51 aligned with the center of the corresponding second slot 52 in the radial direction.

With the first core 311 and the second core 312 connected to each other, the first support surface 51A connects to the fifth support surface 52A, and the second support surface 51B connects to the sixth support surface 52B. The first support surface 51A is flush with the fifth support surface 52A. The second support surface 51B is flush with the sixth support surface 52B.

With the first core 311 and the second core 312 connected to each other, the third support surface 51E connects to the seventh support surface 52E, and the fourth support surface 51F connects to the eighth support surface 52F. The third support surface 51E is flush with the seventh support surface 52E. The fourth support surface 51F is flush with the eighth support surface 52F. With the first core 311 and the second core 312 connected to each other, the first space 71 at least partially overlap the second space 72.

As described above, the rotor core 31 supporting the eight permanent magnets 33 reduces a decrease in the detection accuracy of the rotation of the rotor 301 while avoiding generation of insufficient reluctance torque.

Third Embodiment

Figure 31:
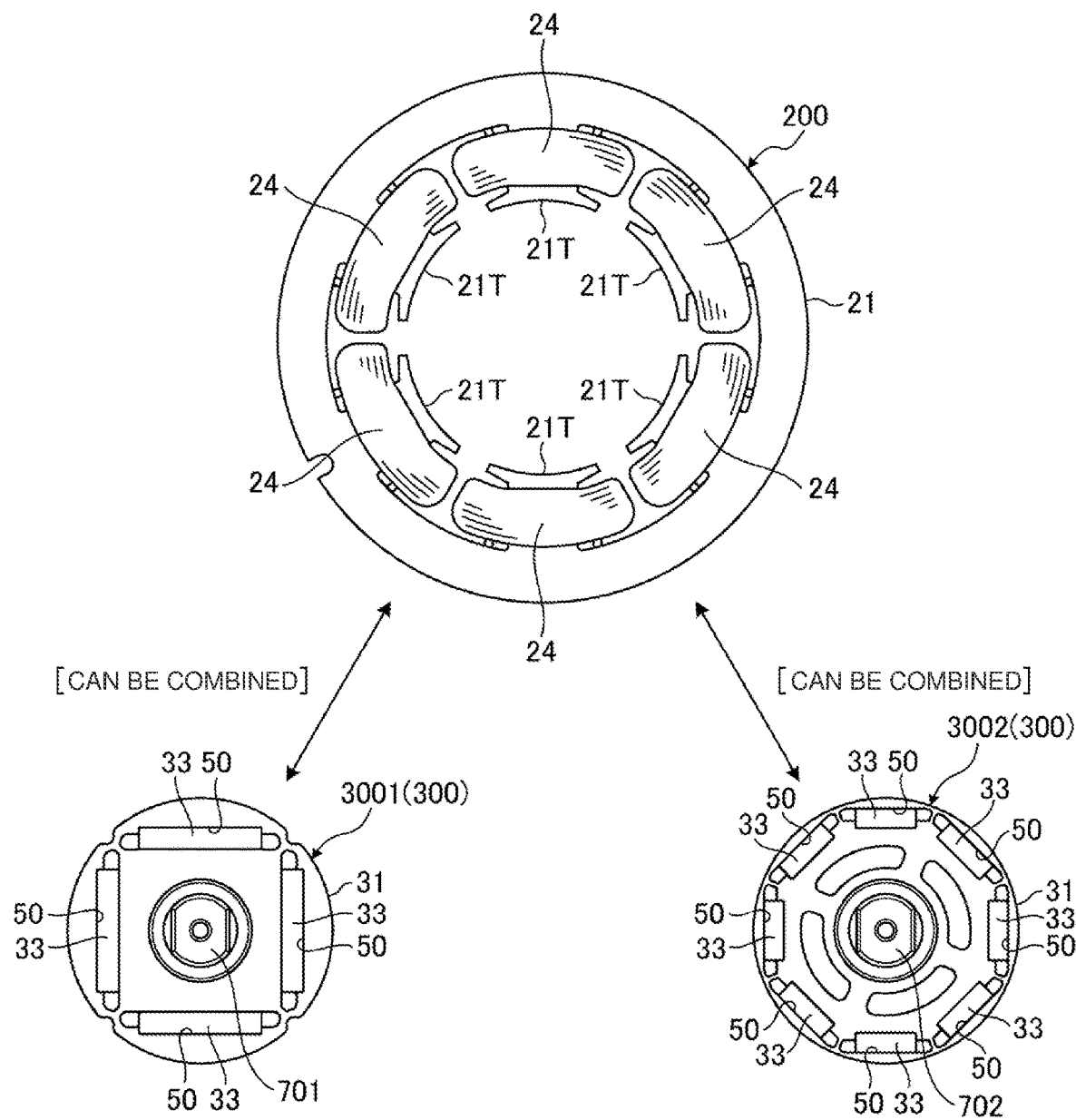
FIG. 31 is a schematic diagram describing the relationship between a stator and a rotor in a third embodiment.

A third embodiment will now be described. The same or corresponding components as those in the above embodiment are given the same reference numerals herein, and will be described briefly or will not be described.
Use of Common Stator FIG. 31 is a schematic diagram describing the relationship between a stator 200 and a rotor 300 in the present embodiment. The stator 200 is the same as the stator 20 in the first embodiment described above. The stator 200 includes a stator core 21 with six teeth 21T and six coils 24 wound around each of the six teeth 21T in the stator core 21.

As shown in FIG. 31, the stator 200 can be combined with one of multiple types of rotors 300. The stator that can be combined with the rotor refers to the stator that allows the rotor to rotate relative to the stator in response to magnetization of the coils (teeth) included in the stator. In the example shown in FIG. 31, the rotor 300 that can be combined with the stator 200 includes a first rotor 3001 and a second rotor 3002.

The first rotor 3001 is the same as the rotor 301 in the first embodiment described above. The first rotor 3001 includes four magnet slots 50 and four permanent magnets 33 located in each of the four magnet slots 50. The second rotor 3002 is the same as the rotor 302 in the second embodiment described above. The second rotor 3002 includes eight magnet slots 50 and eight permanent magnets 33 located in each of the eight magnet slots 50.

The first rotor 3001 and the second rotor 3002 are equal in outer diameter. The first rotor 3001 has an outer diameter corresponding to the outer diameter of the rotor core 31 in the first rotor 3001. The second rotor 3002 has an outer diameter corresponding to the outer diameter of the rotor core 31 in the second rotor 3002.

In the axial direction, the first rotor 3001 and the second rotor 3002 are equal in dimension. The first rotor 3001 has an axial dimension corresponding to the axial dimension of the rotor core 31 in the first rotor 3001. The second rotor 3002 has an axial dimension corresponding to the axial dimension of the rotor core 31 in the second rotor 3002.

Figure 32:
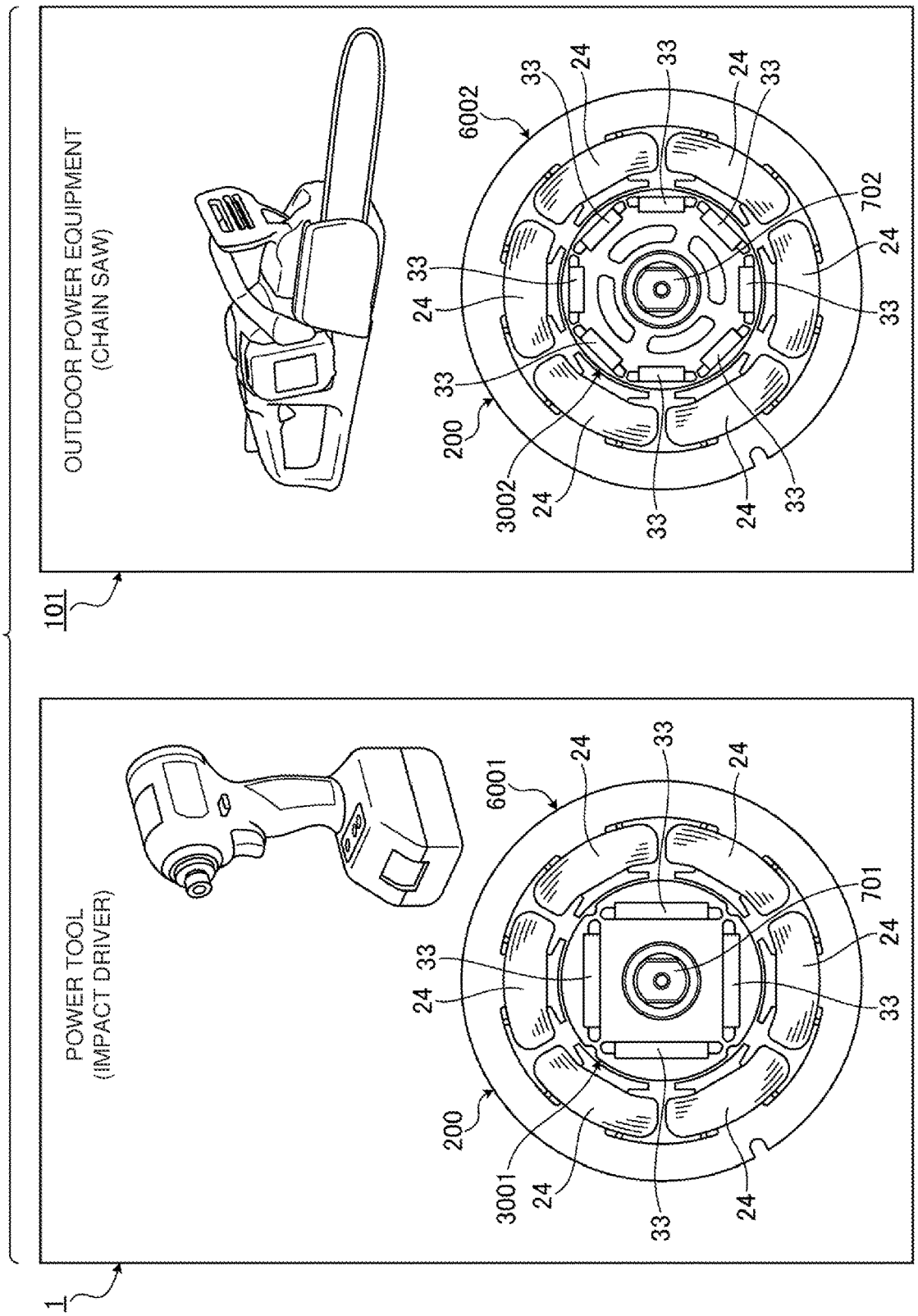
FIG. 32 is a schematic diagram of an electric work machine set according to the third embodiment.

The first rotor 3001 and the second rotor 3002 have different numbers of poles. The first rotor 3001 has four poles. The second rotor 3002 has eight poles. The first rotor 3001 can be combined with the stator 200. The second rotor 3002 can also be combined with the stator 200. The first rotor 3001 located inward from the stator 200 is rotatable under the rotating magnetic field of the stator 200. The second rotor 3002 located inward from the stator 200 is also rotatable under the rotating magnetic field of the stator 200.
Power Tool Set FIG. 32 is a schematic diagram of an electric work machine set 1000 according to the present embodiment. The electric work machine set 1000 includes an electric work machine 1 and an electric work machine 101. The electric work machine 1 is an impact driver as an example of a power tool in the first embodiment described above. The electric work machine 101 is a chain saw as an example of outdoor power equipment in the second embodiment described above.

The electric work machine 1 includes a first motor 6001. The first motor 6001 is the same as the motor 601 in the first embodiment described above. The first motor 6001 includes a stator 200 and a first rotor 3001 that can be combined with the stator 200.

The electric work machine 101 includes a second motor 6002. The second motor 6002 is the same as the motor 602 in the second embodiment described above. The second motor 6002 includes a stator 200 and a second rotor 3002 that can be combined with the stator 200.

The number of poles in the first rotor 3001 is determined based on output conditions requested from a first output unit 701 in the first motor 6001. The number of poles in the second rotor 3002 is determined based on output conditions requested from a second output unit 702 in the second motor 6002. The first output unit 701 in the first motor 6001 includes a rotor shaft 32 in the first rotor 3001. The second output unit 702 in the second motor 6002 includes a rotor shaft 32 in the second rotor 3002.

The output conditions for the first output unit 701 include the rotational speed of the first output unit 701. The output conditions for the second output unit 702 include the rotational speed of the second output unit 702.

When the first output unit 701 in the first motor 6001 has a higher requested rotational speed than the second output unit 702 in the second motor 6002, the first rotor 3001 has a smaller number of poles than the second rotor 3002. When the first output unit 701 in the first motor 6001 has a lower requested rotational speed than the second output unit 702 in the second motor 6002, the first rotor 3001 has a greater number of poles than the second rotor 3002.

In the present embodiment, the first output unit 701 in the first motor 6001 has a higher requested rotational speed than the second output unit 702 in the second motor 6002. The first rotor 3001 thus has a smaller number of poles than the second rotor 3002. In other words, the first rotor 3001 has four poles, and the second rotor 3002 has eight poles as described above.

Figure 33:
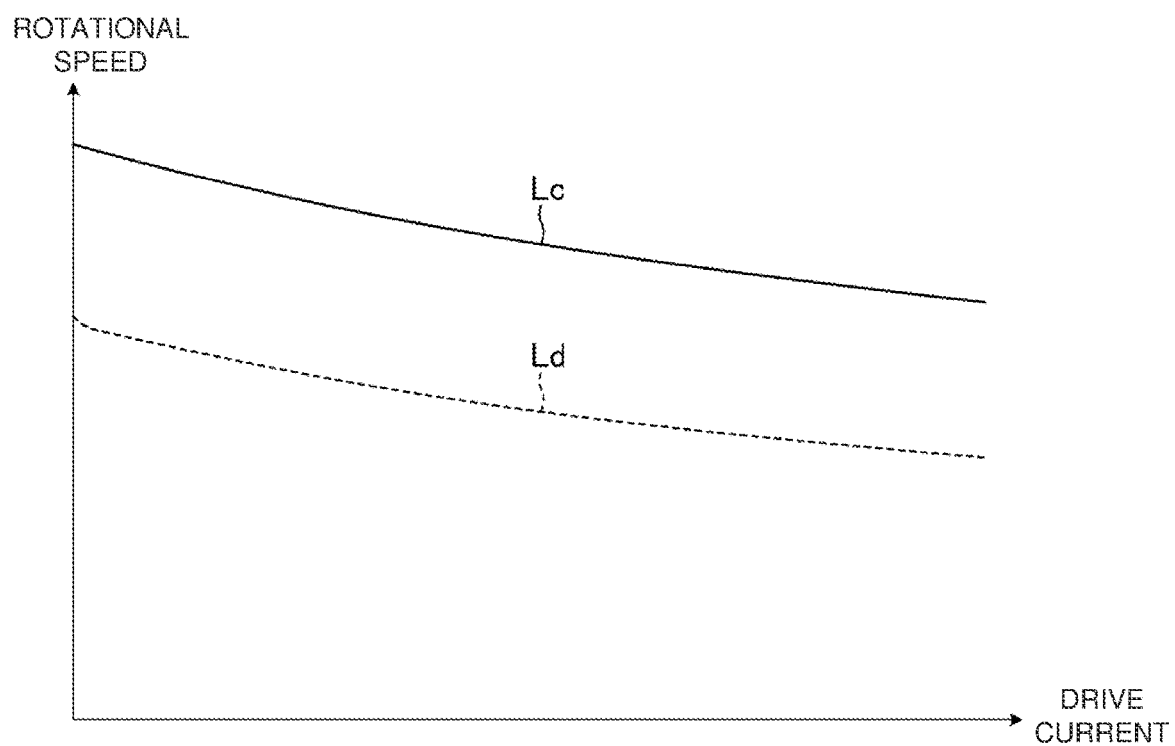
FIG. 33 is a graph showing the relationship between the number of poles in the rotor in the third embodiment, a drive current supplied to coils, and the rotational speed of an output unit in the rotor.

FIG. 33 is a graph showing the relationship between the number of poles in the rotor 300 in the present embodiment, the drive current supplied to the coils 24, and the rotational speed of the output unit (the first output unit 701 or the second output unit 702) in the rotor 300.

In FIG. 33, line Lc indicates the relationship between the drive current and the rotational speed for the first motor 6001 including the first rotor 3001 with four poles. Line Ld indicates the relationship between the drive current and the rotational speed for the second motor 6002 including the second rotor 3002 with eight poles. As shown in FIG. 33, when a predetermined drive current is supplied to the coils 24, the first output unit 701 in the first motor 6001 with four poles has a higher rotational speed than the second output unit 702 in the second motor 6002 with eight poles.

The output conditions for the first output unit 701 may include the torque of the first output unit 701. The output conditions for the second output unit 702 may include the torque of the second output unit 702.

When the first output unit 701 in the first motor 6001 has higher requested torque than the second output unit 702 in the second motor 6002, the first rotor 3001 has a greater number of poles than the second rotor 3002. When the first output unit 701 in the first motor 6001 has lower requested torque than the second output unit 702 in the second motor 6002, the first rotor 3001 has a smaller number of poles than the second rotor 3002.

In the present embodiment, the first output unit 701 in the first motor 6001 has lower requested torque than the second output unit 702 in the second motor 6002. The first rotor 3001 thus has a smaller number of poles than the second rotor 3002. In other words, the first rotor 3001 has four poles, and the second rotor 3002 has eight poles as described above.

The stator 200 may have any number of teeth 21T (coils 24) other than six teeth.

FIG. 34 is a table showing the relationship between the number of teeth 21T on the stator 200 and the number of poles in the rotor 300 that can be combined with the stator 200 in the present embodiment. The teeth 21T and the coils 24 are equal in number. As shown in FIG. 34, the stator core 21 in the stator 200 satisfies the condition T=3×N, where T is the number of teeth 21T and N is a natural number. The rotor 300 that can be combined with the stator 200 has an even number of poles.

For the stator core 21 in the stator 200 satisfying the condition T=3×N (where the natural number N is 1), or in other words, the number T of teeth 21T on the stator 200 is 3(=3×N), the number of poles in the rotor 300 that can be combined with the stator 200 is 2(=2×N) and 4(=4×N). With the number T of teeth 21T being 3, when the number of poles in the first rotor 3001 is set to one of 2 or 4, the number of poles in the second rotor 3002 is set to the other one of 2 or 4 different from the number of poles in the first rotor 3001. When the first output unit 701 has a higher requested rotational speed than the second output unit 702, for example, the number of poles in the first rotor 3001 is set to 2, and the number of poles in the second rotor 3002 is set to 4.

For the stator core 21 in the stator 200 satisfying the condition T=3×N (where the natural number N is 2), or in other words, the number T of teeth 21T on the stator 200 is 6(=3×N), the number of poles in the rotor 300 that can be combined with the stator 200 is 4(=2×N) and 8 (=4×N). With the number T of teeth 21T being 6, when the number of poles in the first rotor 3001 is set to one of 4 or 8, the number of poles in the second rotor 3002 is set to the other one of 4 or 8 different from the number of poles in the first rotor 3001. When the first output unit 701 has a higher requested rotational speed than the second output unit 702, for example, the number of poles in the first rotor 3001 is set to 4, and the number of poles in the second rotor 3002 is set to 8.

For the stator core 21 in the stator 200 satisfying the condition T=3×3×N (where the natural number N is 1), or in other words, the number T of teeth 21T on the stator 200 is 9(=3×3×N), the number of poles in the rotor 300 that can be combined with the stator 200 is 6(=6×N), 8(=8×N), 10(=10×N), and 12(=12×N). With the number T of teeth 21T being 9, when the number of poles in the first rotor 3001 is set to one of 6, 8, 10, or 12, the number of poles in the second rotor 3002 is set to another one of 6, 8, 10, or 12 different from the number of poles in the first rotor 3001. When the first output unit 701 has a higher requested rotational speed than the second output unit 702, for example, the number of poles in the first rotor 3001 is set to 6, and the number of poles in the second rotor 3002 is set to any one of 8, 10, or 12.

For the stator core 21 in the stator 200 satisfying the condition T=3×4×N (where the natural number N is 1), or in other words, the number T of teeth 21T on the stator 200 is 12 (=3×4×N), the number of poles in the rotor 300 that can be combined with the stator 200 is 8 (8×N), 10(=10×N), 14(=14×N), and 16(=16×N). With the number T of teeth 21T being 12, when the number of poles in the first rotor 3001 is set to one of 8, 10, 14, or 16, the number of poles in the second rotor 3002 is set to another one of 8, 10, 14, or 16 different from the number of poles in the first rotor 3001. When the first output unit 701 has a higher requested rotational speed than the second output unit 702, for example, the number of poles in the first rotor 3001 is set to 8, and the number of poles in the second rotor 3002 is set to any one of 10, 14, or 16.

For the stator core 21 in the stator 200 satisfying the condition T=3×5×N (where the natural number N is 1), or in other words, the number T of teeth 21T on the stator 200 is 15 (=3×5×N), the number of poles in the rotor 300 that can be combined with the stator 200 is 10 (10×N), and 14(=14×N), 16(=16×N), and 20(=20×N). With the number T of teeth 21T being 15, when the number of poles in the first rotor 3001 is set to one of 10, 14, 16, or 20, the number of poles in the second rotor 3002 is set to another one of 10, 14, 16, or 20 different from the number of poles in the first rotor 3001. When the first output unit 701 has a higher requested rotational speed than the second output unit 702, for example, the number of poles in the first rotor 3001 is set to 10, and the number of poles in the second rotor 3002 is set to any one of 14, 16, or 20.

For the stator core 21 in the stator 200 satisfying the condition T=3×3×N (where the natural number N is 2), or in other words, the number T of teeth 21T on the stator 200 is 18 (=3×3×N), the number of poles in the rotor 300 that can be combined with the stator 200 is 12 (=6×N), 16(=8×N), 20(=10×N), and 24(=12×N). With the number T of teeth 21T being 18, when the number of poles in the first rotor 3001 is set to one of 12, 16, 20, or 24, the number of poles in the second rotor 3002 is set to another one of 12, 16, 20, or 24 different from the number of poles in the first rotor 3001. When the first output unit 701 has a higher requested rotational speed than the second output unit 702, for example, the number of poles in the first rotor 3001 is set to 12, and the number of poles in the second rotor 3002 is set to any one of 16, 20, or 24.

For the stator core 21 in the stator 200 satisfying the condition T=3×N (where the natural number N is 7), or in other words, the number T of teeth 21T on the stator 200 is 21(=3×N), the number of poles in the rotor 300 that can be combined with the stator 200 is 14(=2×N) and 28(=4×N). With the number T of teeth 21T being 21, when the number of poles in the first rotor 3001 is set to one of 14 or 28, the number of poles in the second rotor 3002 is set to the other one of 14 or 28 different from the number of poles in the first rotor 3001. When the first output unit 701 has a higher requested rotational speed than the second output unit 702, for example, the number of poles in the first rotor 3001 is set to 14, and the number of poles in the second rotor 3002 is set to 28.

For the stator core 21 in the stator 200 satisfying the condition T=3×4×N (where the natural number N is 2), or in other words, the number T of teeth 21T on the stator 200 is 24 (=3×4×N), the number of poles in the rotor 300 that can be combined with the stator 200 is 16 (8×N), 20 (=10×N), 28 (=14×N), and 32(=16×N). With the number T of teeth 21T being 24, when the number of poles in the first rotor 3001 is set to one of 16, 20, 28, or 32, the number of poles in the second rotor 3002 is set to another one of 16, 20, 28, or 32 different from the number of poles in the first rotor 3001. When the first output unit 701 has a higher requested rotational speed than the second output unit 702, for example, the number of poles in the first rotor 3001 is set to 16, and the number of poles in the second rotor 3002 is set to any one of 20, 28, or 32.

As described above, one of multiple types of rotors 300 can be combined with one type of stator 20 in the present embodiment. This reduces the production cost of the first motor 6001 and the second motor 6002. For example, the production facility for the first motor 6001 can be used to produce the second motor 6002. The reduced production cost of the first motor 6001 and the second motor 6002 reduces the production cost of the electric work machine 1 and the electric work machine 101. In addition, the first motor 6001 and the second motor 6002 can achieve the requested output characteristics simply by combining the stator 20 with different types of rotors 300, without different motors being produced for each type of electric work machine.

The first rotor 3001 and the second rotor 3002 are equal in outer diameter. This allows the first rotor 3001 or the second rotor 3002 located inward from the stator 20 to rotate smoothly.

The number of poles in the first rotor 3001 is determined based on the output conditions requested from the first output unit 701 in the first motor 6001. Of multiple types of rotors 300 with different numbers of poles, any type of rotor 300 may be combined as the first rotor 3001 with the single type of stator 20, thus allowing the first output unit 701 to output power satisfying the requested output conditions.

Other Embodiments

Figure 35:
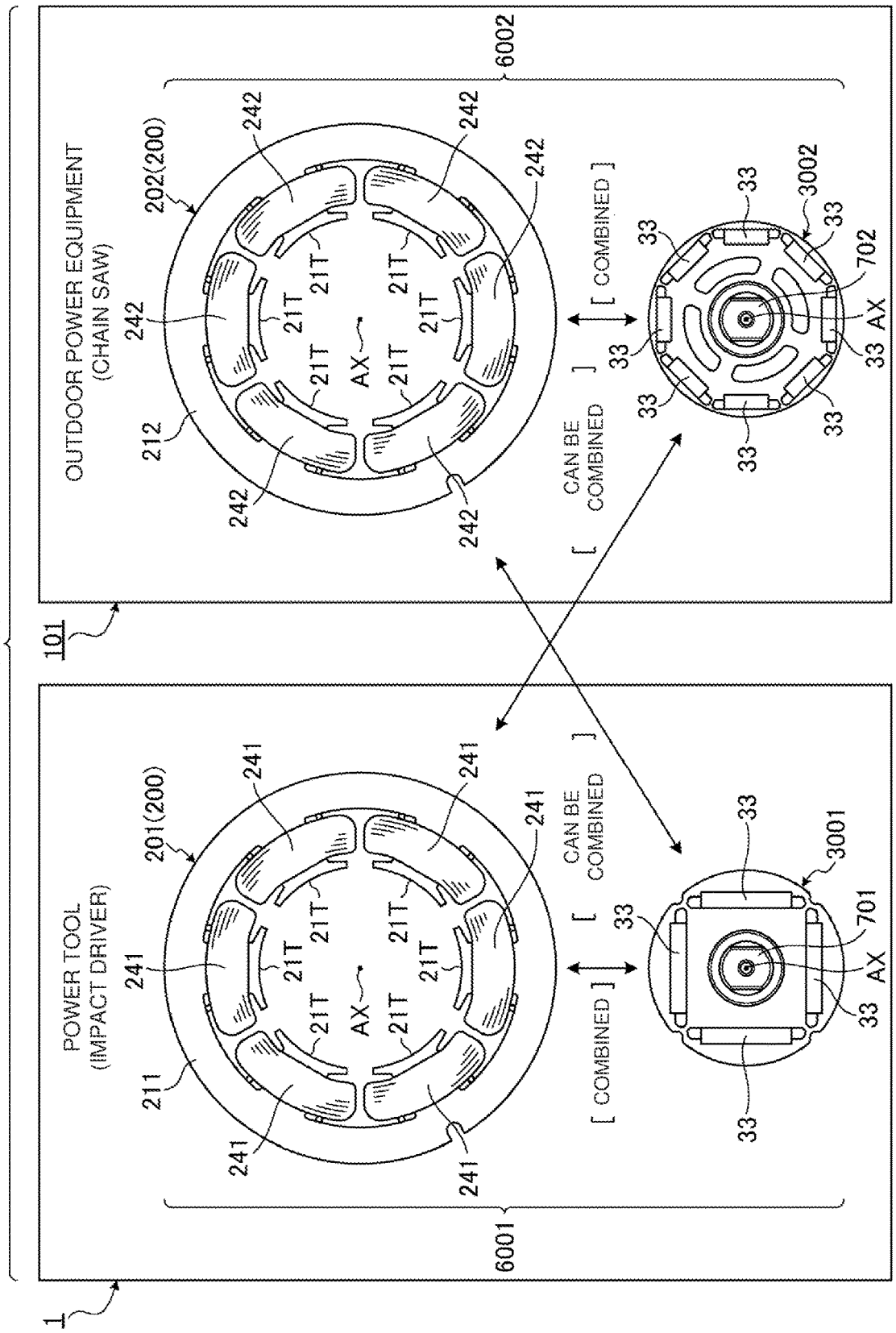
FIG. 35 is a schematic diagram describing the relationship between a stator and a rotor in another example of the third embodiment.

FIG. 35 is a schematic diagram describing the relationship between a stator 200 and a rotor 300 in another example of the present embodiment. In the embodiment described above, one type of stator 200 can be combined with different types of rotors 300. Different types of stators 200 may be combined with different types of rotors 300.

As shown in FIG. 35, the stator 200 includes a first stator 201 and a second stator 202. The first motor 6001 in the electric work machine 1 includes the first stator 201 and a first rotor 3001 that can be combined with the first stator 201. The first stator 201 includes a first stator core 211 and multiple first coils 241 each wound around the corresponding teeth 21T on the first stator core 211. The controller 9 in the electric work machine 1 supplies a drive current to the first coils 241 in the first stator 201 to magnetize the teeth 21T on the first stator core 211. This rotates the first rotor 3001 about the rotation axis AX.

The first stator 201 partially has the same structure as the second stator 202. The first stator 201 partially has a different structure from the second stator 202.

The first stator core 211 and a second stator core 212 in the second stator 202, which is used in the second motor 6002 in another electric work machine 101, are equal in shape in a plane orthogonal to the rotation axis AX. The first rotor 3001 can be combined with the second stator 202.

The first stator core 211 has a length (corresponding to an axial dimension) different from the length of the second stator core 212.

The first stator core 211 has a length determined based on output conditions requested from a first output unit 701 in the first motor 6001. The second stator core 212 has a length determined based on output conditions requested from a second output unit 702 in the second motor 6002.

The output conditions for the first output unit 701 include the rotational speed of the first output unit 701. The output conditions for the second output unit 702 include the rotational speed of the second output unit 702.

When the first output unit 701 in the first motor 6001 has a higher requested rotational speed than the second output unit 702 in the second motor 6002, the first stator core 211 is shorter than the second stator core 212. When the first output unit 701 in the first motor 6001 has a lower requested rotational speed than the second output unit 702 in the second motor 6002, the first stator core 211 is longer than the second stator core 212.

In the present embodiment, the first output unit 701 in the first motor 6001 has a higher requested rotational speed than the second output unit 702 in the second motor 6002. The first stator core 211 is thus shorter than the second stator core 212.

The output conditions for the first output unit 701 may include the torque of the first output unit 701. The output conditions for the second output unit 702 may include the torque of the second output unit 702.

When the first output unit 701 in the first motor 6001 has higher requested torque than the second output unit 702 in the second motor 6002, the first stator core 211 is longer than the second stator core 212. When the first output unit 701 in the first motor 6001 has lower requested torque than the second output unit 702 in the second motor 6002, the first stator core 211 is shorter than the second stator core 212.

In the present embodiment, the first output unit 701 in the first motor 6001 has lower requested torque than the second output unit 702 in the second motor 6002. The first stator core 211 is thus shorter than the second stator core 212.

The second stator 202 includes the second stator core 212 and multiple second coils 242 each wound around the corresponding teeth 21T on the second stator core 212. The teeth 21T on the first stator 201 and the teeth 21T on the second stator 202 are equal in number. The first coils 241 in the first stator 201 (six in the present embodiment) and the second coils 242 in the second stator 202 (six in the present embodiment) are equal in number.

The first coils 241 are connected in the same manner as the second coils 242. When the first coils 241 are delta-connected as described with reference to FIG. 7, the second coils 242 are also delta-connected.

The first coil 241 and the second coil 242 are equal in wire diameter. The wire diameter of the first coil 241 refers to the thickness (diameter) of a wire included in the first coil 241. The wire diameter of the second coil 242 refers to the thickness (diameter) of a wire included in the second coil 242.

The first coil 241 and the second coil 242 each have an equal number of turns. The number of turns of the first coil 241 refers to the number of times the wire included in the first coil 241 is wound around the corresponding tooth 21T on the first stator core 211. The number of turns of the second coil 242 refers to the number of times the wire included in the second coil 242 is wound around the corresponding to tooth 21T on the second stator core 212.

Figure 36:
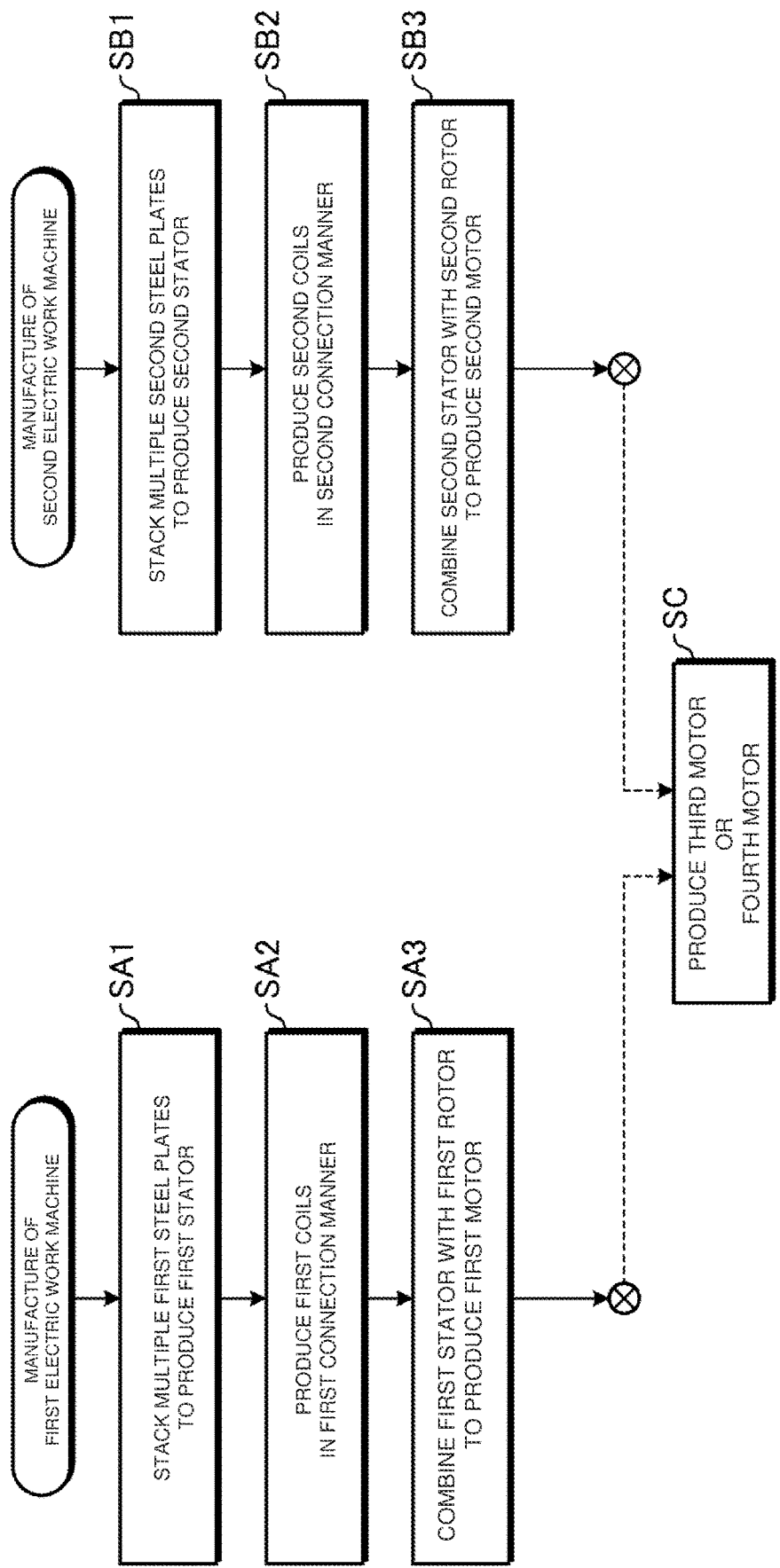
FIG. 36 is a flowchart of a manufacturing method for an electric work machine set in the other example of the third embodiment.

FIG. 36 is a flowchart of a manufacturing method for an electric work machine set 1000 in the other example of the present embodiment. In FIG. 36, a first electric work machine refers to the electric work machine 1 described above. A second electric work machine refers to the electric work machine 101 described above.

The first motor 6001 is produced for the first electric work machine. To produce the first motor 6001, the first stator core 211 is produced. Multiple first steel plates are stacked on one another to produce the first stator core 211 (step SA1).

Multiple first coils 241 each are then wound around the corresponding tooth 21T on the first stator core 211. The first coils 241 are wound around the teeth 21T in a first connection manner (step SA2).

The first coils 241 are wound around the corresponding teeth 21T on the first stator core 211 to produce the first stator 201. The resultant first stator 201 is then combined with the first rotor 3001 having a first number of poles. This completes the first motor 6001 (step SA3). The first motor 6001 is used to manufacture the first electric work machine.

The second motor 6002 is produced for the second electric work machine. To produce the second motor 6002, the second stator core 212 is produced. Multiple second steel plates are stacked on one another to produce the second stator core 212 (step SB1).

The second steel plate for the second stator core 212 has the same shape and the same dimensions as the first steel plate for the first stator core 211. This allows the first stator core 211 and the second stator core 212 to be equal in shape and in dimension in a plane orthogonal to the rotation axis AX. The first stator core 211 has a length adjustable by controlling the number of first steel plates to be stacked. The second stator core 212 has a length adjustable by controlling the number of second steel plates to be stacked.

Multiple second coils 242 each are then wound around the corresponding tooth 21T on the second stator core 212. The second coils 242 are wound around the teeth 21T in a second connection manner (step SB2).

The second connection manner for the second coils 242 is the same as the first connection manner for the first coils 241.

The second coils 242 are wound around the corresponding teeth 21T on the second stator core 212 to produce the second stator 202. The resultant second stator 202 is then combined with the second rotor 3002 having a second number of poles. This completes the second motor 6002 (step SB3).

The second number of poles in the second rotor 3002 is different from the first number of poles in the first rotor 3001.

The second motor 6002 is used to manufacture the second electric work machine.

The second rotor 3002 can be combined with the first stator 201. The second rotor 3002 is rotatable relative to the second stator 202 and rotatable relative to the first stator 201. The first stator 201 and the second rotor 3002 may be combined to produce a third motor. Similarly, the first rotor 3001 can be combined with the second stator 202. The first rotor 3001 is rotatable relative to the first stator 201 and rotatable relative to the second stator 202. The second stator 202 and the first rotor 3001 may be combined to produce a fourth motor (step SC).

The third motor may be used in one or both of the first electric work machine and the second electric work machine. The fourth motor may be used in one or both of the first electric work machine and the second electric work machine. The third motor may be used in a third electric work machine different from the first electric work machine and the second electric work machine. The fourth motor may be used in a fourth electric work machine different from the first electric work machine and the second electric work machine.

As described above, although the first stator 201 has a structure partially different from the structure of the second stator 202, the first rotor 3001 that can be combined with the first stator 201 can also be combined with the second stator 202, thus reducing the production cost of the first motor 6001 and the second motor 6002. The first stator core 211 and the second stator core 212 in the second stator 202 are equal in shape in a plane orthogonal to the rotation axis AX. The first rotor 3001 that can be combined with the first stator 201 can thus also be combined with the second stator 202.

As described with reference to FIGS. 31 and 32 and other figures, the first stator core 211 is the same as the second stator core 212. In other words, one type of stator core 21 can be combined with the first rotor 3001 or the second rotor 3002, reducing the production cost of the first motor 6001 and the second motor 6002 more effectively.

In the present embodiment, the first rotor 3001 and the second rotor 3002 may be equal in length (corresponding to an axial dimension).

In the present embodiment, the first rotor 3001 and the second rotor 3002 may not be equal in outer diameter.

In the present embodiment, the first coil 241 and the second coil 242 may have different wire diameters. The first coil 241 and the second coil 242 may have different numbers of turns.

In the present embodiment, the first coils 241 are delta-connected, the second coils 242 are delta-connected, and these delta-connections are parallel to each other as described with reference to FIG. 7. The first coil 241 may be connected in the same manner as the second coil 242, and are not limited to the connection manner described with reference to FIG. 7.

Figure 37:
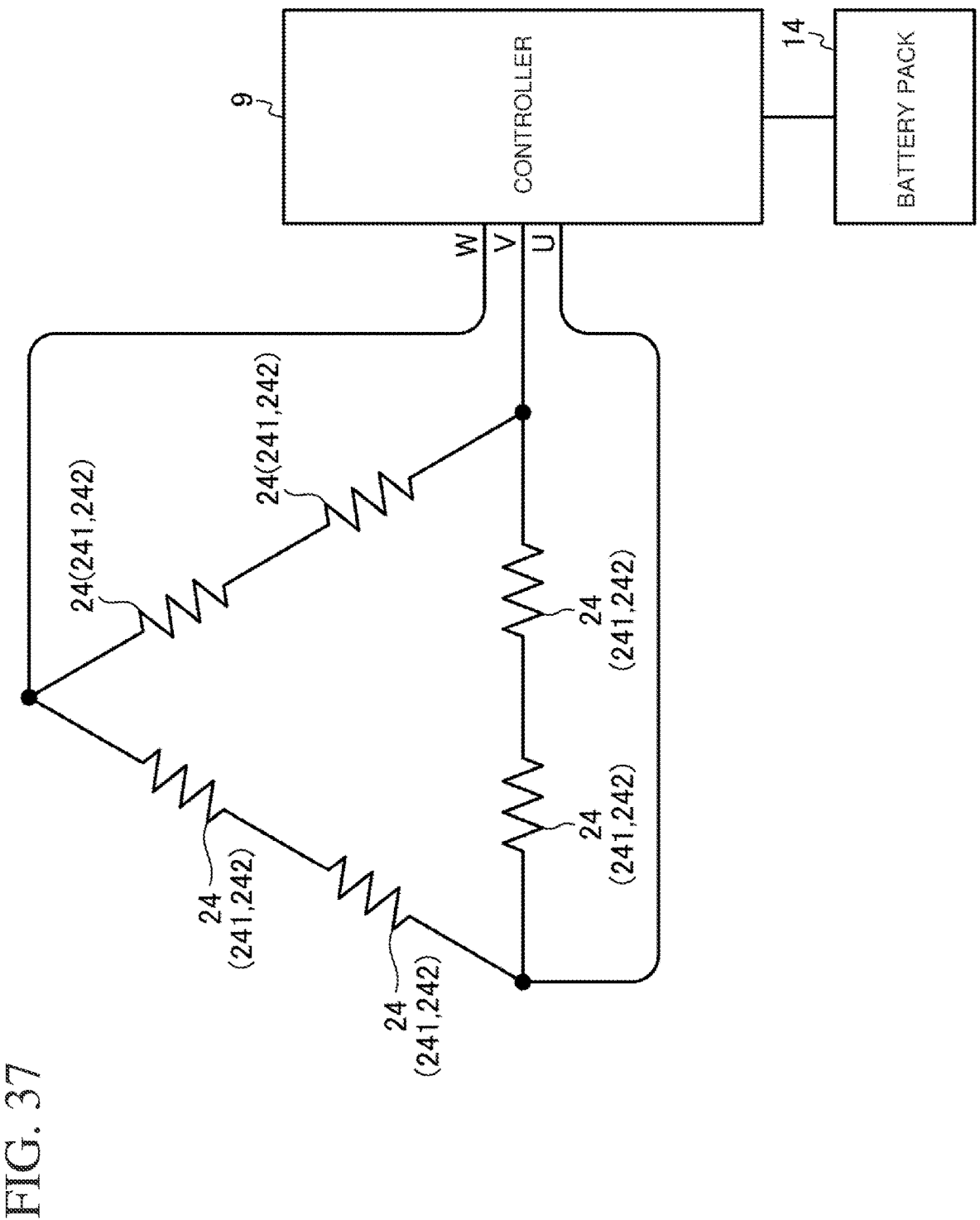
FIG. 37 is a schematic diagram of connected coils in another example of the third embodiment.
Figure 38:
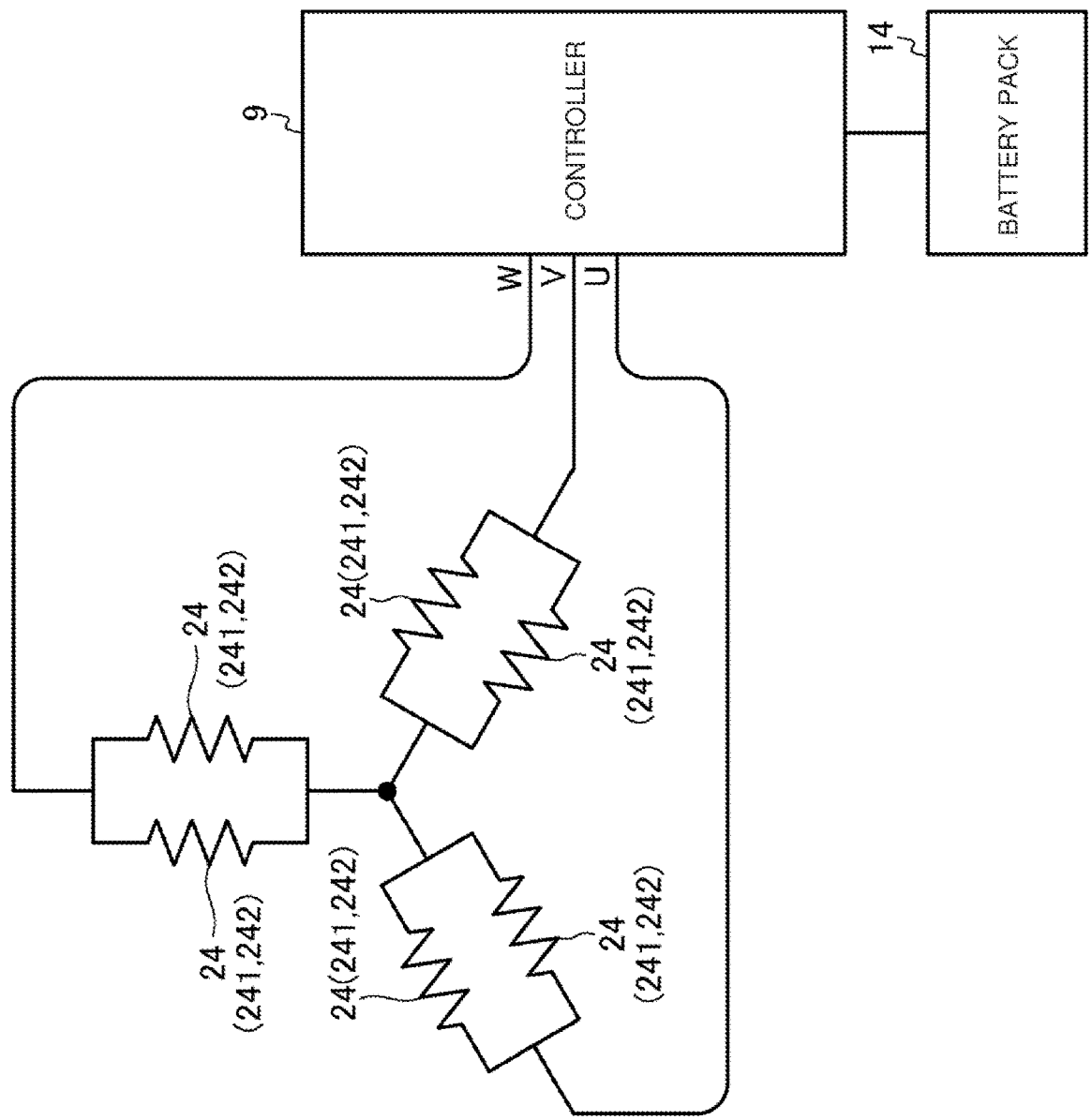
FIG. 38 is a schematic diagram of connected coils in another example of the third embodiment.
Figure 39:
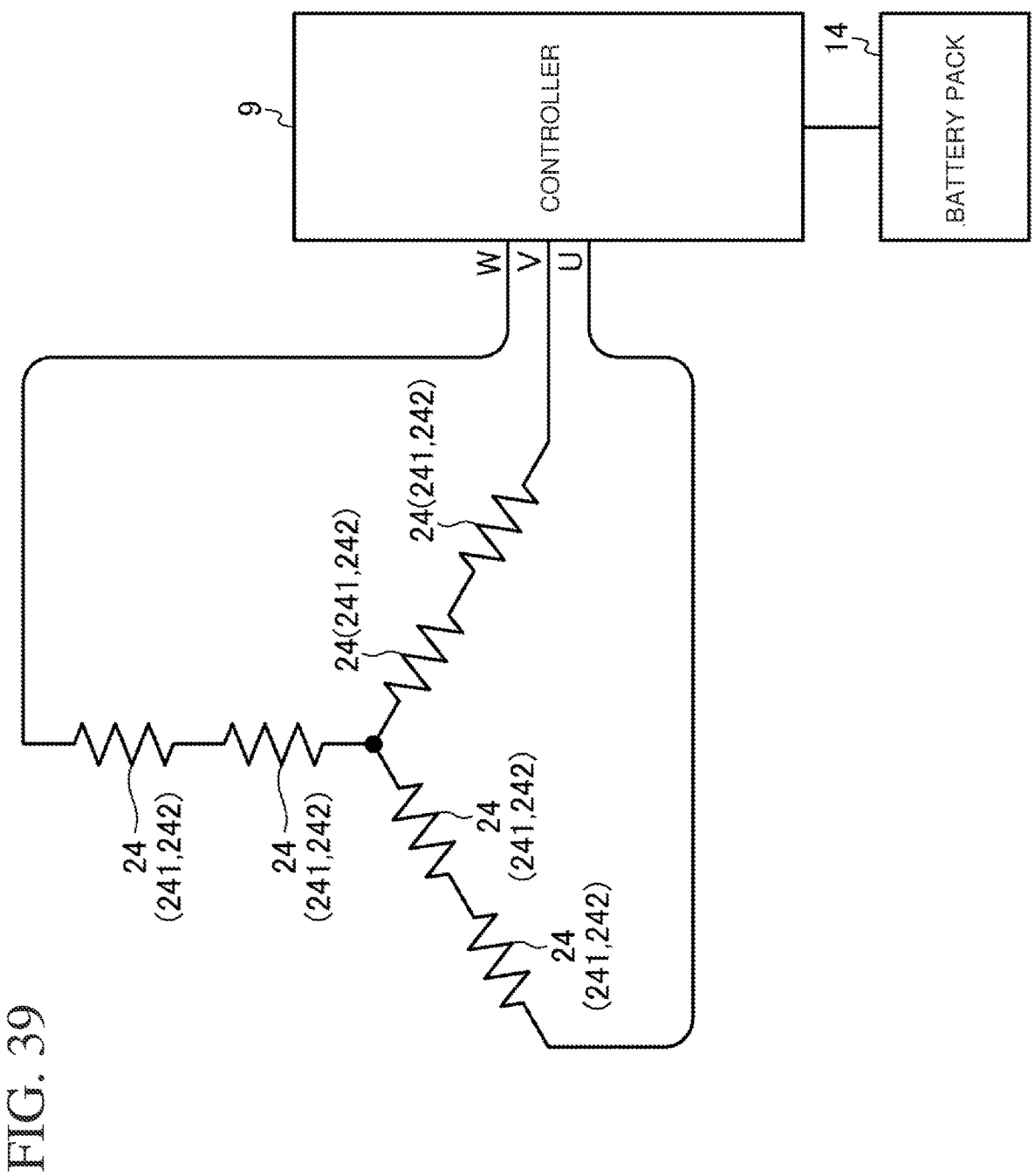
FIG. 39 is a schematic diagram of connected coils in another example of the third embodiment.

FIGS. 37 to 39 are schematic diagrams of connected coils 24 (241 and 242) in other examples of the present embodiment. As shown in FIG. 37, the coils 24 (241 and 242) may be delta-connected in series. As shown in FIG. 38, the coils 24 (241 and 242) may be Y-connected in parallel. As shown in FIG. 39, the coils 24 (241 and 242) may be Y-connected in series.

The motor in the present embodiment is an IPM motor. The motor may be a surface permanent magnetic (SPM) motor with permanent magnets attached to the outer surface of the rotor core. In some embodiments, the first rotor 3001 may be an IPM motor and the second rotor 3002 may be an SPM motor.

The motor in the present embodiment is a brushless inner-rotor motor. The motor may be a brushless outer-rotor motor.

Other Embodiments

In the above embodiments, the first portion 61 of the first core 311 has the dimension W1 smaller than the dimension W2 of the second portion 62 of the second core 312. The first core 311 thus generates smaller reluctance torque than the second core 312 relative to the stator 20. The adjustment of the reluctance torque of the first core 311 and the second core 312 is not limited to the adjustment of the dimensions W1 and W2.

Figure 40:
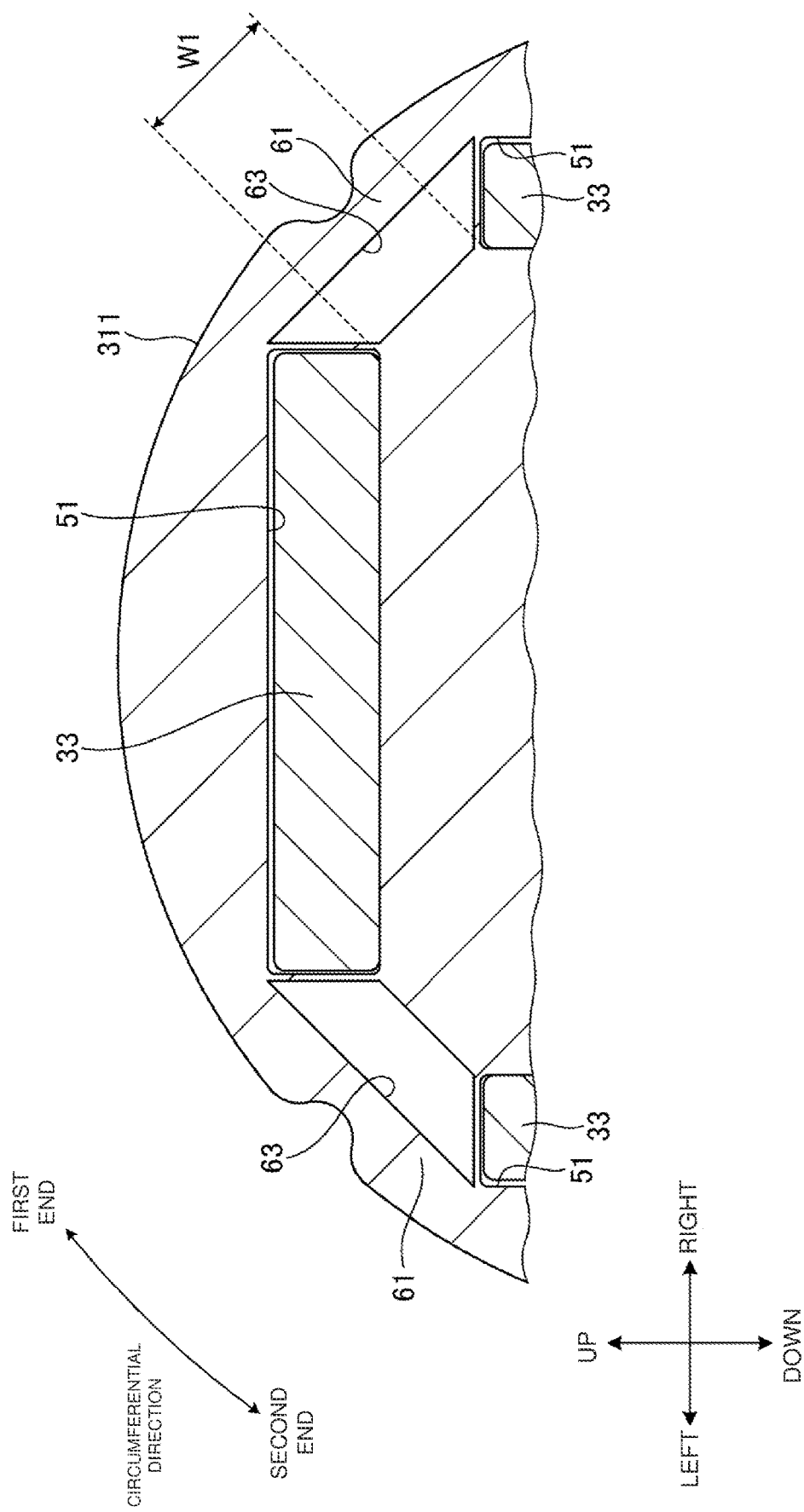
FIG. 40 is a partially enlarged cross-sectional view of a first core in another embodiment.
Figure 41:
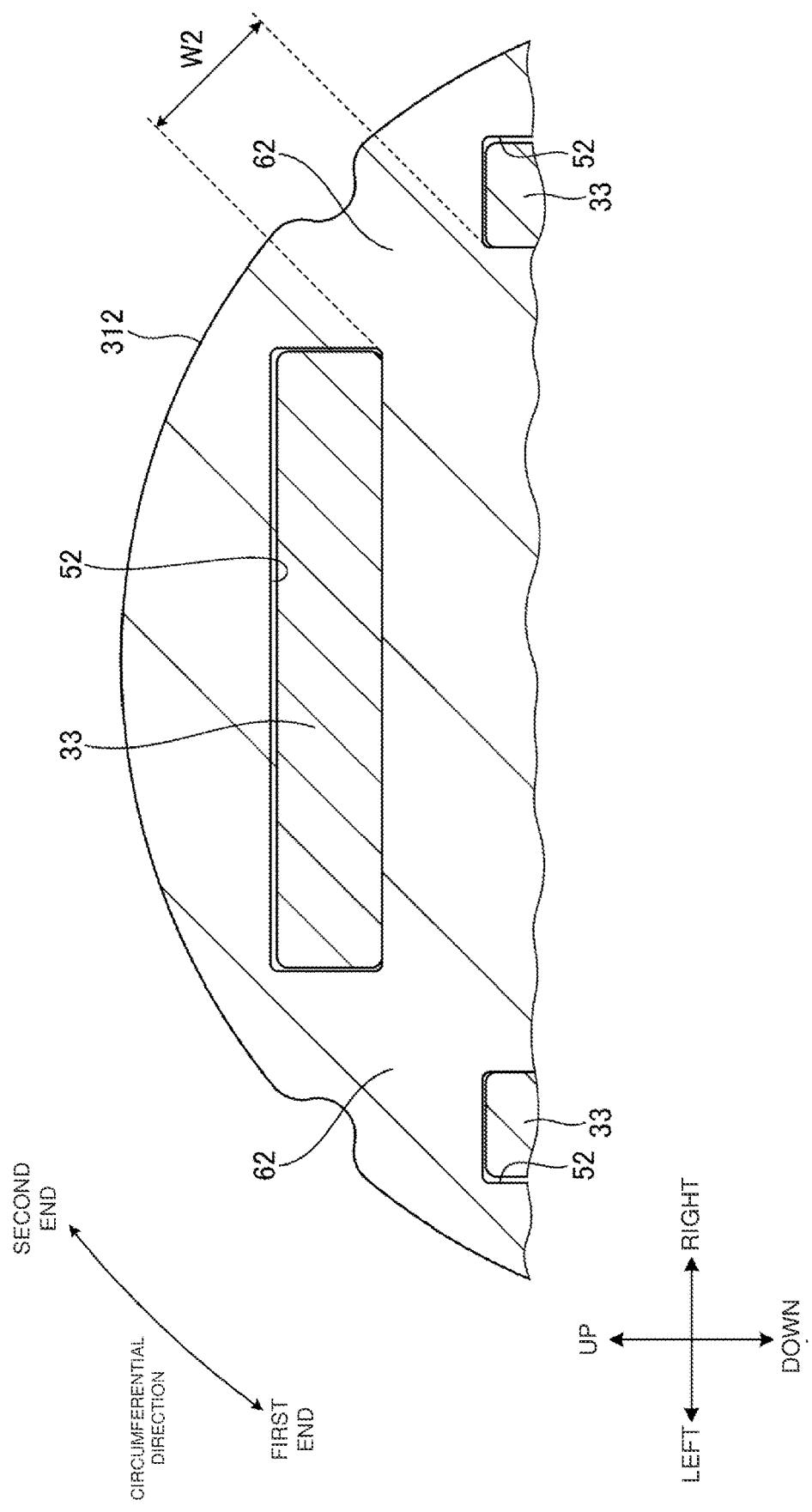
FIG. 41 is a partially enlarged cross-sectional view of a second core in the other embodiment.

FIG. 40 is a partially enlarged cross-sectional view of a first core 311 in another embodiment. FIG. 41 is a partially enlarged cross-sectional view of a second core 312 in the other embodiment. As in the embodiments described above, the first core 311 and the second core 312 are adjacent to each other in the axial direction. As shown in FIG. 40, the first core 311 has multiple first slots 51 located at intervals in the circumferential direction. As shown in FIG. 41, the second core 312 has multiple second slots 52 located at intervals in the circumferential direction. The permanent magnets 33 are received in the respective first slots 51 and the respective second slots 52. First portions 61 of the first core 311 each are located between first slots 51 adjacent in the circumferential direction. Second portions 62 of the second core 312 each are located between the second slots 52 adjacent in the circumferential direction. In the circumferential direction, the first portion 61 has the dimension W1 equal to the dimension W2 of the second portion 62. As shown in FIG. 40, holes 63 are located in the first portions 61. As shown in FIG. 41, no holes are located in the second portions 62. The holes 63 in the first portions 61 cause the first core 311 to generate smaller reluctance torque than the second core 312 relative to the stator 20.

The electric work machine 1 according to the above embodiments is an impact driver as an example of a power tool. The power tool is not limited to an impact driver. Examples of the power tool include a driver drill, a vibration driver drill, an angle drill, a screwdriver, a hammer, a hammer drill, a circular saw, and a reciprocating saw.

The electric work machine 101 according to the above embodiments is a chain saw as an example of outdoor power equipment. The outdoor power equipment is not limited to a chain saw. Examples of the outdoor power equipment include a hedge trimmer, a lawn mower, a mowing machine, and a blower.

In the above embodiments, the electric work machine may be a cleaner.

In the above embodiments, the electric work machine is powered by the battery pack 14 attached to the battery mount. In some embodiments, the electric work machine may use utility power (alternating current power supply).

REFERENCE SIGNS LIST

1 electric work machine (impact driver)
2 housing
2A motor compartment
2B grip
2C controller compartment
3 rear case
4 hammer case
5 battery mount
7 fan
8 anvil
8A insertion hole
9 controller
10 trigger switch
11 forward-reverse switch lever
12 operation panel
13 lamp
14 battery pack
15 inlet
16 outlet
17 chuck unit
18 screw
19 through-hole
20 stator
21 stator core
21T tooth
22 front insulator
22D threaded hole
22P protrusion
22S support
22T protrusion
23 rear insulator
23T protrusion
24 coil
24U U-phase coil
24U1 U-phase coil
24U2 U-phase coil
24V V-phase coil
24V1 V-phase coil
24V2 V-phase coil
24 W W-phase coil
24W1 W-phase coil
24W2 W-phase coil
25 power line
25U U-phase power line
25V V-phase power line
25 W W-phase power line
26 fusing terminal
26U U-phase fusing terminal
26V V-phase fusing terminal
26 W W-phase fusing terminal
27 short-circuiting member
27A opening
27U U-phase short-circuiting member
27V V-phase short-circuiting member
27 W W-phase short-circuiting member
28 insulating member
28A body
28B screw boss
28C support
28D opening 29 connection wire
29E winding end
29S winding start
31 rotor core
31F front end (first end)
31R rear end (second end)
32 rotor shaft
33 permanent magnet
33A inner surface
33B outer surface
33C front surface
33D rear surface
33E first side surface
33F second side surface
35 first steel plate
36 second steel plate
37 opening
38 opening
39A recess
39B recess
40 sensor board
41 plate
42 screw boss
43 magnetic sensor
44 signal line
45 opening
50 magnet slot
51 first slot
51A first support surface
51B second support surface
51E third support surface
51F fourth support surface
51G first extension surface
51H first facing surface
51I first connecting surface
51J second extension surface
51K second facing surface
51L second connecting surface
52 second slot
52A fifth support surface
52B sixth support surface
52E seventh support surface
52F eighth support surface
52G third facing surface
52H third extension surface
52I third connecting surface
52J fourth facing surface
52K fourth extension surface
52L fourth connecting surface
61 first portion
62 second portion
63 hole
71 first space
72 second space
73 first resin portion
74 second resin portion
101 electric work machine
102 housing
103 hand guard
104 first grip
105 battery mount
106 trigger switch
107 trigger lock lever
108 guide bar
109 saw chain
110 motor compartment
111 battery holder
112 second grip
200 stator
201 first stator
202 second stator
211 first stator core
212 second stator core
241 first coil
242 second coil
300 rotor
301 rotor
301B rotor
302 rotor
311 first core
311F front surface
311R rear surface
311S outer surface
311T inner surface
312 second core
312F front surface
312R rear surface
312S outer surface
312T inner surface
313 third core
331 first permanent magnet
332 second permanent magnet
601 motor
602 motor
701 first output unit
702 second output unit
1000 electric work machine set
3001 first rotor
3002 second rotor
6001 first motor
6002 second motor
C1 distance
C2 distance
E1 dimension
E2 dimension
H1 dimension
H2 dimension
L1 dimension
L2 dimension
La line
Lb line
Lc line
Ld line
R1 distance
R2 distance
T1 thickness
T2 thickness
Vn arrow
Vs arrow
W1 dimension
W2 dimension

The invention claimed is:
1. A manufacturing method for an electric work machine, the method comprising:
stacking first steel plates on one another to produce a first stator core;
winding a first coil around each of a plurality of first teeth on the first stator core in a first connection manner to produce a first stator;
combining the first stator with a first rotor having a first number of poles to produce a first brushless motor;
stacking second steel plates having the same shape as the first steel plates to produce a second stator core;

winding a second coil around each of a plurality of second teeth on the second stator core in a second connection manner to produce a second stator, the second connection manner being the same as the first connection manner;

combining the second stator with a second rotor to be combined with the first stator to produce a second brushless motor, the second rotor having a second number of poles;

manufacturing a first electric work machine including the first brushless motor; and manufacturing a second electric work machine including the second brushless motor.

2. A manufacturing method for an electric work machine, the method comprising:

preparing a plurality of stators each including a stator core having a plurality of teeth and a plurality of coils each wound around a corresponding tooth of the plurality of teeth, the stator core satisfying a condition T=3×4×N, where T is the number of the plurality of teeth and N is a natural number;

preparing a first rotor configured to be combined with the stator, the first rotor having 10×N poles;

preparing a second rotor configured to be combined with the stator, the second rotor having 14×N poles, the second rotor and the first rotor being equal in outer diameter;

combining the first rotor with the stator to produce a first brushless motor; and combining the second rotor with the stator to produce a second brushless motor.

3. The manufacturing method for the electric work machine according to claim 2, wherein the first brushless motor and the second brushless motor are outer-rotor brushless motors.

4. The manufacturing method for the electric work machine according to claim 2, wherein the natural number N=1.

5. The manufacturing method for the electric work machine according to claim 3, wherein the natural number N=1.

6. A method, comprising:

preparing a first stator including a first stator core having twelve first teeth and twelve first coils each wound around a corresponding first tooth of the twelve first teeth;

preparing a second stator including a second stator core having twelve second teeth and twelve second coils each wound around a corresponding second tooth of the twelve second teeth;

preparing a first rotor configured to be combined with the first stator, the first rotor having 10 poles;

preparing a second rotor configured to be combined with the second stator, the second rotor having 14 poles, the second rotor and the first rotor being equal in outer diameter;

combining the first rotor with the first stator to produce a first electric work machine having a first brushless motor; and combining the second rotor with the second stator to produce a second electric work machine having a second brushless motor.

7. The method according to claim 6, wherein the twelve first coils are wound around the twelve first teeth in a first connection manner, and the twelve second coils are wound around the twelve second teeth in the first connection manner.

8. The method according to claim 6, wherein the first coil and the second coil are different in wire diameter.

9. The method according to claim 7, wherein the first coil and the second coil are different in wire diameter.

10. The method according to claim 6, wherein the first coil and the second coil are different in number of turns.

11. The method according to claim 7, wherein the first coil and the second coil are different in number of turns.

12. The method according to claim 8, wherein the first coil and the second coil are different in number of turns.

13. The method according to claim 6, wherein the first stator core and the second stator core are different in length in an axial direction parallel to a rotation axis.

14. The method according to claim 7, wherein the first stator core and the second stator core are different in length in an axial direction parallel to a rotation axis.

15. The method according to claim 8, wherein the first stator core and the second stator core are different in length in an axial direction parallel to a rotation axis.

16. The method according to claim 10, wherein the first stator core and the second stator core are different in length in an axial direction parallel to a rotation axis.

* * * * *